(12) United States Patent
Hartson et al.

(10) Patent No.: US 12,491,063 B2
(45) Date of Patent: Dec. 9, 2025

(54) SOFT TISSUE IMPLANT SYSTEMS, INSTRUMENTS AND RELATED METHODS

(71) Applicant: PARAGON 28, INC., Englewood, CO (US)

(72) Inventors: Kyle James Hartson, Englewood, CO (US); Laura Zagrocki Brinker, Englewood, CO (US); Randy Allard, Golden, CO (US); Albert Dacosta, Englewood, CO (US)

(73) Assignee: PARAGON 28, INC., Englewood, CO (US)

( * ) Notice: Subject to any disclaimer, the term of this patent is extended or adjusted under 35 U.S.C. 154(b) by 918 days.

(21) Appl. No.: 17/339,064

(22) Filed: Jun. 4, 2021

(65) Prior Publication Data

US 2021/0290359 A1   Sep. 23, 2021

Related U.S. Application Data

(63) Continuation of application No. PCT/US2019/064741, filed on Dec. 5, 2019.
(Continued)

(51) Int. Cl.
 *A61B 17/00*   (2006.01)
 *A61B 17/02*   (2006.01)
(Continued)

(52) U.S. Cl.
 CPC ........ *A61F 2/0811* (2013.01); *A61B 17/0206* (2013.01); *A61B 17/06066* (2013.01);
(Continued)

(58) Field of Classification Search
None
See application file for complete search history.

(56) References Cited

U.S. PATENT DOCUMENTS 5,356,424 A * 10/1994 Buzerak ........... A61B 17/06066
606/147
5,403,348 A    4/1995 Bonutti
(Continued)

FOREIGN PATENT DOCUMENTS

| WO | 2016038614 A2 | 3/2016 |
| WO | 2016160951 A1 | 10/2016 |
| WO | 2020118087 A1 | 6/2020 |

OTHER PUBLICATIONS

Extended European Search Report for European Patent Application No. 19893125.5, Aug. 1, 2022, 9 pages.
(Continued)

*Primary Examiner* — Jacqueline Woznicki
(74) *Attorney, Agent, or Firm* — Heslin Rothenberg Farley & Mesiti P.C.

(57) ABSTRACT

Implant systems and related methods for joining bone and/or tissue portions is disclosed. The implant systems include a first flexible anchor tube comprising a first annular side wall defining a first internal cavity, a first longitudinal end and a second longitudinal end, and a second flexible anchor tube comprising a second annular side wall defining a second internal cavity, a first longitudinal end and a second longitudinal end. The implant systems also comprise at least one suture that passes through the first and second side walls a plurality of times. The at least one suture extends along a pattern that prevents the second anchor tube from translating along the at least one suture and allows the first anchor tube to translate along the at least one suture toward the second anchor tube when first and second end portions of the at least one suture are tensioned.

32 Claims, 40 Drawing Sheets

Related U.S. Application Data

(60) Provisional application No. 62/883,429, filed on Aug. 6, 2019, provisional application No. 62/775,591, filed on Dec. 5, 2018.

(51) Int. Cl.
*A61B 17/04* (2006.01)
*A61B 17/06* (2006.01)
*A61B 17/17* (2006.01)
*A61F 2/08* (2006.01)
*A61B 17/56* (2006.01)

(52) U.S. Cl.
CPC .... *A61B 17/06166* (2013.01); *A61B 17/1775* (2016.11); *A61B 2017/00438* (2013.01); *A61B 2017/0445* (2013.01); *A61B 2017/0608* (2013.01); *A61B 2017/564* (2013.01); *A61F 2002/0852* (2013.01)

(56) References Cited

U.S. PATENT DOCUMENTS

| | | | |
|---|---|---|---|
| 5,562,685 A * | 10/1996 | Mollenauer | A61B 17/0469 606/139 |
| 5,755,728 A * | 5/1998 | Maki | A61B 17/0469 606/139 |
| 6,511,498 B1 | 1/2003 | Fumex | |
| 7,601,165 B2 | 10/2009 | Stone | |
| 7,658,751 B2 | 2/2010 | Stone et al. | |
| 7,749,250 B2 | 7/2010 | Stone et al. | |
| 7,857,830 B2 | 12/2010 | Stone et al. | |
| 7,905,903 B2 | 3/2011 | Stone et al. | |
| 7,905,904 B2 | 3/2011 | Stone et al. | |
| 7,909,851 B2 | 3/2011 | Stone et al. | |
| 8,088,130 B2 | 1/2012 | Kaiser et al. | |
| 8,118,836 B2 | 2/2012 | Denham et al. | |
| 8,128,658 B2 | 3/2012 | Kaiser et al. | |
| 8,137,382 B2 | 3/2012 | Denham et al. | |
| 8,273,106 B2 | 9/2012 | Stone et al. | |
| 8,292,921 B2 | 10/2012 | Stone et al. | |
| 8,298,262 B2 | 10/2012 | Stone et al. | |
| 8,337,525 B2 | 12/2012 | Stone et al. | |
| 8,551,139 B2 | 10/2013 | Surti et al. | |
| 8,551,140 B2 | 10/2013 | Denham et al. | |
| 8,562,647 B2 | 10/2013 | Kaiser et al. | |
| 8,608,777 B2 | 12/2013 | Kaiser et al. | |
| 8,623,051 B2 | 1/2014 | Bojarski et al. | |
| 8,632,569 B2 | 1/2014 | Stone et al. | |
| 8,652,172 B2 | 2/2014 | Denham et al. | |
| 8,672,968 B2 | 3/2014 | Stone et al. | |
| 8,721,684 B2 | 5/2014 | Denham et al. | |
| 8,771,316 B2 | 7/2014 | Denham et al. | |
| 8,777,992 B2 * | 7/2014 | Yeung | A61B 17/0401 606/232 |
| 8,790,369 B2 | 7/2014 | Orphanos et al. | |
| 8,840,645 B2 | 9/2014 | Denham et al. | |
| 8,894,684 B2 | 11/2014 | Sengun | |
| 8,932,331 B2 | 1/2015 | Kaiser et al. | |
| 8,936,621 B2 | 1/2015 | Denham et al. | |
| 8,986,346 B2 | 3/2015 | Dreyfuss | |
| 9,017,381 B2 | 4/2015 | Kaiser et al. | |
| 9,034,013 B2 | 5/2015 | Sengun | |
| 9,060,763 B2 | 6/2015 | Sengun | |
| 9,060,764 B2 | 6/2015 | Sengun | |
| 9,149,267 B2 | 10/2015 | Norton et al. | |
| 9,173,651 B2 | 11/2015 | Stone et al. | |
| 9,173,653 B2 | 11/2015 | Bojarski et al. | |
| 9,271,713 B2 | 3/2016 | Denham et al. | |
| 9,314,241 B2 | 4/2016 | Stone et al. | |
| 9,320,512 B2 | 4/2016 | Dooney, Jr. | |
| 9,345,567 B2 | 5/2016 | Sengun | |
| 9,351,719 B2 | 5/2016 | McClellan et al. | |
| 9,357,991 B2 | 6/2016 | Denham et al. | |
| 9,357,992 B2 | 6/2016 | Stone et al. | |
| 9,370,350 B2 | 6/2016 | Norton | |
| 9,381,013 B2 | 7/2016 | Norton | |
| 9,402,620 B2 | 8/2016 | Pilgeram | |
| 9,402,621 B2 | 8/2016 | Stone et al. | |
| 9,414,833 B2 | 8/2016 | Stone et al. | |
| 9,421,008 B2 | 8/2016 | Burkhart et al. | |
| 9,445,803 B2 | 9/2016 | Marchand et al. | |
| 9,463,011 B2 | 10/2016 | Dreyfuss et al. | |
| 9,486,211 B2 | 11/2016 | Stone et al. | |
| 9,492,158 B2 | 11/2016 | Stone et al. | |
| 9,498,204 B2 | 11/2016 | Denham et al. | |
| 9,510,821 B2 | 12/2016 | Denham et al. | |
| 9,532,777 B2 | 1/2017 | Kaiser et al. | |
| 9,561,025 B2 | 2/2017 | Stone et al. | |
| 9,603,591 B2 | 3/2017 | Denham et al. | |
| 9,622,736 B2 | 4/2017 | Stone et al. | |
| 2001/0037123 A1 | 11/2001 | Hancock | |
| 2001/0049536 A1 * | 12/2001 | Chan | A61B 17/0469 606/139 |
| 2003/0130694 A1 * | 7/2003 | Bojarski | A61F 2/0811 606/228 |
| 2004/0044350 A1 * | 3/2004 | Martin | A61B 18/1492 606/139 |
| 2004/0138683 A1 * | 7/2004 | Shelton | A61B 17/0401 606/232 |
| 2005/0000523 A1 * | 1/2005 | Beraud | A61B 17/06066 606/139 |
| 2006/0079904 A1 | 4/2006 | Thal | |
| 2006/0264976 A1 * | 11/2006 | Terry | A61B 17/0482 606/148 |
| 2006/0293709 A1 | 12/2006 | Bojarski et al. | |
| 2007/0083236 A1 | 4/2007 | Sikora et al. | |
| 2007/0185532 A1 * | 8/2007 | Stone | A61B 17/0482 606/232 |
| 2007/0260279 A1 * | 11/2007 | Hotter | A61L 17/04 606/228 |
| 2008/0140092 A1 * | 6/2008 | Stone | A61B 17/0469 606/139 |
| 2009/0018552 A1 | 1/2009 | Lam et al. | |
| 2010/0152751 A1 * | 6/2010 | Meade | A61B 34/30 606/144 |
| 2012/0290006 A1 | 11/2012 | Collins et al. | |
| 2014/0046368 A1 | 2/2014 | Kaiser et al. | |
| 2014/0073857 A1 | 3/2014 | Dodson | |
| 2014/0163614 A1 * | 6/2014 | Denham | A61B 17/0401 606/228 |
| 2014/0257382 A1 | 9/2014 | McCartney | |
| 2014/0316460 A1 | 10/2014 | Graul et al. | |
| 2014/0350599 A1 | 11/2014 | Torrie et al. | |
| 2014/0371792 A1 | 12/2014 | Beck | |
| 2015/0012094 A1 | 1/2015 | Denham et al. | |
| 2015/0127051 A1 | 5/2015 | Kaiser et al. | |
| 2015/0134000 A1 | 5/2015 | Denham et al. | |
| 2015/0141995 A1 | 5/2015 | Norton | |
| 2015/0173754 A1 | 6/2015 | Norton et al. | |
| 2015/0209027 A1 | 7/2015 | Collins et al. | |
| 2015/0238183 A1 | 8/2015 | Sengun | |
| 2015/0245832 A1 | 9/2015 | Sengun | |
| 2015/0257750 A1 | 9/2015 | Kaiser et al. | |
| 2016/0022261 A1 | 1/2016 | Stone et al. | |
| 2016/0058436 A1 | 3/2016 | Stone et al. | |
| 2016/0106414 A1 | 4/2016 | Stone et al. | |
| 2016/0120536 A1 | 5/2016 | Bojarski et al. | |
| 2016/0128684 A1 | 5/2016 | Stone et al. | |
| 2016/0174961 A1 | 6/2016 | Callison et al. | |
| 2016/0174963 A1 | 6/2016 | Oren et al. | |
| 2016/0193023 A1 * | 7/2016 | Pereira | A61B 17/0401 600/37 |
| 2016/0199053 A1 | 7/2016 | Norton et al. | |
| 2016/0213369 A1 | 7/2016 | Stone et al. | |
| 2016/0242760 A1 | 8/2016 | Kaiser et al. | |
| 2016/0242793 A1 | 8/2016 | Norton et al. | |
| 2016/0270777 A1 | 9/2016 | Miller et al. | |
| 2016/0287242 A1 | 10/2016 | Troxel et al. | |
| 2016/0287243 A1 | 10/2016 | Benedict et al. | |
| 2016/0296222 A1 | 10/2016 | Sengun | |
| 2016/0310130 A1 | 10/2016 | Pilgeram | |
| 2016/0354079 A1 | 12/2016 | Marchand et al. | |

(56) References Cited

U.S. PATENT DOCUMENTS

| | | |
|---|---|---|
| 2016/0374662 A1 | 12/2016 | Dreyfuss et al. |
| 2017/0020655 A1 | 1/2017 | Dreyfuss et al. |
| 2017/0049437 A1 | 2/2017 | Ferguson |
| 2017/0095363 A1 | 4/2017 | Hiernaux et al. |
| 2017/0128061 A1 | 5/2017 | Stone et al. |
| 2018/0085112 A1 | 3/2018 | Sorensen et al. |
| 2018/0221010 A1 | 8/2018 | Lund |
| 2018/0242967 A1* | 8/2018 | Meade ............... A61B 17/0625 |
| 2019/0015091 A1* | 1/2019 | Guo ................... A61B 17/0469 |
| 2019/0029668 A1* | 1/2019 | Meade ............... A61B 17/0491 |
| 2021/0290359 A1* | 9/2021 | Hartson .................... A61B 1/32 |
| 2022/0361867 A1* | 11/2022 | Hartson ............... A61F 2/0805 |

OTHER PUBLICATIONS

International Preliminary Report on Patentability for International Application No. PCT/US2019/064741, dated Jun. 8, 2021, 15 pages, International Bureau of WIPO.

International Search Report and Written Opinion of the International Search Authority for International Application No. PCT/US2019/064741 mailed on May 5, 2020.

\* cited by examiner

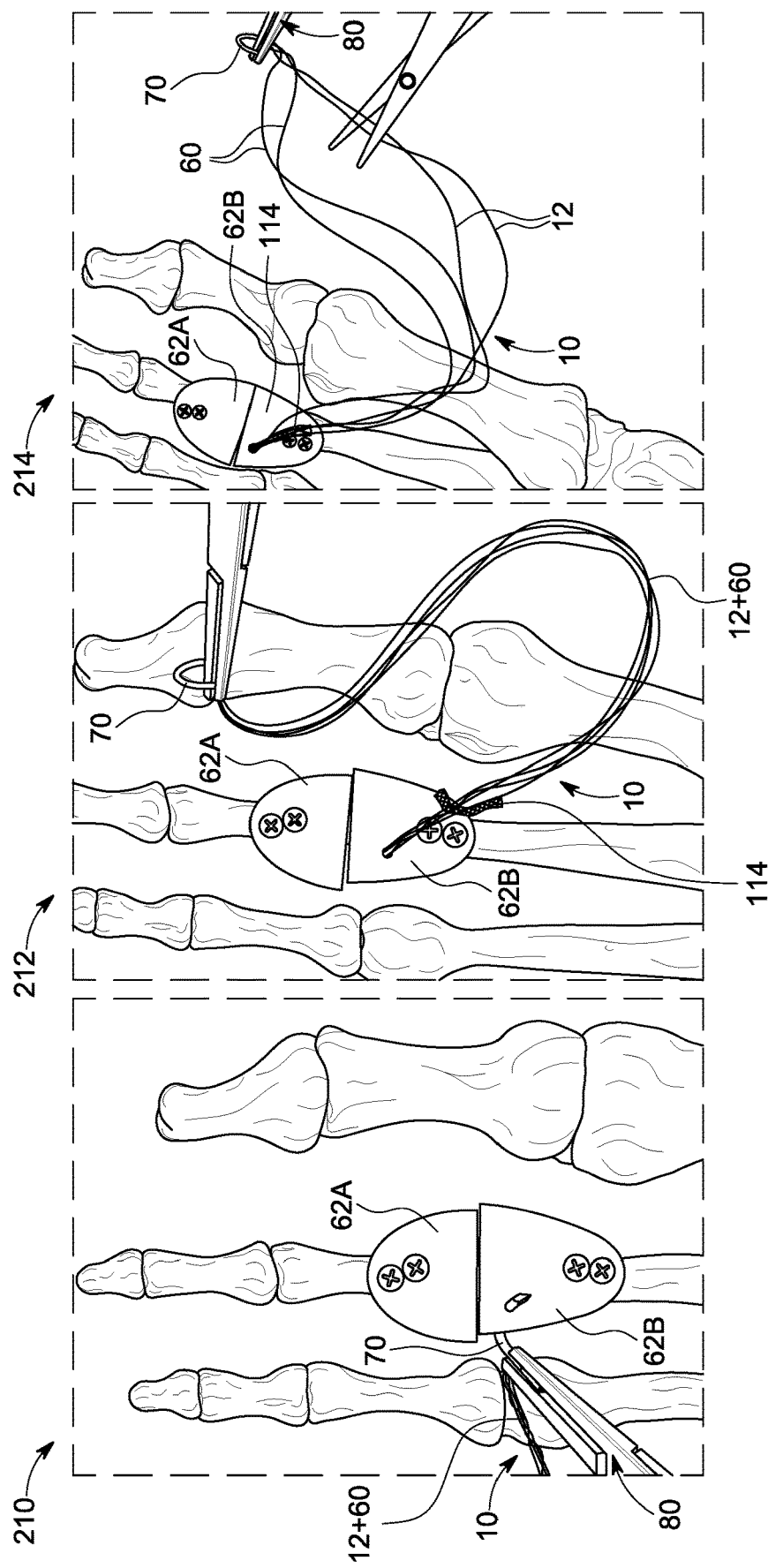

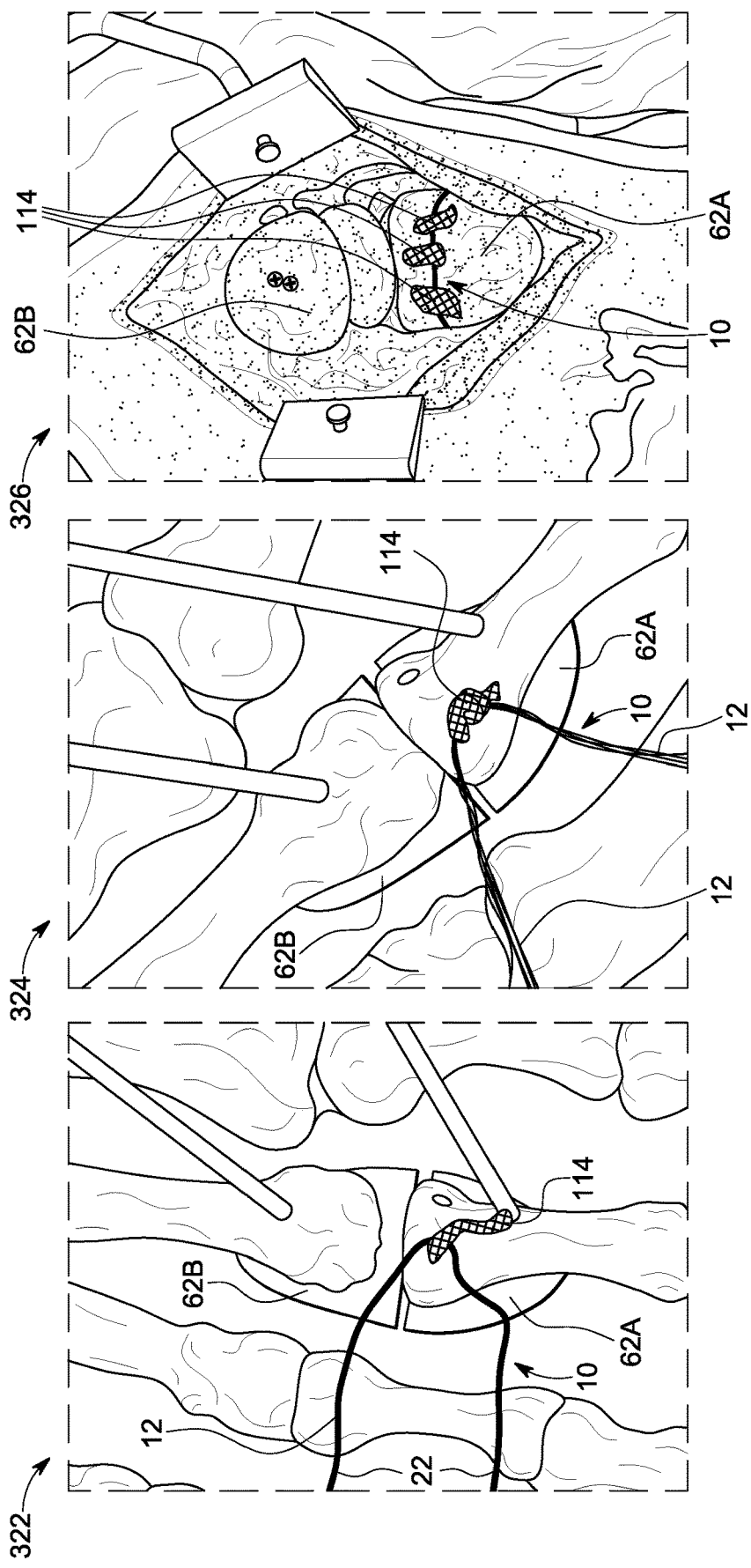

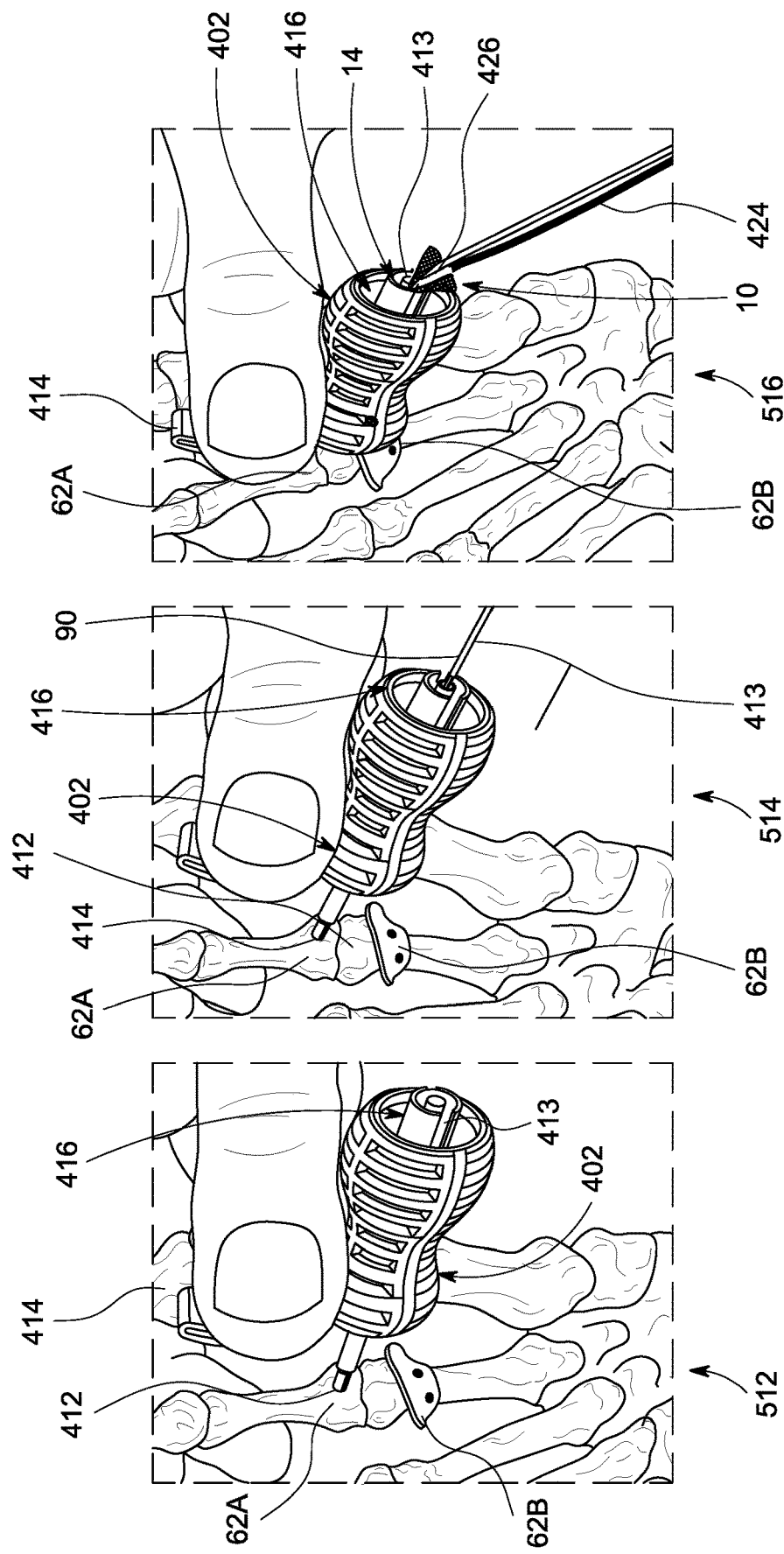

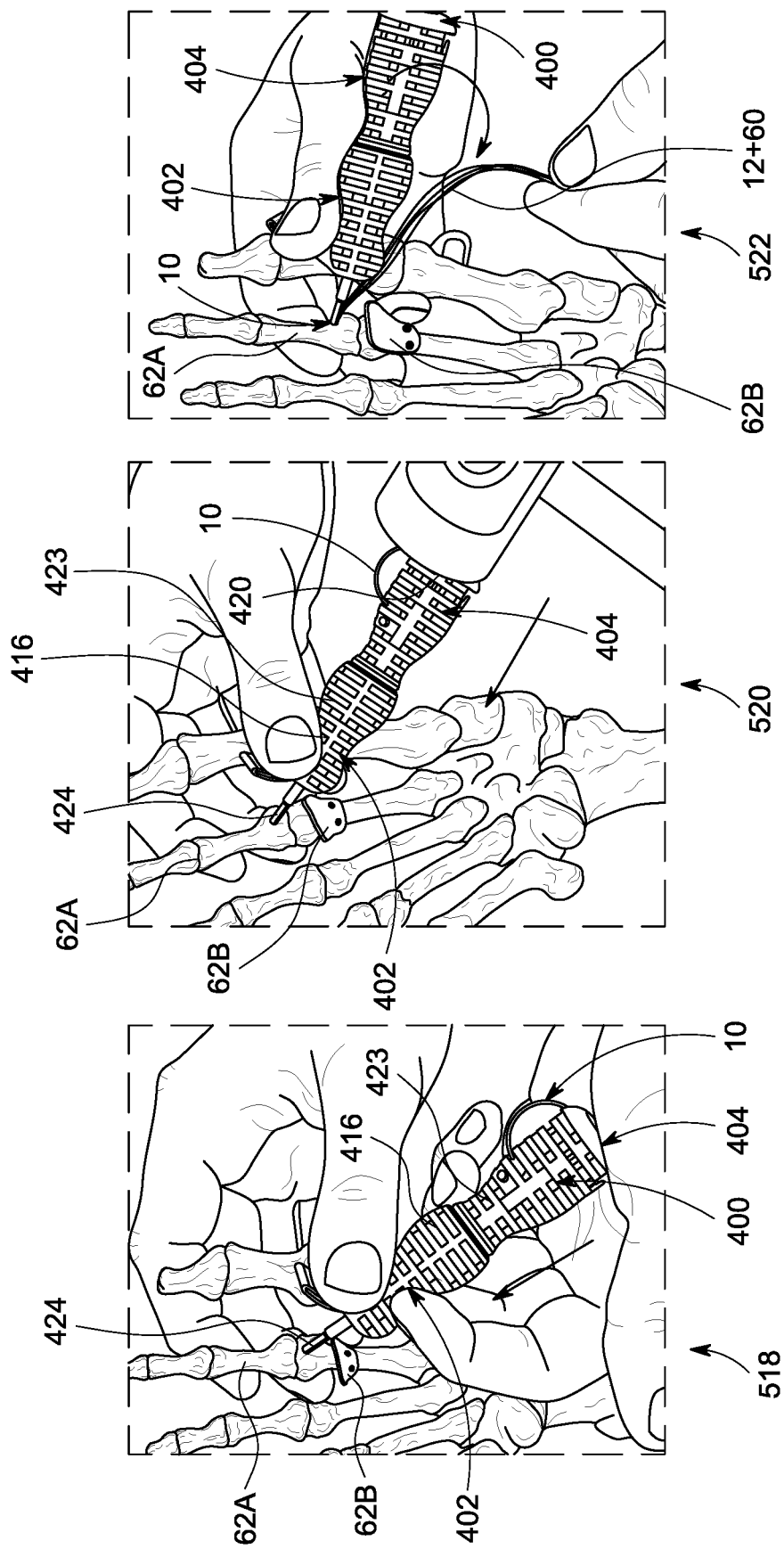

SOFT TISSUE IMPLANT SYSTEMS, INSTRUMENTS AND RELATED METHODS

CROSS REFERENCE TO RELATED APPLICATIONS

This application claims priority benefit from International Application No. PCT/US2019/064741, filed on Dec. 5, 2019, which claims priority benefit of U.S. Provisional Patent Application No. 62/775,591, filed Dec. 5, 2018, and entitled Implant System and Methods of Use, and also claims priority benefit of U.S. Provisional Patent Application No. 62/883,429, filed Aug. 6, 2019, and entitled Soft Tissue Implant Systems, Instruments and Related Methods, which are hereby incorporated herein by reference in their entireties.

TECHNICAL FIELD

The present disclosure relates generally to podiatric and orthopedic implants and surgery related to repairs of soft tissue and/or bone. More specifically, but not exclusively, the present disclosure relates to implants, systems, assemblies and methods for joining soft tissue to soft tissue, soft tissue to bone, and bone to bone.

BACKGROUND

The plantar plate is a thick ligamentous (fibrocartilaginous) structure on the bottom of the foot under a metatarsophalangeal joint (MTP joint). A plantar plate attaches to a metatarsal bone and a corresponding proximal phalanx bone. A plantar plate provides stability to the MTP joint by withstanding compressive loads from the metatarsal head and tensile loads in line with the toe axis. A plantar plate also cushions the bottom of an MTP joint and the distal head of a metatarsal while standing, walking, running, and the like. A plantar plate also helps bring the corresponding toe toward the floor while standing.

A plantar plate may become torn or otherwise compromised, such as due to biomechanical abnormalities and/or imbalances in the foot that cause overload of one of the metatarsals and/or MTP joints. Examples of biomechanical abnormalities and/or imbalances include a long first metatarsal, a short second metatarsal, a short third metatarsal, an untreated metatarsus adductus deformity (e.g., a pigeon toe deformity), arthritis of the great toe (first metatarsal, first proximal phalanx and/or first distal phalanx), and prior cortisone injection into a plantar plate.

The tissue of the plantar plate itself may become attenuated, tear or otherwise become segmented along its length between corresponding metatarsal and proximal phalanx bones. Alternatively, a plantar plate may tear from or otherwise become decoupled from corresponding metatarsal or proximal phalanx bones. A torn plantar plate typically causes persistent ball of the foot pain and/or changes in the position/alignment of the affected toe and/or adjacent toe(s) (e.g., hammertoe). Both acute and, more commonly, chronic injuries to the plantar plate can cause a range of injury types, such as instability (particularly in the 2nd and 3rd MTP joints, medial deviation of the toe, "crossover toe", pain and discomfort, for example).

Other tissues and/or bones of the foot, and other parts of a mammalian (e.g., human) body, similarly may become torn or otherwise be segmented or separated such that joining of the portions of the tissues and/or bones may be anatomically and/or physiologically advantageous or desirable. For example, the human hand includes a palmar plate. The palmar plate is an analogous structure to the plantar plate. A palmar plate is associated with each metacarpophalangeal joint (MCP joint) and each interphalangeal joint in the hand. Like the plantar plate, the palmar plate may tear.

Typical plantar plate repair options include suturing/re-approximating the tear in the plantar plate tissue to induce healing, or re-attaching the tissue to the insertion point at the base of the proximal phalanx. Current systems for plantar plate repair (and repairs of other tissues and/or bones of the foot, and other parts of the human body) tend to be bulky and/or complex. Current systems also typically require multiple and/or relatively large through holes to be formed per tissue and/or bone connection in order to join/repair the portions, which can weaken the construct.

Thus, there is a need for implants, systems, assemblies and methods for plantar plate repair, and joining of other tissues and/or bones of the foot and other parts of a mammalian (e.g., human) body, that are compact, maneuverable and simple to use. There is also need for tissue and/or bone repair/joining implants, systems, assemblies and methods that do not require a plurality of and/or relatively large through holes formed in each of the joined tissue and/or bone segments.

SUMMARY

The present disclosure is directed toward devices and methods for joining tissue and/or bone segments or portions. The implants, systems, assemblies and methods for joining soft tissue to soft tissue, soft tissue to bone, and bone to bone may be used for repairing a torn plantar plate. However, the implants, systems, assemblies and methods may be equally employed to repair/join any other tissue and/or bone segments or portions of the foot or other parts of the mammalian (e.g., human) body.

In one aspect, the present disclosure provides a bone and/or tissue joining implant system. The system comprises a first flexible anchor tube comprising a first annular side wall defining a first internal cavity, a first longitudinal end and a second longitudinal end. The system also comprise a second flexible anchor tube comprising a second annular side wall defining a second internal cavity, a first longitudinal end and a second longitudinal end. The system further comprises a suture that passes through the first side wall a plurality of times and through the second side wall a plurality of times. The suture extends along a pattern that prevents the second anchor tube from translating along the suture and allows the first anchor tube to translate along the suture toward the second anchor tube when first and second end portions of the suture are tensioned.

In some embodiments, the first end portion of the suture extends through a first portion of the first side wall of the first anchor tube from an exterior surface of the first anchor tube proximate to the first longitudinal end thereof into the first internal cavity, extends longitudinally through a portion of the first cavity toward the second longitudinal end of the first anchor tube, and extends through a second portion of the first side wall distal to the first longitudinal end from the first internal cavity to the exterior surface of the first anchor tube. In some embodiments, a first intermediate portion of the suture extends from the portion of the first end portion extending through the second portion of the first side wall of the first anchor tube, and the first intermediate portion extends through a first portion of the second side wall of the second anchor tube from an exterior surface thereof proximate to the first longitudinal end thereof into the second internal cavity, extends longitudinally through a portion of the second cavity toward the second longitudinal end of the second anchor tube, and extends through a second portion of the second side wall distal to the first longitudinal end from the second internal cavity to the exterior surface of the second anchor tube. In some embodiments, the second end portion of the suture extends through a third portion of the first side wall from an exterior surface of the first anchor tube proximate to the second longitudinal end thereof into the first internal cavity, extends longitudinally through a portion of the cavity toward the first longitudinal end, and extends through a fourth portion of the first side wall distal to the second longitudinal end from the internal cavity to the exterior surface of the first anchor tube. In some embodiments, a second intermediate portion of the suture extends from the portion of the second end portion extending through the second portion of the second side wall of second first anchor tube, and the second intermediate portion extends through a third portion of the second side wall of the second anchor tube from an exterior surface thereof proximate to the second longitudinal end thereof into the second internal cavity, extends longitudinally through a portion of the second cavity toward the first longitudinal end of the second anchor tube, and extends through a fourth portion of the second side wall distal to the second longitudinal end from the second internal cavity to the exterior surface of the second anchor tube. In some embodiments, a first loop portion of the suture extends from the portion of first intermediate portion of the suture extending through the second portion of the second side wall of the second anchor tube, and the second loop portion of the suture extends from the portion of second intermediate portion of the suture extending through the fourth portion of the second side wall of the second anchor tube. In some embodiments, a third loop portion of the suture extends between the first and second loop portions of the suture, and the first, second and third loop portions of the suture form a loop that extends about the first and second intermediate portions of the suture.

In some embodiments, the suture extends along a pattern that prevents the second anchor tube from translating along the suture and allows the first anchor tube to translate along the suture toward the second anchor tube when the first end portion of the suture is tensioned in a direction extending toward the first or second longitudinal ends of the first anchor tube and the second end portion of the suture is tensioned in a direction extending toward the other of the first or second longitudinal ends of the first anchor tube.

In some embodiments, the first and second anchor tubes are formed from a biocompatible material. In some embodiments, the suture is formed from a biocompatible material. In some embodiments, the first and second anchor tubes are longitudinally elongated. In some embodiments, the first and second anchor tubes are cylindrical.

In some embodiments, when the first and second end portions are tensioned, the suture pulls the first and/or second anchor tube into a concave shape with respect to a first side of the first and second side walls, respectively. In some embodiments, the suture comprises a monofilament suture. In some embodiments, the suture comprises a multifilament suture including at least two filaments of differing materials.

In some embodiments, system further comprises a second suture extending through the second side wall of the second anchor tube.

In some embodiments, the system further comprises an insertion device. In some embodiments, the first and second end portions of the suture and first and second end portions of the second suture are coupled to the insertion device. In some embodiments, each of the first and second end portions of the suture are tied or swaged to the insertion device. In some embodiments, the system further comprises a second suture extending through the second side wall of the second anchor tube, and first and second end portions of the second suture are coupled to the insertion device. In some embodiments, the insertion device comprises a non-linear needle. In some embodiments, the needle comprises a base portion defining a base end and an arcuate main body portion extending from the base portion to a tip portion of the needle. In some embodiments, the tip portion of the needle defines a trocar tip. In some embodiments, the body portion is curved and defined by a single radius of curvature that is less than about 5 mm. In some embodiments, the body portion is curved and defined by a first arcuate portion that extends from the base portion and is defined by a first radius, and a second arcuate portion that extends between the first arcuate portion and the tip portion and is defined by a second radius that differs from the first radius, and the first and second arcuate portions extend on differing planes. In some embodiments, the base portion is linear. In some embodiments, the base portion is arcuate.

In another aspect, the present disclosure provides a modular retractor instrument for separating the edges of a surgical incision and/or tissue underlying an incision. The instrument comprises at least one modular retractor prong member comprising a handle portion and a support portion extending from the handle portion to a tissue engagement hook portion, and a retractor device. The retractor device comprises a first member including a manually engageable handle portion and an arm portion extending from the handle portion to a tissue engagement free end portion. The retractor device further comprises a second member including a manually engageable handle portion and an arm portion extending from the handle portion to a tissue engagement free end portion. The retractor device also comprises a joint pivotably coupling the first and second members positioned between the handle portions and the tissue engagement end portions that defines a pivoting axis. The tissue engagement end portions of the arm portions each include a solid paddle portion and a plurality of hook portions spaced along a bottom side of the paddle portion. The arm portions each include a mounting post proximate to the tissue engagement free end portion thereof and distal to the joint. The at least one modular retractor prong member includes a mounting hole configured to mate with the mounting post of one of the arm portions to removably rotatable couple the at least one modular retractor prong member to the arm portion.

In some embodiments, the arm portions each include first portions proximate to the joint that extend away from each other, and second portions proximate to the tissue engagement free end portions that extend toward each other as they extend toward the tissue engagement free end portions. In some embodiments, the retractor device comprises a self-retaining retractor that includes a locking mechanism that fixes the first and second arm members in a user selectable relative arrangement about the joint. In some embodiments, the at least one of the handle portions defines an aperture configured to accept one or more fingers of a user therein.

In some embodiments, the each paddle portion comprises a solid outer surface for engaging tissue, the outer surface portions of the paddle portions face away from each other. In some embodiments, the outer surface of each paddle portion defines a height within the range of about 8 mm to about 35 mm, and a width within the range of about 8 mm to about 35 mm. In some embodiments, the outer surface each paddle portion defines a surface area within the range of about 50 mm² to about 300 mm².

In some embodiments, the mounting posts extend from the tissue engagement end portions of the arm portions of the first and second members. In some embodiments, the each mounting post includes a base portion of a first cross-sectional size that extends from the arm portion, and an enlarged head portion spaced from the arm portion of a second cross-sectional size that is larger than the first cross-sectional size. In some embodiments, the mounting aperture comprises a keyhole-shaped portion having a first portion with a cross-sectional size that is the same or greater than the first cross-sectional size and smaller than the second cross-sectional size of the mounting posts, and an enlarged second portion with a cross-sectional size that is the same or greater than the second cross-sectional size of the mounting posts. In some embodiments, the enlarged second portion of the keyhole-shaped portion is positioned proximate to the handle portion and distal to the hook portion of the at least one modular retractor prong member, and the first portion of the keyhole-shaped front face is positioned proximate to the hook portion and distal to the handle portion of the at least one modular retractor prong member.

In some embodiments, the comprising at least two modular retractor prong members for coupling to each arm portion of the retractor device.

In another aspect, the present disclosure provides an instrument system comprising a drill guide comprising a first handle portion, a guide portion that extends from a distal end portion of the first handle portion to a bone engagement tip, a passageway extending through the drill guide from a distal end of the first handle portion to the bone engagement tip, and a slot that extends from exterior surfaces of the first handle portion and the guide portion to the passageway and from the distal end of the first handle portion to the bone engagement tip. The instrument system further comprises an inserter comprising a second handle portion and an insertion portion that extends from a distal end portion of the second handle portion to an implant holder tip. A proximal end portion of the second handle portion and the distal end portion of the first handle portion are configured to mate. The guide portion of the inserter is configured to extend through the passageway of the drill guide such that the implant holder tip is positioned past the bone engagement tip when the first and second handle portions are mated.

In some embodiments, the bone engagement tip comprises at least one tooth. In some embodiments, the handle portion of the drill guide comprises a laterally extending distal projection. In some embodiments, the second handle portion comprises an internal cavity, and a slot that extends from an exterior surface of the second handle portion to the cavity and from a distal end of the second handle portion to a proximal end of the second handle portion. In some embodiments, the second handle portion comprises a coupling portion configured to coupled suture strands of an implant to the second handle portion.

In some embodiments, the implant holder tip is configured to retain an anchor tube of an implant thereon. In some embodiments, instrument system further comprising an implant system disclosed herein coupled to the inserter, and the first flexible anchor tube or the second flexible anchor tube of the implant system is retained on the implant holder tip. In some embodiments, the implant holder tip comprises a forked free end with a pair of tines and a base portion extending therebetween, and a pair of grooves extending proximally from the base portion of the forked free end. In some embodiments, end portions of the first flexible anchor tube or the second flexible anchor tube retained on the implant holder tip extends within the pair of grooves, and a medial portion thereof extends over the base portion between the pair of tines.

In another aspect, the present disclosure provides a method of joining plantar plate segments. The method comprises: obtaining the implant system according to any of implant systems disclosed herein; exposing the plantar plate segments on a plantar side of a foot; passing the insertion device through the first plantar plate; pulling at least the second suture to translate the second anchor tube through the first plantar plate; cutting the suture to decouple the insertion device and the first anchor tube; passing the insertion device through the second plantar plate segment; pulling the second suture to translate the second anchor tube through the second plantar segment; cutting the second suture to decouple the insertion device and the second anchor tube; tensioning end portions of the suture in divergent directions to seat the first and second anchors against the first and second plantar plate segments, respectively, deform the first and second anchors, and draw the first and second plantar plate segments together; and tying the end portions of the suture in a knot to fix the relationship of the first and second plantar plate segments.

In some embodiments, passing the insertion device through the first plantar plate comprises passing the insertion device through the first plantar plate in a dorsal to plantar direction, and passing the insertion device through the second plantar plate segment comprises passing the insertion device through the second plantar plate segment in a plantar to dorsal direction.

In another aspect, the present disclosure provides a method of joining a plantar plate and a proximal phalanx. The method comprises: obtaining the implant system according to any of implant systems disclosed herein; exposing the plantar plate and the proximal phalanx on a dorsal side of a foot; passing the insertion device through the plantar plate; pulling at least the second suture to translate the second anchor tube through the plantar plate; forming a through hole in the proximal phalanx; cutting the suture and the second suture to decouple the insertion device from the first and second anchor tubes; translating the suture and the second suture through the through hole in the proximal phalanx; pulling the second suture to translate the second anchor tube through the through hole in the proximal phalanx; tensioning end portions of the suture in divergent directions to seat the first and second anchor tubes against the plantar plate segment and the proximal phalanx, respectively, deform the first and second anchor tubes, and draw the plantar plate segment and the proximal phalanx together; and tying the end portions of the suture in a knot to fix the relationship of the plantar plate segment and the proximal phalanx.

In some embodiments, passing the insertion device through the plantar plate comprises passing the insertion device through the plantar plate in a plantar to dorsal direction, and translating the suture and the second suture through the through hole in the proximal phalanx comprises translating the suture and the second suture through the through hole in the proximal phalanx in a plantar to dorsal direction.

In another aspect, the present disclosure provides a method of joining a plantar plate and a proximal phalanx. The method comprises: obtaining the implant system according to any of the implant systems disclosed herein; exposing the plantar plate segments on a plantar side of a foot; forming a through hole in the proximal phalanx; translating the first anchor tube partially through the through hole in the proximal phalanx such that the first anchor is positioned past an inner surface of a plantar portion of the proximal phalanx; cutting the suture to decouple the insertion device and the first anchor tube; passing the insertion device through the plantar plate; pulling at least the second suture to translate the second anchor tube through the first plantar plate; cutting the second suture to decouple the insertion device and the second anchor tube; tensioning end portions of the suture in divergent directions to seat the first and second anchor tubes against the inner surface of the cortex portion of the proximal phalanx and the plantar plate, respectively, deform the first and second anchor tubes, and draw the proximal phalanx and the plantar plate together; and tying the end portions of the suture in a knot to fix the relationship of the proximal phalanx and the plantar plate.

In some embodiments, translating the first anchor tube partially through the through hole in the proximal phalanx such that the first anchor is positioned past an inner surface of a plantar portion of the proximal phalanx comprises translating the first anchor tube partially through the through hole in the proximal phalanx in a plantar to dorsal direction such that the first anchor is positioned past an inner surface of a plantar cortex portion of the proximal phalanx, and passing the insertion device through the plantar plate comprises passing the insertion device through the plantar plate in a plantar to dorsal direction.

In another aspect, the present disclosure provides bone and/or tissue joining implant system comprising a first flexible anchor tube comprising a first annular side wall defining a first internal cavity, a first longitudinal end and a second longitudinal end, and at least one suture that passes through the first side wall a plurality of times. The at least one suture extends along a pattern that prevents the first anchor tube from translating along the at least one suture when first and second end portions of the at least one suture are tensioned.

In some embodiments, a first portion of the at least one suture extends through a first portion of the first side wall of the first anchor tube from an exterior surface of the first anchor tube proximate to the first longitudinal end thereof into the first internal cavity, extends longitudinally through a portion of the first internal cavity toward the second longitudinal end of the first anchor tube, and extends through a second portion of the first side wall distal to the first longitudinal end from the first internal cavity to the exterior surface of the first anchor tube. In some such embodiments, a second portion of the at least one suture extends through a third portion of the first side wall of the first anchor tube from an exterior surface thereof proximate to the first portion of the at least one suture extending through the second portion of the first side wall into the first internal cavity, extends longitudinally through a portion of the first internal cavity toward the second longitudinal end of the first anchor tube, and extends through a fourth portion of the first side wall proximate to the second longitudinal end from the first internal cavity to the exterior surface of the first anchor tube. In some embodiments, a loop portion of the at least one suture extends between the first portion of the at least one suture extending through the second portion of the first side wall and the second portion of the at least one suture extending through the third portion of the first side wall. In some embodiments, the loop portion of the at least one suture forms a loop that extends about the first portion of the at least one suture extending through the first portion of the first side wall and the second portion of the at least one suture extending through the fourth portion of the first side wall.

In some embodiments, the at least one suture extends along a pattern that prevents the first anchor tube from translating along the at least one suture when the first end portion of the at least one suture is tensioned in a direction extending toward the first or second longitudinal end of the first anchor tube and the second end portion of the at least one suture is tensioned in a direction extending toward the other of the first or second longitudinal end of the first anchor tube.

In some embodiments, the first anchor tube is formed from a biocompatible material. In some embodiments, the at least one suture is formed from a biocompatible material. In some embodiments, the first anchor tube is longitudinally elongated. In some embodiments, the first anchor tube is cylindrical.

In some embodiments, when the first and second end portions of the at least one suture are tensioned, the at least one suture pulls the first anchor tube into a concave shape with respect to a first side of the first side wall.

In some embodiments, the at least one suture comprises a monofilament at least one suture. In some embodiments, the at least one suture comprises a multifilament at least one suture including at least two filaments of differing materials. In some embodiments, the first and second end portions of the at least one suture are coupled to a common insertion device. In some embodiments, the first and second end portions of the at least one suture are coupled to a respective insertion device. In some embodiments, each of the first and second end portions of the at least one suture are tied or swaged to the insertion device.

In some embodiments, the insertion device comprises a non-linear needle. In some embodiments, the needle comprises a base portion defining a base end and an arcuate main body portion extending from the base portion to a tip portion of the needle. In some embodiments, the tip portion of the needle defines a trocar tip. In some embodiments, the body portion is curved and defined by a single radius of curvature that is less than about 5 mm.

In some embodiments, the body portion is curved and defined by a first arcuate portion that extends from the base portion and is defined by a first radius, and a second arcuate portion that extends between the first arcuate portion and the tip portion and is defined by a second radius that differs from the first radius, and the first and second arcuate portions extend on differing planes. In some embodiments, the base portion is linear. In some embodiments, the base portion is arcuate.

In some embodiments, the at least one suture comprises a pair of sutures.

In another aspect, the present disclosure provides a method of joining a first bone or tissue segment to a second bone or tissue segment. The method comprises obtaining an implant system disclosed herein, passing the first anchor tube through at least a portion of the first bone or tissue segment, passing the first end portion of the at least one suture through a first portion of the second bone or tissue segment, passing the second end portion of the at least one suture through a second portion of the second bone or tissue segment, tensioning the first and second end portions of the at least one suture in divergent directions to seat the first anchor tube against the first bone or tissue segment, deform the first anchor tube, and draw the first bone or tissue segment and the second bone or tissue segment together, and tying the first and second end portions of the at least one suture in a knot to fix the relationship of the first bone or tissue segment and the second bone or tissue segment.

In some embodiments, passing the first anchor tube through at least a portion of the first bone or tissue segment comprises passing the first anchor tube partially through a first bone segment past a cortex thereof. In some embodiments, passing the first end portion of the at least one suture through the first portion of the second bone or tissue segment comprises passing an insertion device coupled to the first end portion of the at least one suture through the first portion of the second bone or tissue segment, and passing the second end portion of the at least one suture through the second portion of the second bone or tissue segment comprises passing an insertion device coupled to the second end portion of the at least one suture through the second portion of the second bone or tissue segment. In some embodiments, passing the first end portion of the at least one suture through the first portion of the second bone or tissue segment comprises first passing the first end portion of the at least one suture through the first portion of the second bone or tissue segment from a first surface of the second bone or tissue segment that is adjacent to the first bone or tissue segment to a second surface of the second bone or tissue segment that is distal to the first bone or tissue segment, and passing the second end portion of the at least one suture through the second portion of the second bone or tissue segment comprises first passing the second end portion of the at least one suture through the second portion of the second bone or tissue segment from the first surface to the second surface of the second bone or tissue segment.

In some embodiments, the first bone or tissue segment comprises a proximal phalanx and the second bone or tissue segment comprises a plantar plate.

These and other objects, features and advantages of the inventions provided by this disclosure will become apparent from the following detailed description of the various aspects of the invention taken in conjunction with the accompanying drawings.

BRIEF DESCRIPTION OF THE DRAWINGS

The accompanying drawings, which are incorporated in and constitute a part of the specification, illustrate embodiments of the inventions and together with the detailed description herein, serve to explain the principles of the inventions. It is emphasized that, in accordance with the standard practice in the industry, various features may or may not be drawn to scale. In fact, the dimensions of the various features may be arbitrarily increased or reduced for clarity of discussion. The drawings are only for purposes of illustrating embodiments of inventions of the disclosure and are not to be construed as limiting the inventions.

FIGS. 24A-24I illustrate an exemplary method of joining a tissue segment and a bone of a foot from a dorsal approach via a tissue and/or bone joining implant system, an insertion needle and a needle driver, in accordance with the present disclosure;

DETAILED DESCRIPTION

Figure 1:
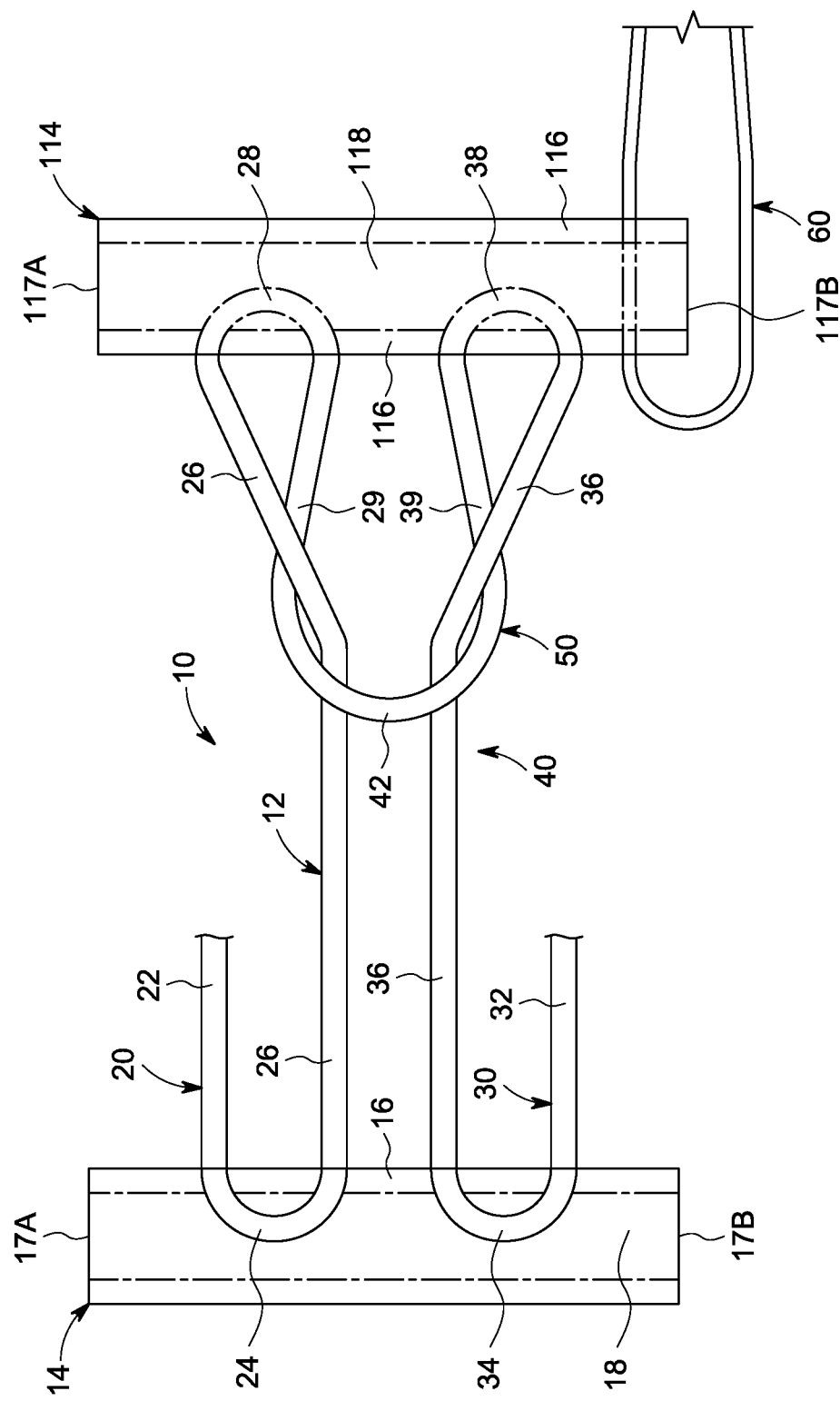
FIG. 1 is a top view of a tissue and/or bone joining implant system, in accordance with the present disclosure.
Figure 2:
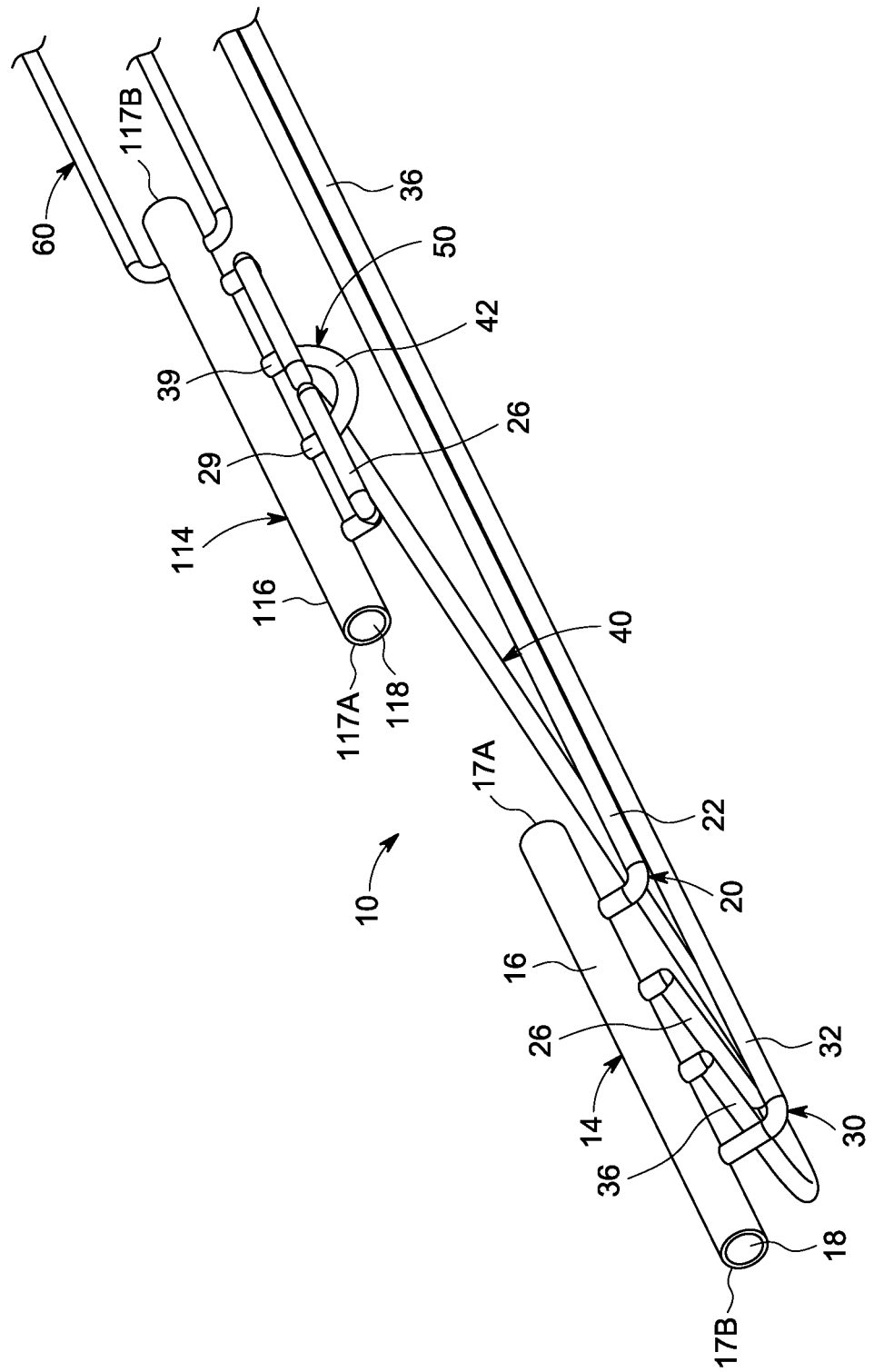
FIG. 2 is a bottom perspective view of the implant system of FIG. 1, in accordance with the present disclosure.
Figure 3:
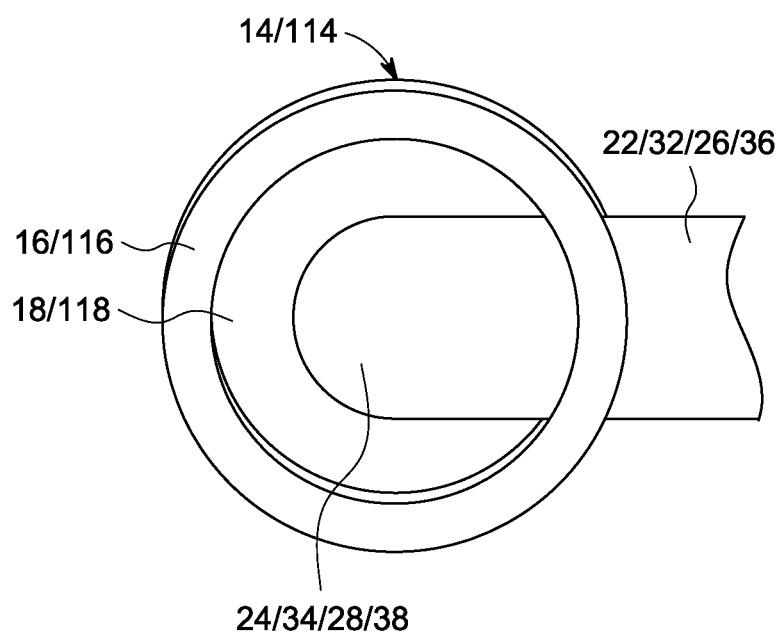
FIG. 3 is a side cross-sectional view of an anchor tube and an associated suture portion of the implant system of FIG. 1, in accordance with the present disclosure.

In this detailed description and the following claims, the words proximal, distal, anterior or plantar, posterior or dorsal, medial, lateral, superior and inferior are defined by their standard usage for indicating a particular part or portion of a bone or implant according to the relative disposition of the natural bone or directional terms of reference. For example, "proximal" means the portion of a device or implant nearest the torso, while "distal" indicates the portion of the device or implant farthest from the torso. As for directional terms, "anterior" is a direction towards the front side of the body, "posterior" means a direction towards the back side of the body, "medial" means towards the midline of the body, "lateral" is a direction towards the sides or away from the midline of the body, "superior" means a direction above and "inferior" means a direction below another object or structure. Further, specifically in regards to the foot, the term "dorsal" refers to the top of the foot and the term "plantar" refers the bottom of the foot.

Similarly, positions or directions may be used herein with reference to anatomical structures or surfaces. For example, as the current implants, devices, instrumentation and methods are described herein with reference to use with the bones of the foot, the bones of the foot, ankle and lower leg may be used to describe the surfaces, positions, directions or orientations of the implants, devices, instrumentation and methods. Further, the implants, devices, instrumentation and methods, and the aspects, components, features and the like thereof, disclosed herein are described with respect to one side of the body for brevity purposes. However, as the human body is relatively symmetrical or mirrored about a line of symmetry (midline), it is hereby expressly contemplated that the implants, devices, instrumentation and methods, and the aspects, components, features and the like thereof, described and/or illustrated herein may be changed, varied, modified, reconfigured or otherwise altered for use or association with another side of the body for a same or similar purpose without departing from the spirit and scope of the invention. For example, the implants, devices, instrumentation and methods, and the aspects, components, features and the like thereof, described herein with respect to the right foot may be mirrored so that they likewise function with the left foot. Further, the implants, devices, instrumentation and methods, and the aspects, components, features and the like thereof, disclosed herein are described with respect to the foot for brevity purposes, but it should be understood that the implants, devices, instrumentation and methods may be used with other bones of the body having similar structures.

Generally stated, disclosed herein are implants, systems, assemblies and methods for joining soft tissue to soft tissue, soft tissue to bone, and bone to bone. The implants, systems, assemblies and methods may be used for repairing a torn plantar plate of a metatarsophalangeal joint (MTP joint). While the implants, systems, assemblies and methods may be illustrated and described in the present disclosure in the context of plantar plate repair, the implants, systems, assemblies and methods may equally be employed or may be adapted without undue experimentation to join any soft tissue to any soft tissue, any soft tissue to any bone, or any bone to any bone. For example, the implants, systems, assemblies and methods may be equally employed to repair/join any other tissue and/or bone segments or portions of the foot or other parts of the mammalian (e.g., human) body, such as but not limited to a torn palmar plate.

Referring to the drawings, wherein like reference numerals are used to indicate like or analogous components throughout the several views, and with particular reference to FIGS. 1-9, there is illustrated an exemplary embodiment of an implant system 10 for joining soft tissue to soft tissue, soft tissue to bone, or bone to bone according to the present disclosure. As shown in FIGS. 1-6, the implant system 10 may include a biocompatible collapsible member or first anchor tube 14 (also referred to herein as a "tension anchor 14"), a biocompatible collapsible member or second anchor tube 114 (also referred to herein as a "shuttle anchor 114"), and a suture 12 (also referred to herein as a "tensioning suture 12") that passes through a side wall 16 of the first anchor tube 14 a plurality of times and passes through a side wall 116 of the second anchor tube 114 a plurality of times.

As shown in FIGS. 1-6, the first biocompatible collapsible anchor tube 14 may be elongated along a longitudinal direction. In some embodiments, the first anchor tube 14 may define a longitudinal length within the range of 5 mm and 35 mm, or within the range of 8 mm and 17 mm, or within the range of 10 mm and 15 mm. In the illustrative exemplary embodiment, the first anchor tube 14 defines a longitudinal length of about ½ inch. The first anchor tube 14 may be a size proportion bigger than suture 12. For example, the width or diameter of the first anchor tube 14 may be larger than that of the suture 12.

Figure 4:
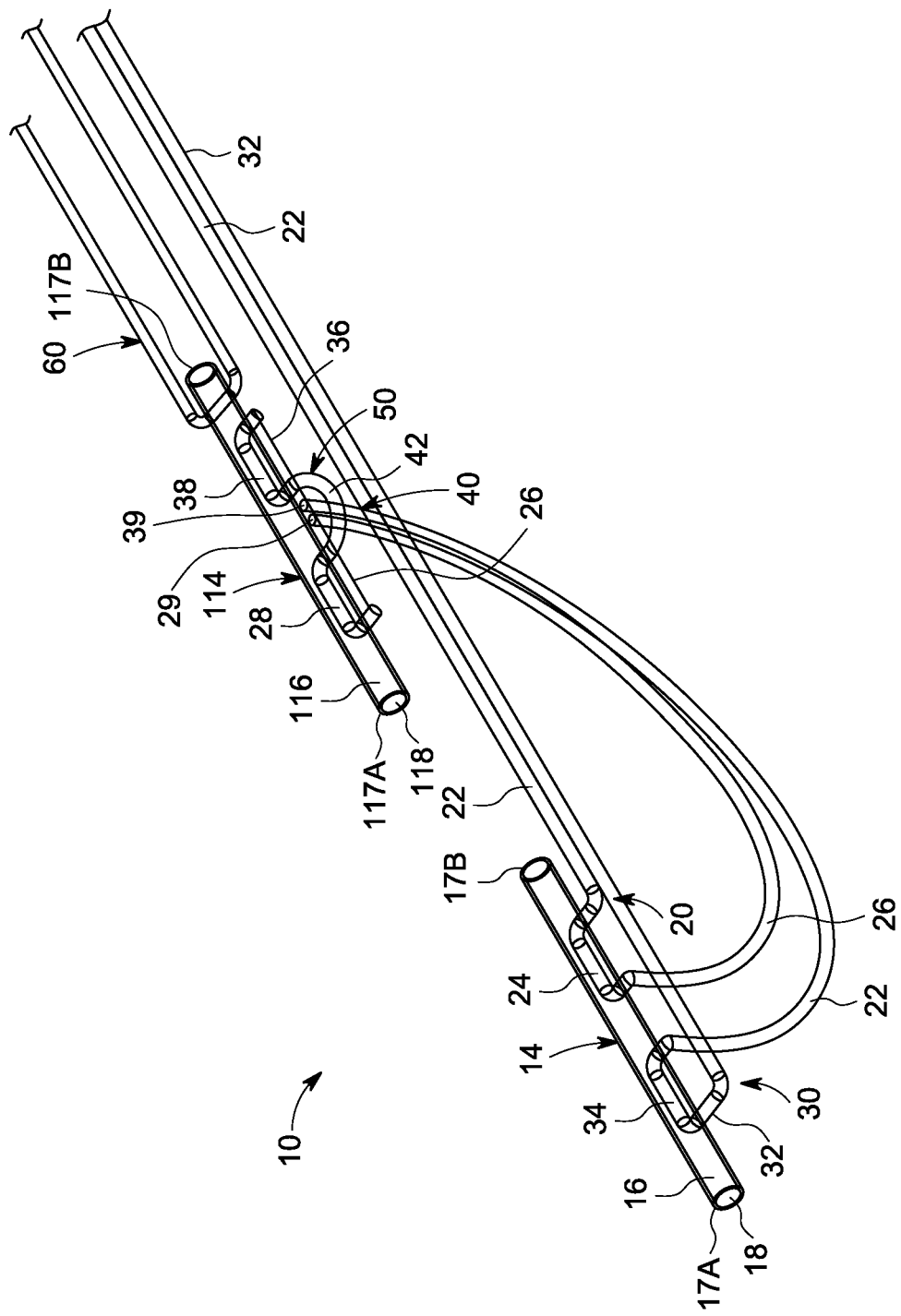
FIG. 4 is a bottom perspective view of the implant system of FIG. 1, in accordance with the present disclosure.
Figure 6:
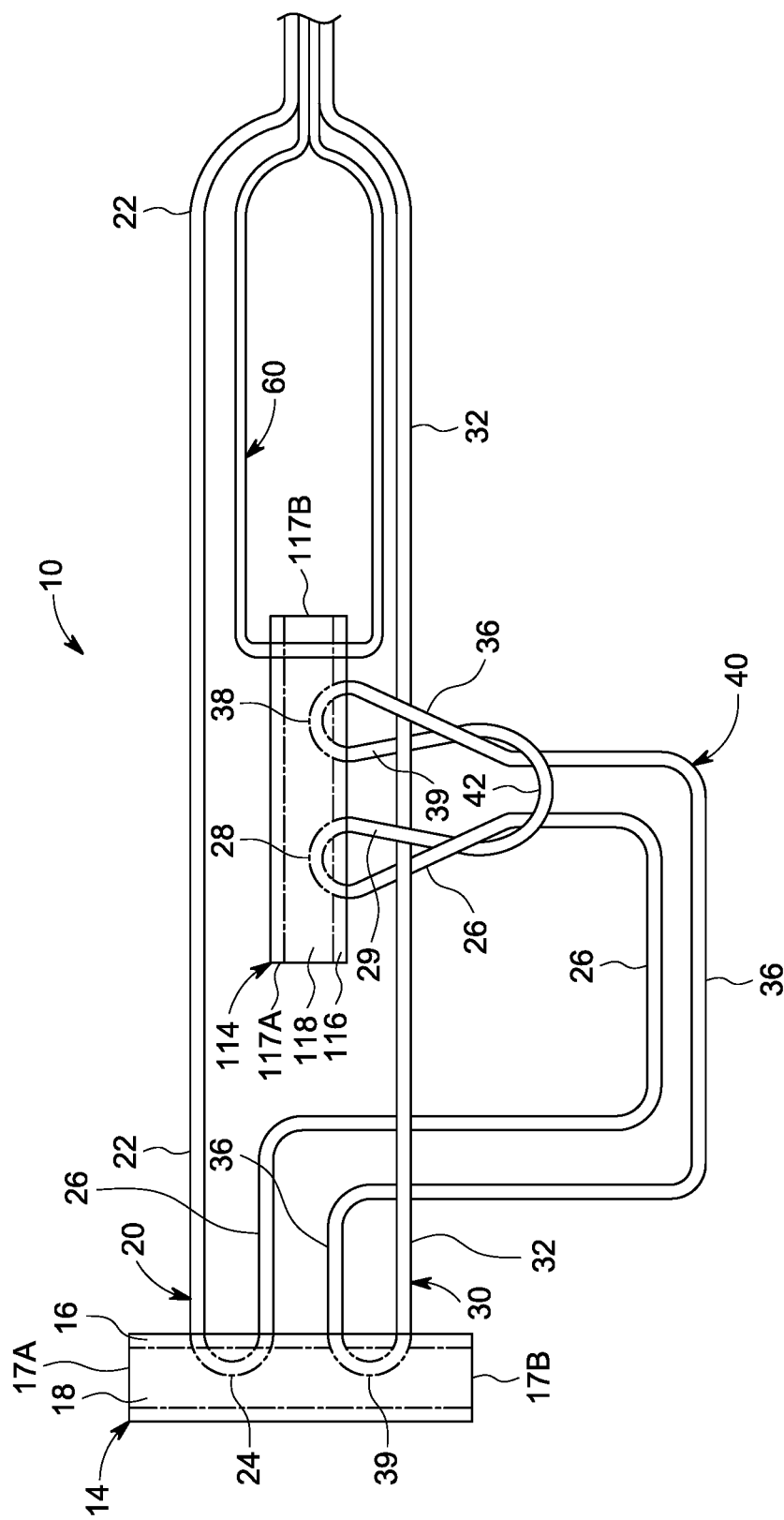
FIG. 6 is a top view depicting the implant system of FIG. 1 illustrating a configuration of end portions of the suture and end portions of a guide suture, in accordance with the present disclosure.

The first anchor tube 14 may be formed of an annular side wall 16 that defines an inner cavity 18 and first and second longitudinal ends 17A, 17B, as shown in FIGS. 1, 2, 4 and 6. The first anchor tube 14 may thereby be hollow. The size of the inner cavity 18 may be larger than the suture 12 such that the suture 12 is able to pass though the inner cavity 18. The inner cavity 18 may extend through the first anchor tube 14 such that the inner cavity 18 is open or accessible at one or both of the longitudinal ends 17A, 17B of the first anchor tube 14. In some embodiments, as shown in FIGS. 1, 4 and 6, the inner cavity 18 may extend entirely through the first anchor tube 14 such that the inner cavity 18 is open or accessible at both of the longitudinal ends 17A, 17B of the first anchor tube 14. In some alternative embodiments (not shown), the inner cavity 18 may extend only partially through the first anchor tube 14 such that the inner cavity 18 is open or accessible at only one of the longitudinal ends 17A, 17B of the first anchor tube 14. In such embodiments, one of the longitudinal ends 17A, 17B of the first anchor tube 14 (and the inner cavity 18) may thereby be closed via an end wall, plug, heat seal or any other configuration (while another longitudinal end of the first anchor tube 14 may be open to the inner cavity 18). In some other alternative embodiments (not shown), both of the longitudinal ends 17A, 17B of the first anchor tube 14 (and the inner cavity 18) may be closed. In this way, the inner cavity 18 may be sealed or closed off within the first anchor tube 14.

The first anchor tube 14 may be flexible, collapsible, deformable, bendable, stretchable or otherwise re-arrangeable in overall shape. For example, in a natural, neutral or non-deformed state as shown in FIGS. 1-4 and 6, the first anchor tube 14 may extend substantially linearly or straight along the longitudinal direction. The first anchor tube 14 may thereby be substantially cylindrical in its natural state, as shown in FIGS. 1-4 and 6. In some embodiments, in the natural state as shown in FIGS. 1-4 and 6, the first anchor tube 14 may extend substantially linearly or straight along the longitudinal direction. The first anchor tube 14 may thereby be substantially cylindrical in its natural state, as shown in FIGS. 1-4 and 6.

Figure 5:
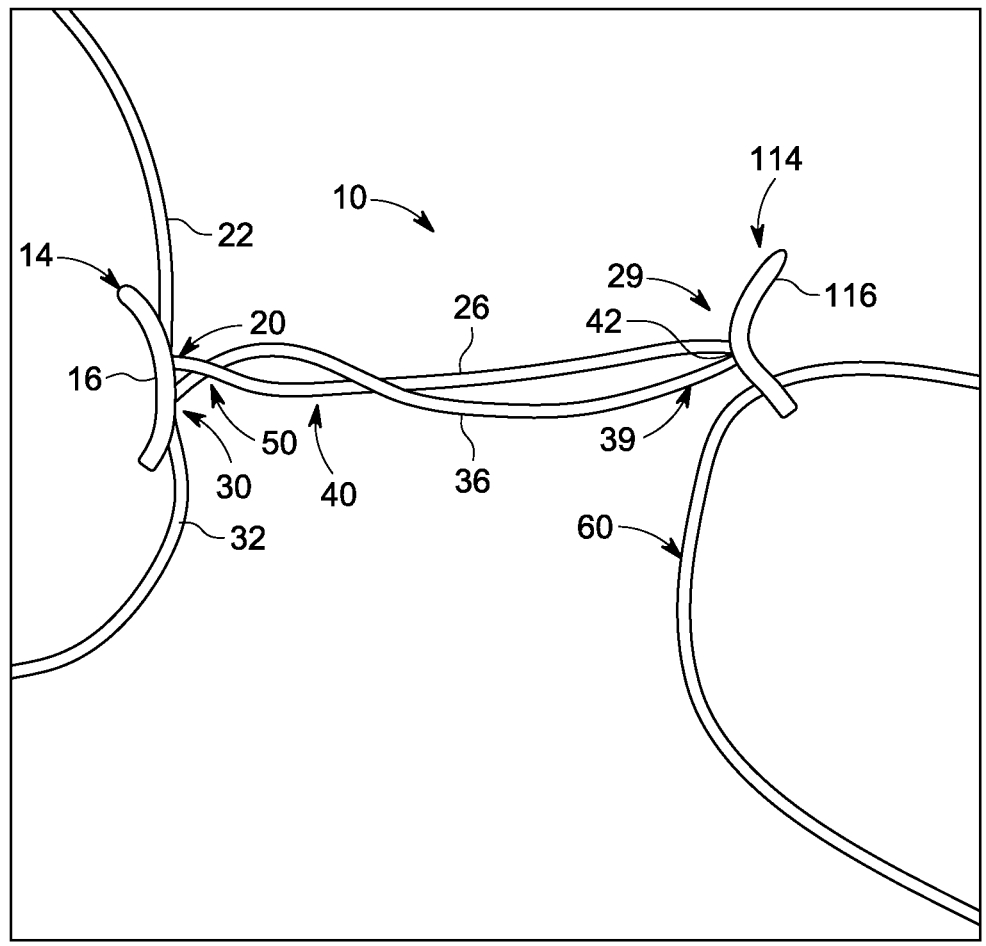
FIG. 5 is a top view of a configuration of the implant system of FIG. 1, in accordance with the present disclosure.
Figure 7:
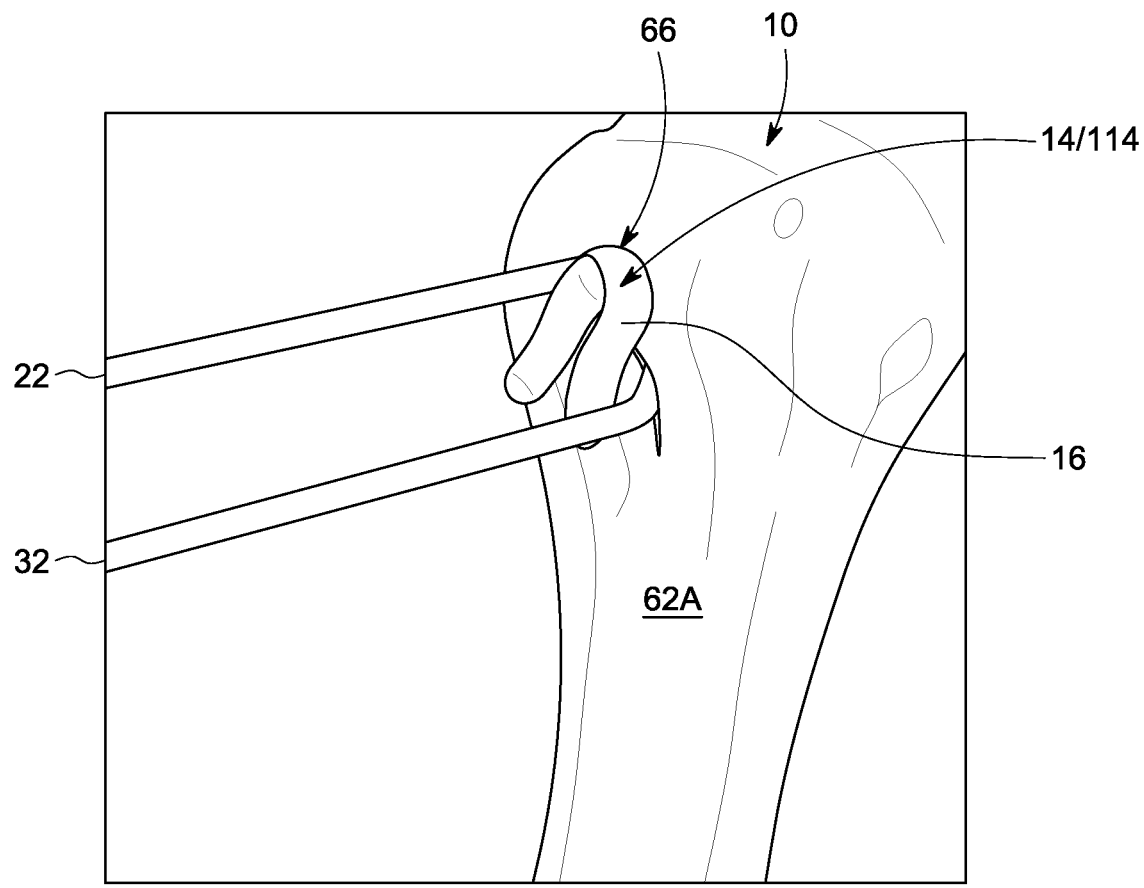
FIG. 7 is a perspective view illustrating the implant system of FIG. 1 implanted within a bone, in accordance with an aspect of the present invention.
Figure 8:
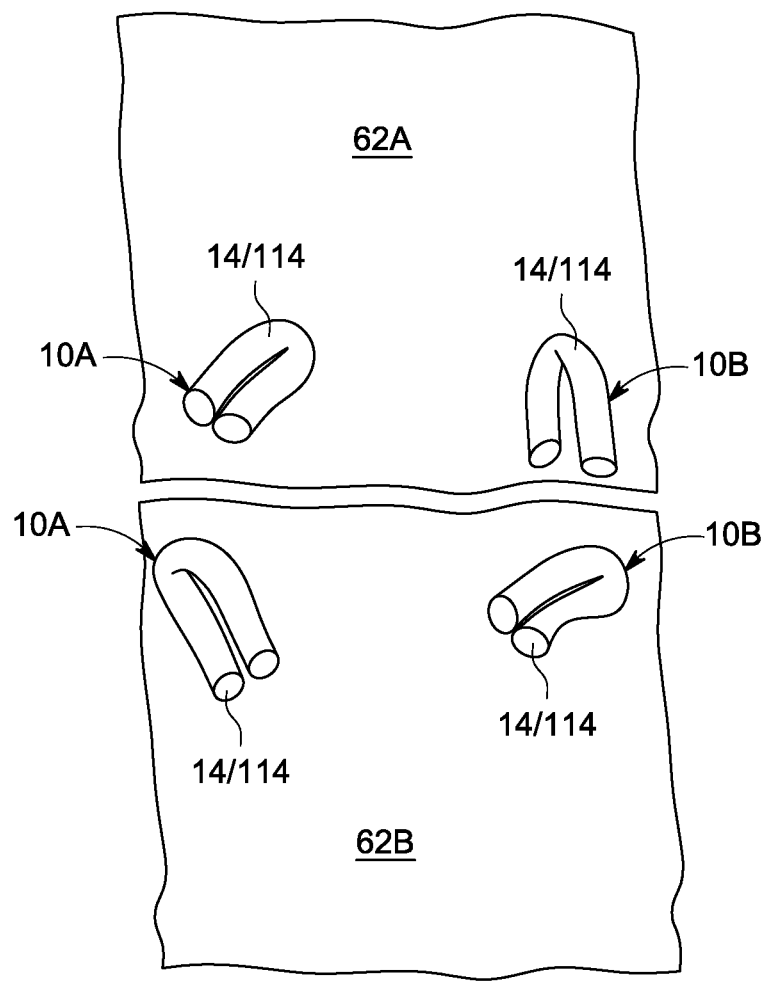
FIG. 8 is a top view illustrating the implant system of FIG. 1 repairing tissue, in accordance with an aspect of the present invention.
Figure 9:
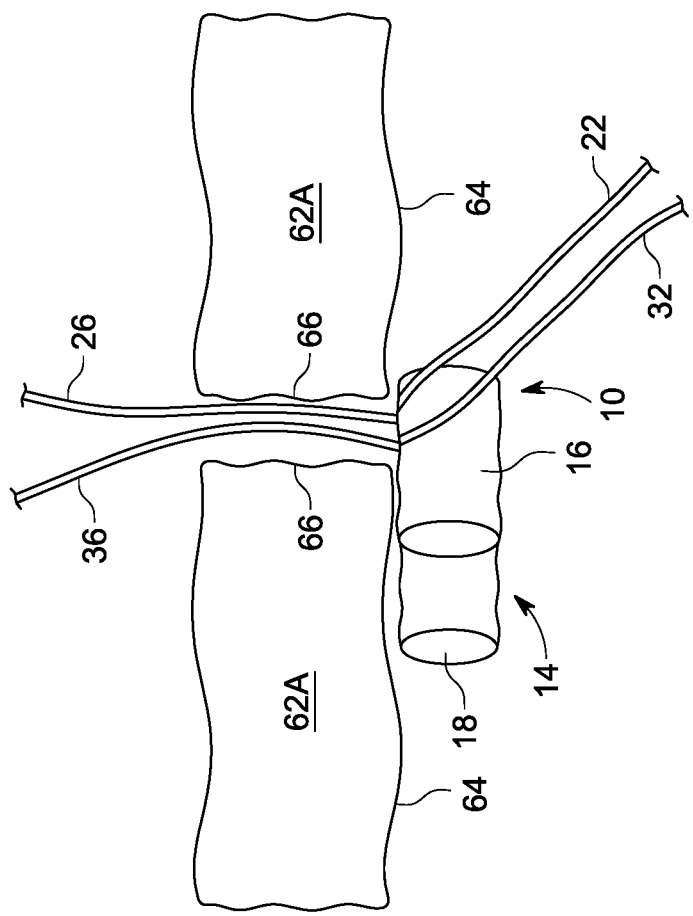
FIG. 9 is a side cross-sectional view illustrating an anchor tube of the implant system of FIG. 1 in a deformed state and pulled against an outer surface of bone and/or tissue, in accordance with an aspect of the present invention.

From the natural state, at least the side wall 16 of first anchor tube 14 may be deformed inwardly such that the inner cavity 18 is at least partially collapsed along a lateral direction. The first anchor tube 14 (e.g., at least the side wall 16 thereof) may also be deformed such that the first anchor tube 14 is curved, bent, compressed or otherwise rearranged from the substantially linear or cylindrical shape in the neutral state to a "bunched" shape. As shown in FIG. 5, the suture 12 may extend through a side or portion of the side wall 16 a plurality of times which may form the first anchor tube 14 into a concave/convex (depending with respect to the portion of the side wall 16 including the suture 12 extending therethrough), arcuate, folded, "C" or "U" and/or "V" shape. For example, the suture 12 may collapse, compress or pull together the side or portion of the side wall 16 such that the first anchor tube 14 assumes a slightly arcuate (e.g., defined by a relatively large radius) or U-shape, as shown in FIG. 5. As shown in FIGS. 7-9, the suture 12 may be tensioned such that the suture 12 further compresses or pulls together the side or portion of the side wall 16 such that the first anchor tube 14 assumes a sharply arcuate (e.g., defined by a relatively small radius) or V-shape.

The first anchor tube 14 (e.g., the side wall 16) may be solid or porous. For example, the first anchor tube 14 (e.g., the side wall 16) may be molded via a solid material. As another example, the first anchor tube 14 (e.g., the side wall 16) may be woven from one or more threads, fibers or filaments. In some embodiments, the first anchor tube 14 (e.g., the side wall 16) may be formed via one or more machining, additive and/or extrusion formation process. The anchor tube 14 (e.g., the side wall 16) may be of one-piece construction or formed of a plurality of members or portions (and/or materials). The first anchor tube 14 (e.g., the side wall 16) may be formed or made from any biocompatible material(s). For example, the first anchor tube 14 (e.g., the side wall 16) may be made or formed of polyester, polyethylene (e.g., ultra-high-molecular-weight polyethylene), polypropylene, nylon (e.g., polyamide), silk, polyglycolic acid (PGA), polydioxanone (PDO), polylactic acid (PLA), polylactic-co-glycoic acid (PLGA), stainless steel, or a combination thereof. In one example, the first anchor tube 14 is formed of polyester.

As shown in FIGS. 1, 2, 4-6 and 8, the second biocompatible collapsible anchor tube 114 may be substantially the same or identical to the first biocompatible collapsible anchor tube 14, and therefore like reference numerals preceded with "1" are used to indicate like components, aspects, functions, processes or functions, and the description above directed to thereto equally applies, and is not repeated for brevity and clarity purposes.

As noted above, the suture 12 passes through a side or portion of the side wall 16 of the first anchor tube 14 a plurality of times and passes through a side or portion of the side wall 116 of the second anchor tube 114 a plurality of times. The suture 12 may be any flexible biocompatible thread, fiber, filament or like member. The suture 12 may be a monofilament suture or a multifilament suture (e.g., a multifilament braided structure). For example, the suture 12 may be a cobraid of two filaments of the same or differing materials. The suture 12 may be made or formed of any biocompatible material, such as any non-absorbable biocompatible material. In some such embodiments, the suture 12 may be made or formed of polypropylene, polyethylene (e.g., ultra-high-molecular-weight polyethylene), nylon (e.g., polyamide), polyester, polyvinylidene difluoride (PVDF), polyglycolic acid (PGA), polydioxanone (PDO), polylactic acid (PLA), polylactic-co-glycoic acid (PLGA), silk, stainless steel or a combination thereof. For example, the suture 12 may be a cobraid of a polyethylene (e.g., ultra-high-molecular-weight polyethylene) filament and a polyester filament. In one example, the suture 12 is formed of polyethylene.

The suture 12 may be any cross-sectional shape. The suture 12 may be any size, such as any length and/or cross-sectional width or diameter. In some embodiments, the suture 12 may be at least 45 cm long, such as within range of 10 cm to 100 cm, or more preferably within range of 40 cm to 90 cm. The suture 12 may be at least a size 6-0 United States Pharmacopeia (USP) designated non-absorbable suture, such as a size 6-0 to 5 USP designated non-absorbable suture, or more preferably a 4-0 to 1 USP designated non-absorbable suture. In some embodiments, the suture 12 may be at least 60 cm long and at least a size 0 USP designated non-absorbable suture, or at least 45 cm long and at least a size 2-0 USP designated non-absorbable suture.

As discussed above, the suture 12 of the implant system 10 is configured or arranged in a pattern that allows the suture 12 to slide freely through the first anchor tube 14. The implant system 10 is configured such that tension applied to the first and second ends or end portions 20, 30 of the suture 12 extending from the first anchor tube 14 causes the suture 12 to slide through the first anchor tube 14 such that the first anchor tube 14 is translated or slid along the suture 12 toward the second anchor tube 114 (i.e., the first and second anchor tubes 14, 114 are drawn together). The length of the suture 12 extending between first and second anchor tubes 14, 114 is thereby shortened. In this way, the first and second anchor tubes 14, 114 can be implanted into bone and/or tissue segments or portions, and the ends or end portions 20, 30 of the suture 12 tensioned to join/repair the segments or portions and draw and maintain them together.

As shown in FIGS. 1, 2 and 4-6, opposing first and second end portions 20, 30 of the suture 12 may each extend through the side wall 16 of the first anchor tube 14. The first end portion 20 of the suture 12 may include a first end suture portion 22 that extends from the free end of the suture 12 and through the side wall 16 of the first anchor tube 14 into the interior cavity 18. As shown in FIGS. 1-6, the first end suture portion 22 of the first end portion 20 of the suture 12 may extend through a first portion or side of the side wall 16 proximate to the first longitudinal end 17A of the first anchor tube 14. Inside of the interior cavity 18, a first interior portion 24 of the first end portion 20 of the suture 12 may extend from the first end suture portion 22 and longitudinally within the interior cavity 18 toward the second longitudinal end 17B of the first anchor tube 14 (that opposes the first longitudinal end 17A), as shown in FIGS. 1, 2, 4 and 6. The first interior portion 24 of the first end portion 20 may extend through the first portion or side of the side wall 16 distal to the first longitudinal end 17A (and proximate to the second longitudinal end 17B) of the first anchor tube 14. In an alternative embodiment (not shown), the first interior portion 24 of the first end portion 20 of the suture 12 may extend from the first end suture portion 22 and longitudinally within the interior cavity 18 toward the first longitudinal end 17A of the first anchor tube 14 (that opposes the second longitudinal end 17B). The first interior portion 24 of the first end portion 20 may thereby extend through the first portion or side of the side wall 16 proximate to the second longitudinal end 17B (and proximate to the first longitudinal end 17A) of the first anchor tube 14.

As shown in FIGS. 1-6, a medial portion 40 of the suture 12 may extend between the first and second anchor tubes 14, 114. As explained further below, the first anchor tube 14 may be slidably adjustable along the medial portion 40 of the suture 12 via tension applied to the first and second end portions 20, 30 such that the first anchor tube 14 is slid along the length of the medial portion 40 of the suture 12. The length of the medial portion 40 of the suture 12 extending between the first and second anchor tubes 14, 114 may thereby be adjusted. In this way, the first and second anchor tubes 14, 114 can be implanted into bone and/or tissue segments or portions, and the end portion of the suture tensioned to join/repair the segments or portions and draw them together.

As shown in FIGS. 1, 2 and 4-6, a first intermediate portion 26 of the medial portion 40 of the suture 12 may extend from the first interior portion 24 of the suture 12 and the side wall 16 of the first anchor tube 14. The first intermediate portion 26 of the suture 12 may also extend to and through a first portion or side of the side wall 116 of the second anchor tube 114 into the interior cavity 118 thereof, as shown in FIGS. 1, 2 and 4-6. As shown in FIGS. 1-6, the first intermediate portion 26 of the medial portion 40 of the suture 12 may extend through a first portion or side of the side wall 116 of the second anchor tube 114 proximate to the first longitudinal end 117A thereof.

Inside of the interior cavity 118 of the second anchor tube 114, a third interior portion 28 of the suture 12 may extend from the first intermediate portion 26 and longitudinally within the interior cavity 118 of the second anchor tube 114 toward the second longitudinal end 117B thereof (that opposes the first longitudinal end 117A thereof), as shown in FIGS. 1, 2, 4 and 6. The third interior portion 28 may extend through the first portion or side of the side wall 116 of the second anchor tube 114 distal to the first longitudinal end 117A (and proximate to the second longitudinal end 117B) of the second anchor tube 114.

As shown in FIGS. 1, 2 and 4-6, the second end portion 30 of the suture 12 may include a second end suture portion 32 that extends from the free end of the suture 12 and through the side wall 16 of the first anchor tube 14 into the interior cavity 18. As shown in FIGS. 1-6, the second end suture portion 32 of the second end portion 30 of the suture 12 may extend through a first portion or side of the side wall 16 proximate to the second longitudinal end 17B of the first anchor tube 14. Inside of the interior cavity 18 of the first anchor tube 14, a second interior portion 34 of the second end portion 30 of the suture 12 may extend from the second end suture portion 32 and longitudinally within the interior cavity 18 toward the first longitudinal end 17A of the first anchor tube 14 (that opposes the second longitudinal end 17B), as shown in FIGS. 1, 2, 4 and 6. The second interior portion 34 of the second end portion 30 may extend through the first portion or side of the side wall 16 distal to the first longitudinal end 17A (and proximate to the second longitudinal end 17B) of the first anchor tube 14. In an alternative embodiment (not shown), the second interior portion 34 of the second end portion 30 of the suture 12 may extend from the second end suture portion 32 and longitudinally within the interior cavity 18 toward the second longitudinal end 17B of the first anchor tube 14 (that opposes the first longitudinal end 17A. The second interior portion 34 of the second end portion 30 may thereby extend through the first portion or side of the side wall 16 distal to the second longitudinal end 17B (and proximate to the first longitudinal end 17A) of the first anchor tube 14.

As shown in FIGS. 1, 2 and 4-6, a second intermediate portion 36 of the medial portion 40 of the suture 12 may extend from the second interior portion 34 of the suture 12 and the side wall 16 of the first anchor tube 14. The second intermediate portion 36 of the suture 12 may also extend to and through a first portion or side of the side wall 116 of the second anchor tube 114 into the interior cavity 118 thereof, as shown in FIGS. 1-6. As shown in FIGS. 1-6, the second intermediate portion 36 of the medial portion 40 of the suture 12 may extend through a first portion or side of the side wall 116 of the second anchor tube 114 proximate to the first longitudinal end 117A thereof.

Inside of the interior cavity 118 of the second anchor tube 114, a fourth interior portion 38 of the suture 12 may extend from the second intermediate portion 36 and longitudinally within the interior cavity 118 of the second anchor tube 114 toward the first longitudinal end 117A thereof (that opposes the second longitudinal end 117B thereof), as shown in FIGS. 1, 2, 4 and 6. The fourth interior portion 38 may extend through the first portion or side of the side wall 116 of the second anchor tube 114 distal to the second longitudinal end 117B (and proximate to the first longitudinal end 117A) of the second anchor tube 114.

As shown in FIGS. 1, 2 and 4-6, a first loop portion 29 of the suture 12 may extend from the third interior portion 28 of the suture 12 and the first portion or side of the side wall 116 of the second anchor tube 114 (proximate to the first end 117A), and a second loop portion 39 of the suture 12 may extend from the fourth interior portion 38 of the suture 12 and the first portion or side of the side wall 116 of the second anchor tube 114 (proximate to the first end 117A). As also shown in FIGS. 1, 2 and 4-6, a third loop portion 42 of the suture 12 extends directly between (and thereby couples) the first and second loop portions 29, 39.

The first loop portion 29 of the suture 12 may extend beneath (or above) the first intermediate portion 26, and the second loop portion 39 of the suture 12 may extend beneath (or above) the second intermediate portion 36, as shown in FIGS. 1, 2 and 4-6. However, as also shown in FIGS. 1, 2 and 4-6, the third loop portion 42 may extend above (or beneath) the first and second intermediate portions 26, 36. In this way, the first, second and third loop portions 29, 39, 42 of the suture 12 form a loop or ring portion 50 of the suture 12 extending from the second anchor tube 114 and around the first and second intermediate portions 26, 36, as shown in FIGS. 1, 2 and 4-6. The loop or ring portion 50 of the suture 12 may fix or secure the suture 12 and the second anchor tube 114 together such that the second anchor tube 114 is unable to slide along the suture 12 (i.e., the suture 12 is prevented from sliding or translating through the second anchor tube 114). The loop or ring portion 50 of the suture 12 may comprise and/or act as a slip knot such that when the first and second end portions 22, 32 are tensioned, the loop or ring portion 50 of the suture 12 tightens the loop or ring portion 50 upon itself and the second anchor tube 114. The pattern or pathway of the suture 12 may also be configured such that when the first and second end portions 22, 32 are tensioned, the suture 12 tightens and pulls the second anchor tube 114 into a concave/convex or folded arrangement or shape, as shown in FIGS. 7-9. Similarly, the pattern or pathway of the suture 12 may also be configured such that when the first and second end portions 22, 32 are tensioned, the suture 12 tightens and pulls the first anchor tube 14 into a concave/convex or folded arrangement or shape, as shown in FIGS. 7-9.

As shown in FIGS. 1, 2 and 4-6, the implant 10 may include an implantation or shuttle suture 60. In some embodiments, the implantation suture 60 may be the same or similar to the suture 12. In some other embodiments, the implantation suture 60 may substantially differ from the suture 12. The implantation suture 60 may extend through the second anchor tube 114, as shown in FIGS. 1, 2 and 4-6. The implantation suture 60 may extend through a first side or portion of the side wall 116 proximate to the end 117B, through the cavity 118 thereof, and through a second side or portion of the side wall 116 proximate to the second end 117B, as shown in FIGS. 1, 2 and 4-6. The implantation suture 60 (or an additional implantation suture 60) may alternatively extend through at least one portion of the side wall 116 proximate to the first end 117A of the second anchor tube 114, at least one portion of the side wall 16 proximate to the first end 17A of the first anchor tube 112, and/or at least one portion of the side wall 16 proximate to the second end 17B of the first anchor tube 14. The implantation suture 60 may enable or facilitate placement or implantation of the implant 10. For example, the implantation suture 60 may pass through a first bone and/or tissue portion (and potentially through a second bone and/or tissue portion) and be utilized (e.g., tensioned) to pull or pass the second anchor tube 114 through the first bone and/or tissue portion (and potentially through the second bone and/or tissue portion). After final positioning or implantation, the implantation suture 60 may be removed (e.g., pulled through) the second anchor tube 114.

To facilitate implantation of the implant, as shown in FIGS. 7-9, the first and second end portions 22, 32 of the suture 12 (and potentially end portions of the implantation suture 60) may be coupled or attached (e.g., tied, swaged or otherwise removably or fixedly coupled) to a needle (e.g., a curved or twisted needle) or other insertion device (not shown). The insertion device may thereby be utilized to pass or translate at least a portion of the implant 10 (e.g., the first and/or send anchor tubes 14, 114) through an aperture 66 extending through the first and second bone and/or tissue portions 62A, 62B.

As shown in FIGS. 7-9, the implant 10 may be implanted such that the first anchor tube 14 is positioned adjacent to or on a first outer surface portion of a first bone and/or tissue portion or segment 62A and the second anchor tube 114 is positioned adjacent to or on a second outer surface portion of a second bone and/or tissue portion or segment 62B. In such a configuration, the first and second intermediate portions 26, 36 of the suture 12 extend through apertures 66 in the first and second bone and/or tissue portions 62A, 62B (and between the first and second anchor tubes 14, 114), as shown in FIGS. 7 and 9.

In some embodiments, implant 10 may be utilized to repair a torn plantar plate. For example, in some such embodiments the first bone and/or tissue portion or segment 62A may be a metatarsal bone, a proximal phalanx bone and/or a first plantar plate portion/segment, and the second bone and/or tissue portion or segment 62B may be a metatarsal bone, a proximal phalanx bone and/or a second plantar plate portion/segment. As shown in FIG. 8, in some embodiments a pair of spaced implants 10 may be used in tandem. For example, a pair of implants 10 may be utilized to provide stability and transverse plane correction/repair of first and second bone and/or tissue portions. When more than one implant 10 is utilized, the implants 10 may be laterally spaced and extend/arranged in a longitudinal manner (as shown in FIG. 8) or crossed/diagonal fashion.

After implantation, the first and second end portions 22, 32 (e.g., positioned outside or exterior of the repair site) may be tensioned such that the first anchor tube 14 is slid along the medial portion 40 of the suture 12 (i.e., along the first and second intermediate portions 26, 36) toward the second anchor tube 114 (i.e., the first and second anchor tubes 14, 114 are drawn together). For example, the first and second end portions 22, 32 may be tensioned or drawn away from each other (i.e., along opposing directions), such as tensioning the first end portion 22 toward the first end 17A and tensioning the second end portion 32 toward the second end 17B of the first anchor tube 14 (or vice versa). As noted above, the pattern or pathway of the suture 12 may fix the second anchor tube 114 along the suture 12. In this way, tensioning of the first and second end portions 22, 32 and translation of the first anchor tube 14 toward the second anchor tube 114 can bring or draw together the first and second bone and/or tissue portions/segments 62A, 62B, and potentially compress the first and second bone and/or tissue portions/segments 62A, 62B together. To fix the implant 10 and the first and second bone and/or tissue portions/segments 62A, 62B in the tensioned configuration, the first and second end portions 22, 32 can be manually tied into one or more knots.

As noted above, tensioning the first and second end portions 22, 32 may also tighten and pull the second anchor tube 114 into a concave/convex or folded arrangement or shape, and tighten and pull the first anchor tube 14 into a concave/convex or folded arrangement or shape, as shown in FIGS. 7-9. The concave/convex or folded arrangement or shape of the first and second anchor tubes 14, 114 may assist in preventing the first and second anchor tubes 14, 114 from passing through the apertures in the first and second bone and/or tissue portions/segments 62A, 62B. As shown in FIGS. 7-9, the tensioning of the first and second end portions 22, 32 may also pull the concave/convex or folded first and second anchor tubes 14, 114 against the outer surface 64 of the respective first and second bone and/or tissue portions/segments 62A, 62B such that further tensioning draws the first and second bone and/or tissue portions/segments 62A, 62B together.

As discussed above, the first and second end portions 22, 32 of the tensioning suture 12 and the end portions of the implantation or shuttle suture 60 may be coupled or attached (e.g., tied, swaged or otherwise removably or fixedly coupled) to a needle (e.g., a curved or twisted needle) or other insertion device utilized to pass or translate at least a portion of the implant 10 (e.g., the tension anchor 14 and/or the shuttle anchor 114) through bone and/or tissue (e.g., a plantar plate), such as to attach (or re-attach) the tissue to the bone and/or to repair a tear in the tissue. An exemplary insertion needle 70 for insertion/implantation of the implant 10 is shown in FIGS. 10-13.

As shown in FIGS. 10-13, the first and second end portions 22, 32 of the tensioning suture 12 and/or the end portions of the shuttle suture 60 may be swaged or otherwise removably or fixedly coupled to a base connection portion 72 of the needle 70. The first and second end portions 22, 32 of the tensioning suture 12 and/or the end portions of the shuttle suture 60 may be securely coupled to the base portion 72 (e.g., via crimping of the base portion) of the needle 70 such that tension forces (e.g., of at least 5 lbs) on the tensioning suture 12 and the shuttle suture 60 does not cause the disconnecting or decoupling from the needle 70 (such as, for example, when the needle 70 is utilized to pull through the tension anchor 14 and/or the shuttle anchor 114 through bone and/or tissue). For example, in some embodiments the first and second end portions 22, 32 of the tensioning suture 12 and/or the end portions of the shuttle suture 60 may be swaged in an open end (e.g., a drilled end) of the base portion 72 of the needle 70 (e.g., via crimping of the hollow base portion 72) in such a configuration that forms a retention force against pull-out of the first and second end portions 22, 32 and/or the end portions of the shuttle suture 60 via tension thereof of at least 5 lbs.

Figure 10:
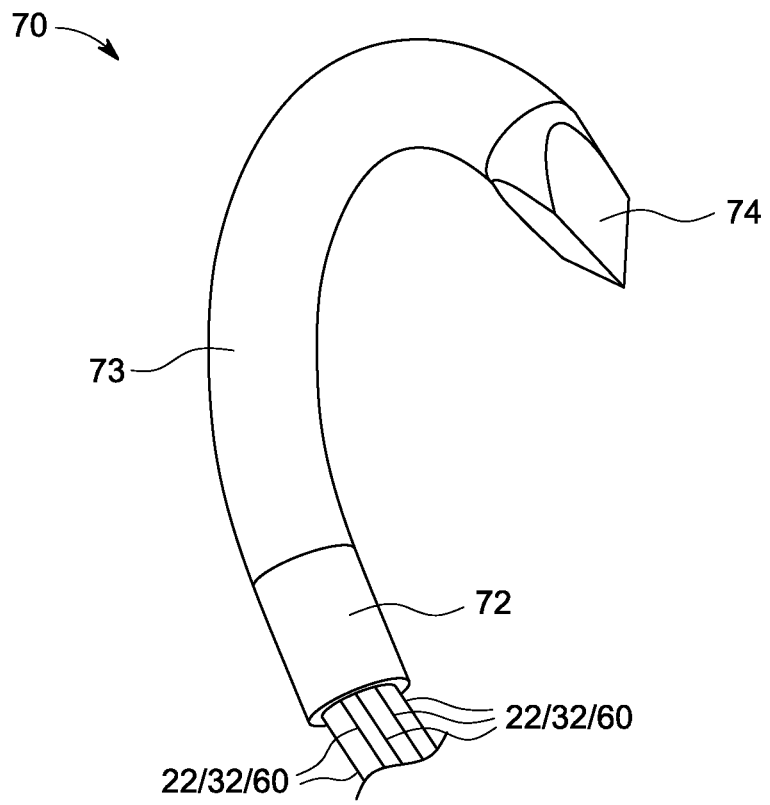
FIG. 10 is a perspective view of an exemplary insertion needle for facilitating the implantation of the implant system of FIG. 1, in accordance with the present disclosure.
Figure 11:
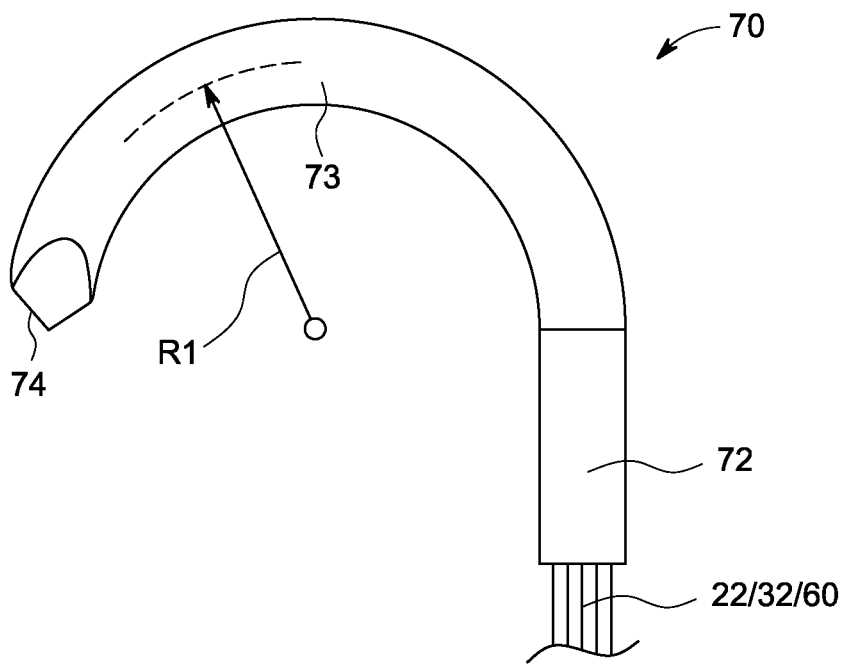
FIG. 11 is a side view of the insertion needle of FIG. 10, in accordance with the present disclosure.
Figure 12:
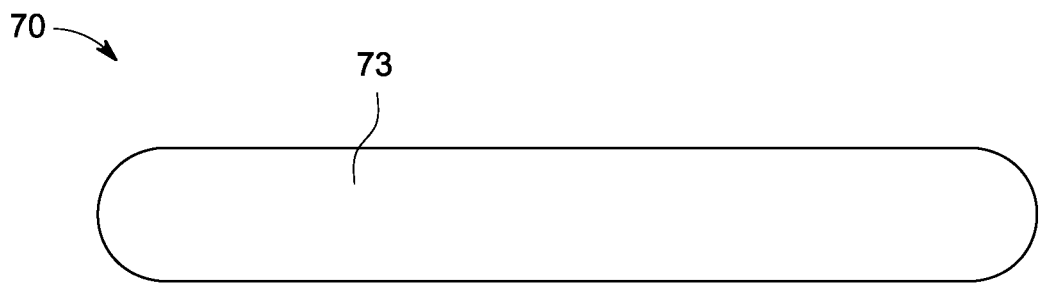
FIG. 12 is a top view of the insertion needle of FIG. 10, in accordance with the present disclosure.
Figure 13:
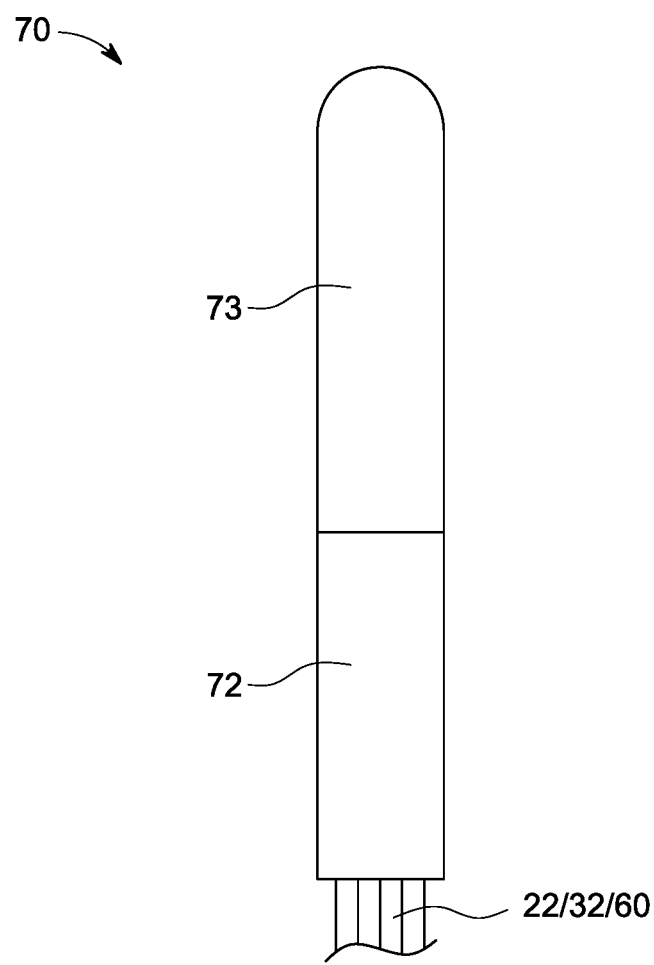
FIG. 13 is a back view of the insertion needle of FIG. 10, in accordance with the present disclosure.

As shown in FIGS. 10, 11 and 13, the base portion 72 of the needle 70 may be linear/straight. In other embodiments, the base portion 72 of the needle 70 may be curved and/or rectilinear. A main body portion 73 of the needle 70 may extend from the base connection portion 72 to a tip portion 74 of the needle 70, as shown in FIGS. 10-13. The cross-sectional size and shape of the needle 70 and the configuration of the tip portion 74 may be configured to create (and/or translate through) a non-traumatic hole through tissue (and potentially bone) that allows for the tension anchor 14 and/or the shuttle anchor 114 of the implant 10 to pass through the tissue (and potentially bone) without causing unnecessary damage to the tissue (and potentially bone) while retaining optimal pullout/coupling strength performance of the first and second end portions 22, 32 of the tensioning suture 12 and the end portions of the shuttle suture 60 to the base portion 72. As shown in FIGS. 10-13, the body portion 73 of the needle 70 (and potentially the base portion 72) may comprise a circular cross-sectional shape. In some such embodiments, the body portion 73 of the needle 70 (and potentially the base portion 72) may comprise a circular cross-sectional shape with an outer diameter that is less than or equal to about 0.1 inches, or within the range of about 0.02 inches to about 0.08 inches. In the exemplary illustrated embodiment shown in FIGS. 10-13, the body portion 73 of the needle 70 (and potentially the base portion 72) comprises a circular cross-sectional shape with an outer diameter of about 0.05 inches.

The body portion 73 (and potentially the base portion 72) of the needle 70 may be arcuate. For example, in some embodiments the body portion 73 (and potentially the base portion 72) may be defined by a single relatively small radius of curvature R1, as shown in FIG. 11, to facilitate use of the needle 70 (and implant 10) in a relatively small joint space, such as in a plantar plate repair. The body portion 73 (and potentially the base portion 72 and/or tip portion 74) may thereby arcuately extend along a plane, as shown in FIGS. 11-13. In some such embodiments, the radius of curvature R1 of the body portion 73 (and potentially the base portion 72) may be less than about 5 mm, or within the range of about 2 mm and about 4 mm. In the exemplary illustrated embodiment shown in FIGS. 10-13, the radius of curvature R1 of the body portion 73 is about 2.5 mm, about 3 mm, about 3.5 mm or about 4 mm. As such, the needle 70 as a whole may define a maximum width or height that is equal to or less than about 10 mm, or about 8 mm.

As shown in FIG. 11, the body portion 73 may extend for a length (e.g., arc length) such that the tip portion 74 is pointed or extends back toward the direction that the base portions 72 extends (i.e., the tip portion 74 and/or the portion of the body portion 73 proximate to the tip portion 74 may be in the same or substantially similar direction as the direction that the base portions 72 extends). In some embodiments, the tip portion 74 and/or the portion of the body portion 73 proximate to the tip portion 74 may extend in a direction away from the base portion 72 (e.g., upwardly away from the base portion 72), as shown in FIG. 11. As such, the body portion 73 (with potentially the tip portion 74) may extend at least about 45 degrees or at least about 60 degrees, and potentially up to about 90 degrees (e.g., define a semicircular or partial-semicircle shape).

The tip portion 74 of the needle 70 may define a relatively sharp puncturing point, tip or free end. For example, the tip portion 74 may include flat, flutes or the like that extend from the outer surface to or towards the free end or tip. In some embodiments, the tip portion 74 may comprise a trocar tip of a three-sided pyramidal shape, as shown in FIGS. 10 and 11. However, the tip portion 74 of the needle 70 may define any shape or tip effective in puncturing tissue and/or bone.

Figure 14:
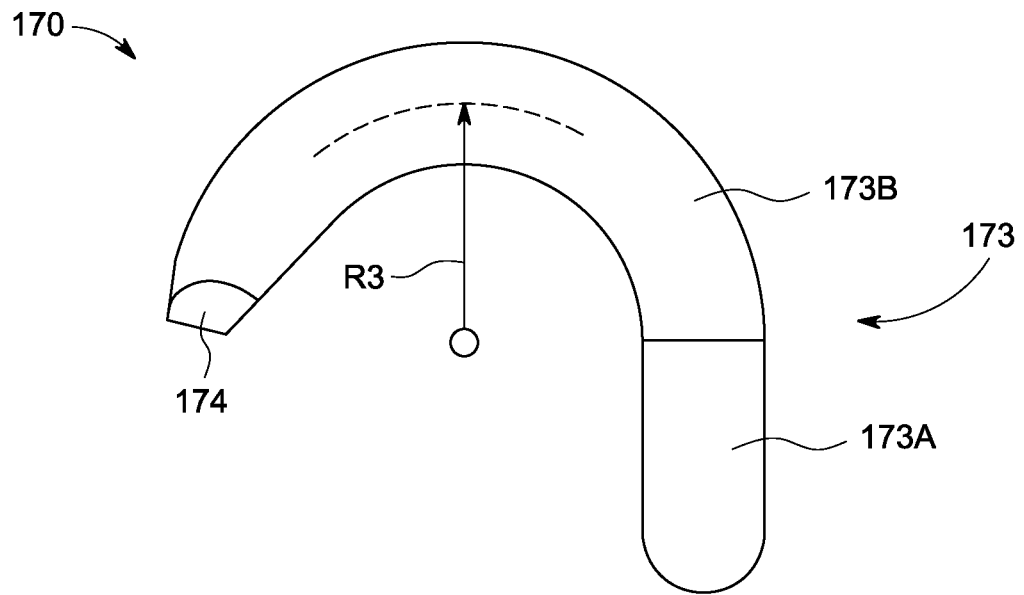
FIG. 14 is a top view of another exemplary insertion needle for facilitating implantation of the implant system of FIG. 1, in accordance with the present disclosure.
Figure 15:
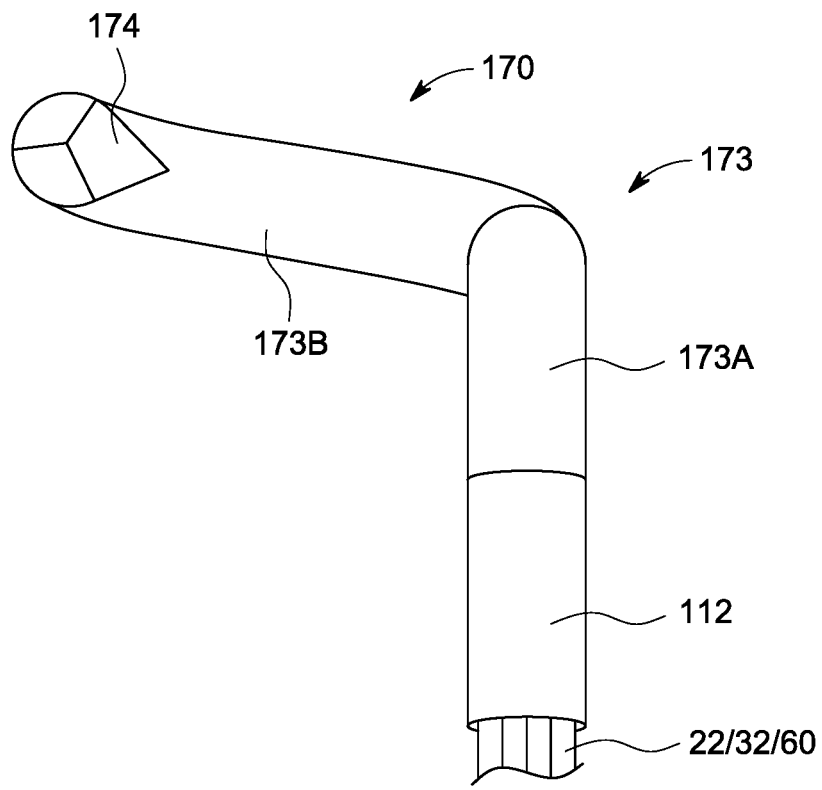
FIG. 15 is a front view of the insertion needle of FIG. 14, in accordance with the present disclosure.
Figure 16:
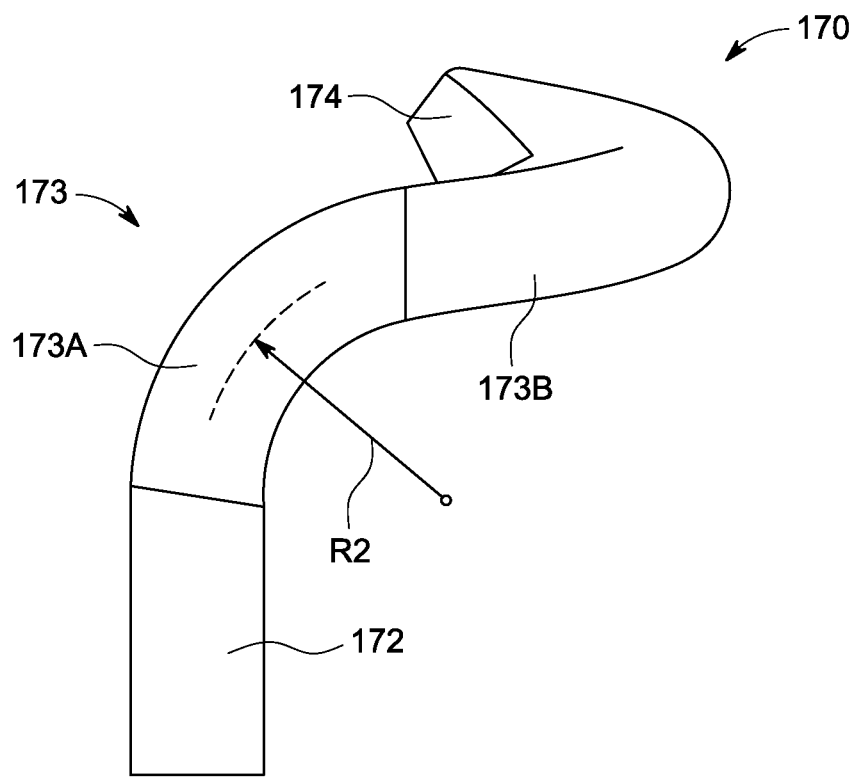
FIG. 16 is a side view of the insertion needle of FIG. 14, in accordance with the present disclosure.

FIGS. 14-16 illustrate another exemplary insertion needle 170 for insertion/implantation of the implant 10 shown in FIGS. 10-13. The insertion needle 170 of FIGS. 14-16 is substantially similar to the insertion needle 70 of FIGS. 11-13, and therefore like reference numerals preceded with "1" are used to indicate like components, aspects, functions, processes or functions, and the description above directed to thereto equally applies, and is not repeated for brevity and clarity purposes. As shown in FIGS. 14-16, the needle 170 differs from needle 70 in that the arcuate body portion 173 is defined by a plurality of radii. Specifically, as shown in FIGS. 14-16, the body portion 173 comprises a first arcuate portion 173A that extends from the base portion 172 and is defined by a first radius R2, and a second arcuate portion 173B that extends between the first arcuate portion 173A and the tip portion 174 and is defined by a second radius R3. The first radius R2 and second radius R3 are angled with respect to each other such that the body portion 173 extends or lies in two planes. The first radius R2 and second radius R3 may be different magnitudes/lengths or the same magnitude/length. In some such embodiments, the arc length of the first arcuate portion 173A may be smaller than the arc length of the second arcuate portion 173B. It is noted that the first arcuate portion 173A and/or the second arcuate portion 173B may be defined by a single radius or a plurality of radii.

FIG. 15 illustrates another exemplary insertion needle 270 for insertion/implantation of the implant 10 shown in FIGS. 10-13. The insertion needle 270 of FIG. 15 is substantially similar to the insertion needle 170 of FIGS. 14-16, and therefore like reference numerals preceded with "2" are used to indicate like components, aspects, functions, processes or functions, and the description above directed to thereto equally applies, and is not repeated for brevity and clarity purposes. As shown in FIG. 15, the needle 270 differs from needle 170 in that the base portion 272 (potentially swaged with the first and second end portions 22, 32 and/or the end portions of the shuttle suture 60) is arcuate. The base portion 272 arcuately extends to the first arcuate portion 273A, and may be defined by the second radius R3. As such, the base portion 272 and the first arcuate portion 273A may form a curved portion of the needle 270 defined by a single radius R3 (and thereby extends/lies along a plane).

As discussed above, an insertion device or driver may be utilized to pass or translate at least a portion of the implant 10 (e.g., the tension anchor 14 and/or the shuttle anchor 114) through bone and/or tissue (e.g., a plantar plate) via an insertion needle, such as to attach (or re-attach) the tissue to the bone and/or to repair a tear in the tissue. An exemplary insertion needle 70 for insertion/implantation of the implant 10 is shown in FIGS. 10-13. An exemplary insertion driver or device 80 for insertion/implantation of an insertion needle, such as the insertion needle 70 shown in FIGS. 10-13, into/through tissue and/or bone is shown in FIGS. 18-22.

Figure 20:
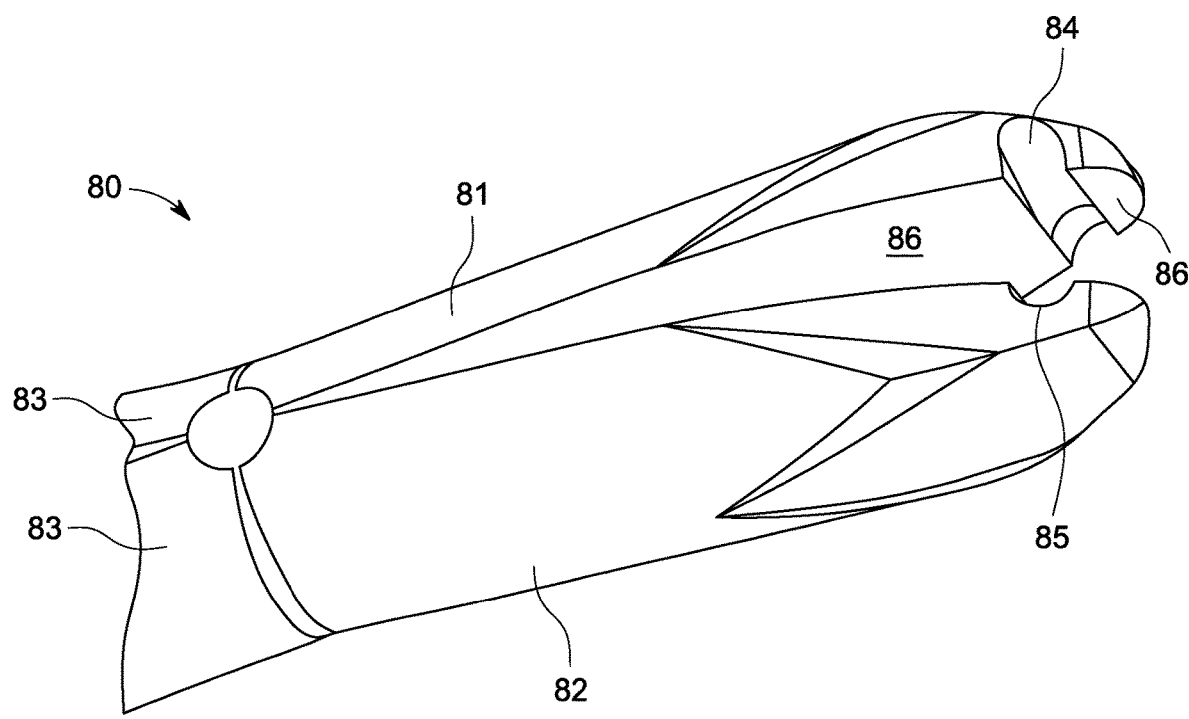
FIG. 20 is an enlarged bottom perspective view of the needle engagement portion of the needle driver of FIG. 18, in accordance with the present disclosure.
Figure 21:
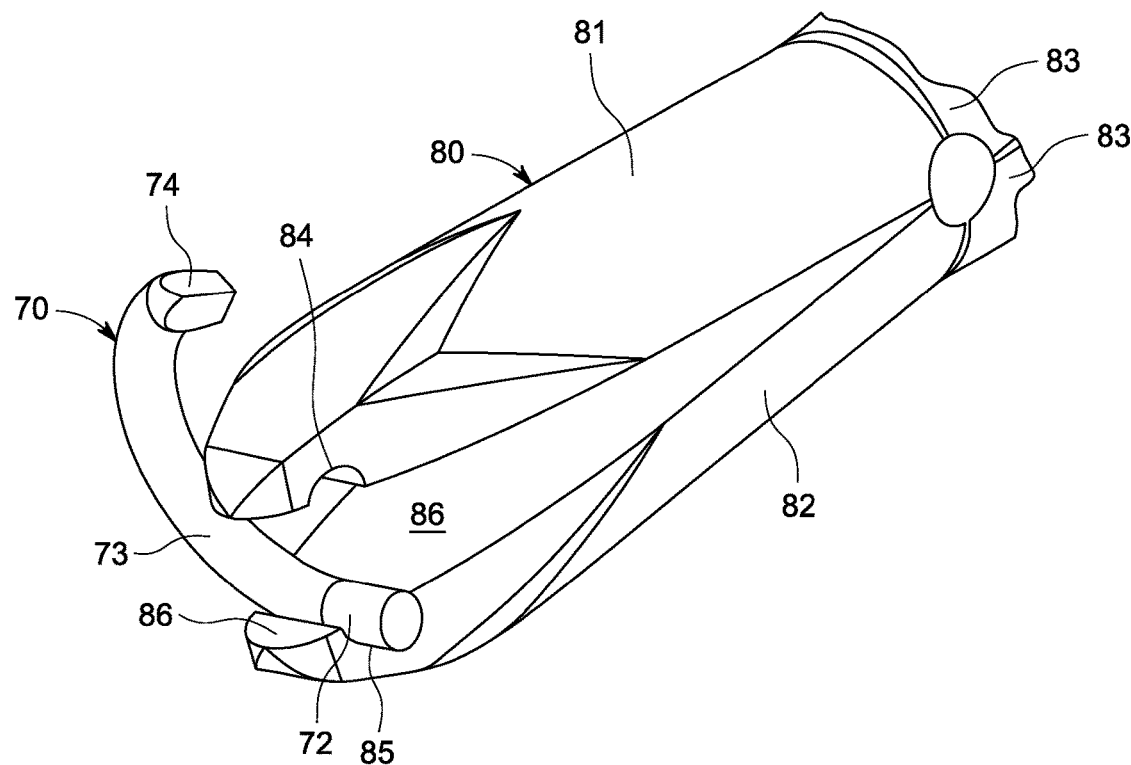
FIG. 21 is an enlarged elevational perspective view of the needle engagement portion of the needle driver of FIG. 18 in an open position and engaged with the insertion needle of FIG. 10, in accordance with the present disclosure.
Figure 22:
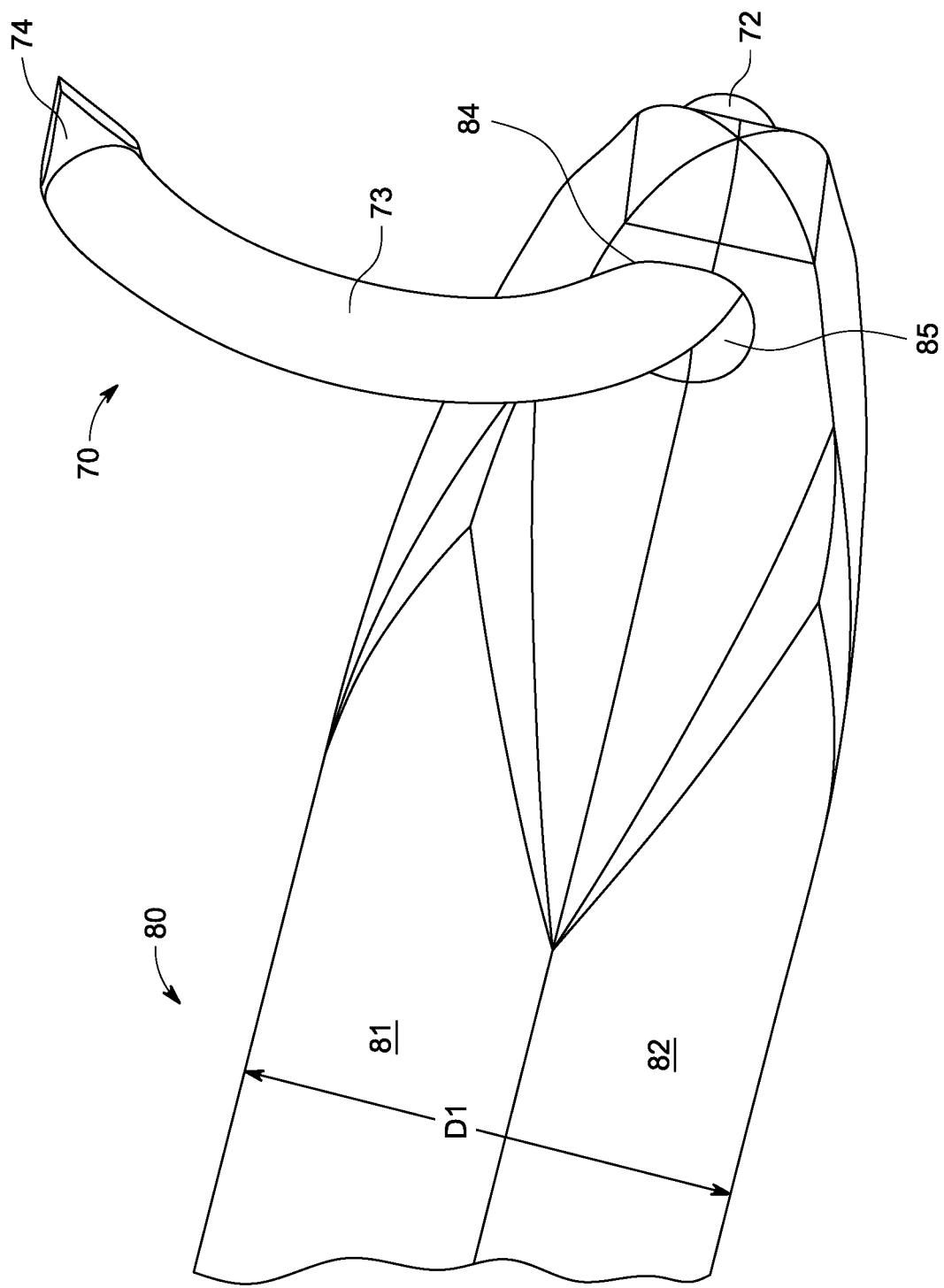
FIG. 22 is an enlarged elevational perspective view of the needle engagement portion of the needle driver of FIG. 18 in a closed position and engaged with the insertion needle of FIG. 10, in accordance with the present disclosure.

As shown in FIGS. 19-22, the insertion driver 80 may comprise a pair of handle portions 83 coupled or extending from a first or upper jaw 81 and a second or lower jaw 82. The first and second jaws 81, 82 are hinged such that manual movement of the handle portions 83 toward (or away) from each other pivotably moves or closes the first and second jaws 81, 82 toward each other and, potentially ultimately, inner surfaces 86 thereof into contact, as shown in FIG. 22. Conversely, manual movement of the handle portions 83 away (or toward) from each other pivotably moves or opens the first and second jaws 81, 82 away from each other (i.e., the inner surfaces 86 thereof move away from each other), as shown in FIGS. 18-21.

The first and second jaws 81, 82 (and potentially the handle portions 83) may be elongated along an axis of the insertion driver 80. As shown in FIGS. 18-22, in some embodiments tip portions of the first and second jaws 81, 82 that form free ends narrow or taper as they extend to the free ends such that the free end of the insertion driver 80, as a whole, comprises a pointed or tapered tip (potentially relatively blunt) when in the closed arrangement as shown in FIG. 22. In some embodiments, the first and second jaws 81, 82 (and potentially the handle portions 83) may cooperate to form an outer circular or elliptical shape or cross-section when mated together, such as in the closed arrangement, as shown in FIG. 22. In the closed arrangement, the outer surfaces of the first and second jaws 81, 82 may form a generally cylindrical shape with a maximum outer diameter or width/height D1 that is less than or equal to about 10 mm, or within the range of about 4 mm and about 10 mm, or within the range of about 6 mm and about 10 mm. In the exemplary illustrated embodiment shown in FIGS. 18-22, the outer surfaces of the first and second jaws 81, 82 form a generally cylindrical shape with a maximum outer diameter or width/height D1 of 8 mm when in the closed arrangement as shown in FIG. 22. The size and shape of the first and second jaws 81, 82 advantageously allows for the driver 80 to be used in a tight joint space, for example.

As shown in FIGS. 18-22, the inner surfaces 86 of the first and second jaws 81, 82 include a first groove 84 and a second groove 85, respectively, for engagement with an insertion/implantation needle of the implant 10 such that the driver 80 can be used to manipulate the insertion/implantation needle and pass the insertion/implantation needle into and through tissue and/or bone. The first and second grooves 84, 85 correspond with the size and preferred angular alignment of the insertion/implantation needle of the implant 10, such as the exemplary insertion needles 70, 170 or 270. The first and second grooves 84, 85 of the first and second jaws 81, 82 are configured to engage and securely hold therein at least a portion of the base portion and/or the body portion of the corresponding needle to fix the needle in a particular orientation, and resist torsional forces during implantation of the needle (i.e., needle passing) to prevent the needle from twisting, displacing or otherwise moving with respect to the driver 80 (i.e., the first and second grooves 84, 85 prevent movement of the insertion needle with respect to the driver 80 in all directions when the insertion needle is clamped or held therein/therebetween).

Figure 18:
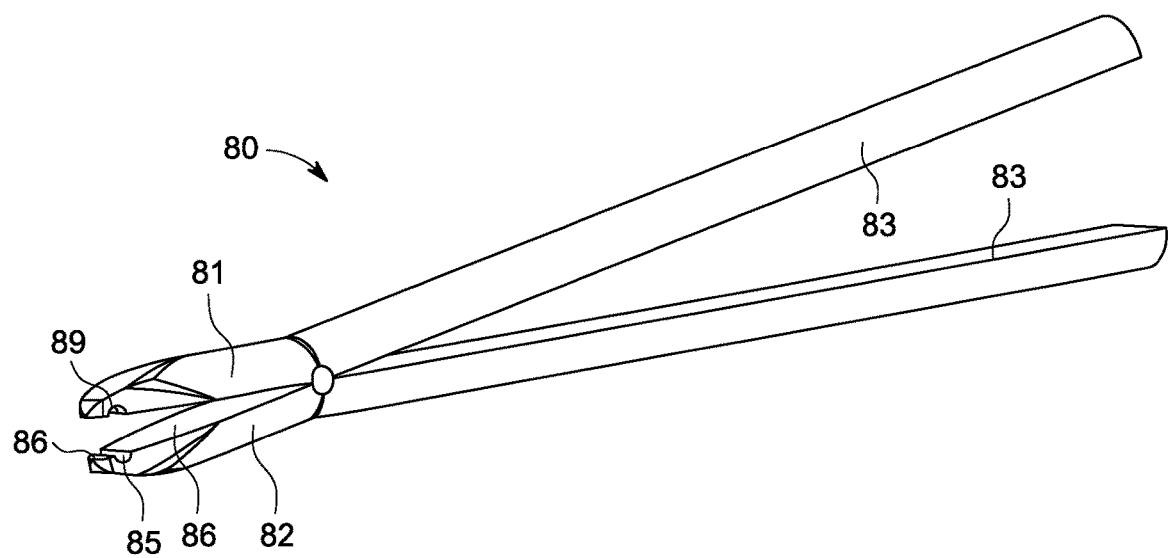
FIG. 18 is an elevational perspective view of an exemplary needle driver for engagement of an insertion needle and facilitating the implantation of the implant system of FIG. 1, in accordance with the present disclosure.
Figure 19:
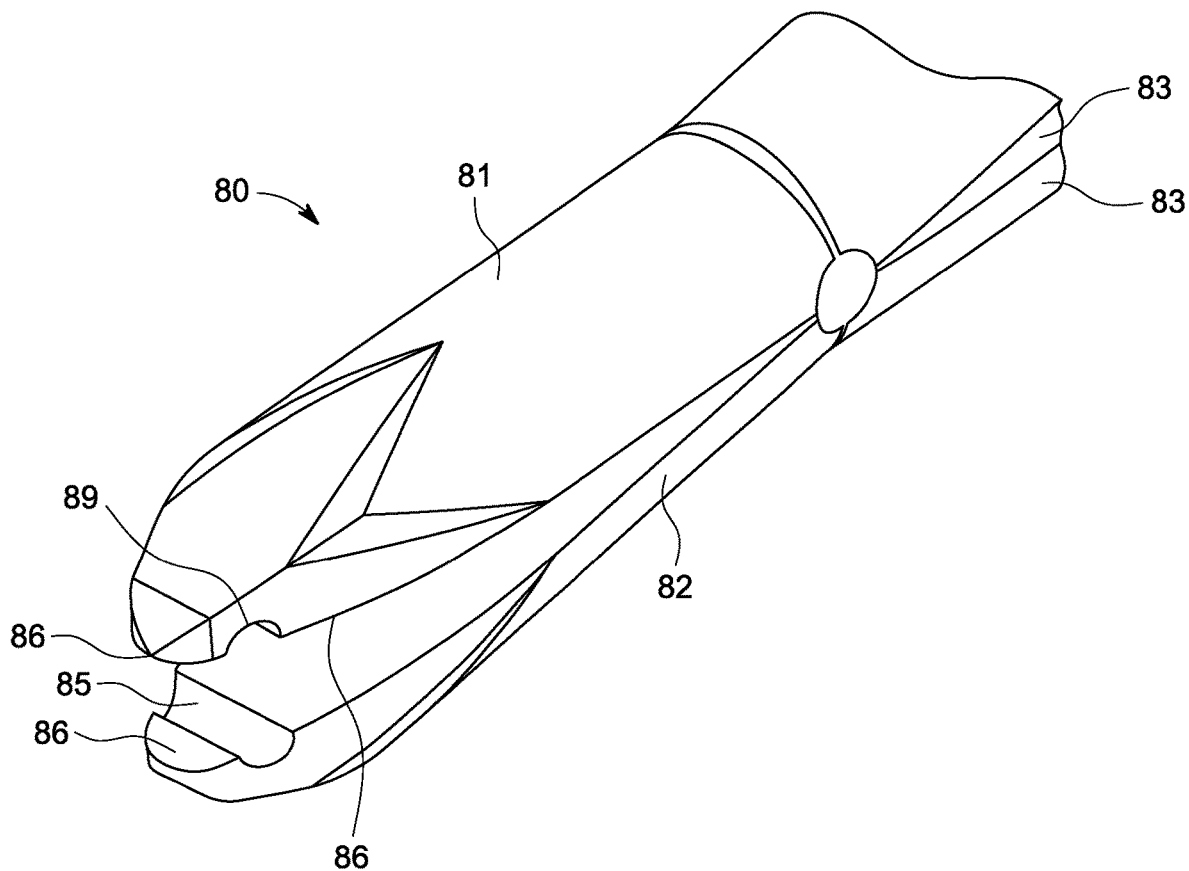
FIG. 19 is an enlarged elevational perspective view of a needle engagement portion of the needle driver of FIG. 18, in accordance with the present disclosure.

For example, as shown in FIGS. 21 and 22 in conjunction with the needle 70 of FIGS. 10-13, the second groove 85 in the inner surface 86 of the second jaw 82 may be configured to engage and contain a back side portion of the base portion 72 and/or the body portion 73. In some such embodiments, the second groove 85 may be linear, and potentially include a constant depth as it extends across a width of the inner surface 86 of the second jaw 82, as shown in FIGS. 18, 19 and 21. The second groove 85 may thereby be configured to retain the needle 70 therein and prevent the needle 70 from rotating or reorienting along a plane that lies parallel to the inner surface 86 (e.g., rotating about an axis that is normal to the inner surface 86) and a plane that lies perpendicular to the inner surface 86 (e.g., rotating about a longitudinal axis of the second jaw 82), but allow rotation of the needle 70 about an axis of the needle 70 (such as an axis of the base portion 72).

As also shown in FIGS. 21 and 22 in conjunction with the needle 70 of FIGS. 10-13, the first groove 84 in the inner surface 86 of the first jaw 81 may be configured to engage and contain a front side portion of the base portion 72 and the body portion 73. In some such embodiments, the first groove 84 may be arcuate to match or correspond to an arcuate portion of the needle 70, such as an arcuate portion of the body portion 73 of the needle 70, as shown in FIG. 22. For example, as shown in FIGS. 20 and 22, a side portion of the first groove 84 may arcuately deepen as it extends across a width of the inner surface 86 of the first jaw 81. The arcuately deepening portion of the first groove 84 may thereby engage and retain/accept an arcuate portion of the body portion 73 of the needle 70, as shown in FIG. 22. The first groove 84 may thereby be configured to retain the needle 70 therein and prevent the needle 70 from rotating or reorienting about the axis of the base portion 72 (as well as preventing rotation or reorientation of the needle 70 along a plane that lies parallel to the inner surface 86 (e.g., rotating about an axis that is normal to the inner surface 86) and a plane that lies perpendicular to the inner surface 86 (e.g., rotating about a longitudinal axis of the second jaw 82), but allow rotation of the needle 70 about an axis of the needle 70 (such as an axis of the base portion 72)).

It is noted that the first and second grooves 84, 85 do not interfere with the inner surfaces 86, 86 of the first and second jaw 81, 82 from engaging each other and/or engaging a member or portion positioned therebetween (via operation of the handle portions 83, 83). The driver 80 can thereby be utilized to securely engage/hold and manipulate items via the inner surfaces 86, 86 of the first and second jaw 81, 82 and/or utilized to securely engage/hold and manipulate an insertion needle via the first and second grooves 84, 85 of the first and second jaw 81, 82.

Turning to FIGS. 23A-23F, an exemplary method of joining tissue segments of a foot from a plantar approach via a tissue and/or bone joining implant system, an insertion needle and a needle driver, in accordance with the present disclosure, is illustrated. Specifically, the method illustrates joining/repairing segments 62A, 62B of a torn plantar plate via a plantar approach. However, the method may equally apply (in whole or in parts (e.g., at least one or more portions or aspects thereof)) to joining other tissue segments of the foot or tissue segments of another body part of a mammalian patient, and/or may equally apply (in whole or in parts (e.g., at least one or more portions or aspects thereof)) to joining bone segments and/or tissue and bone segments, and/or may equally apply (in whole or in parts (e.g., at least one or more portions or aspects thereof)) via a dorsal or other/differing directional approach.

Figure 17:
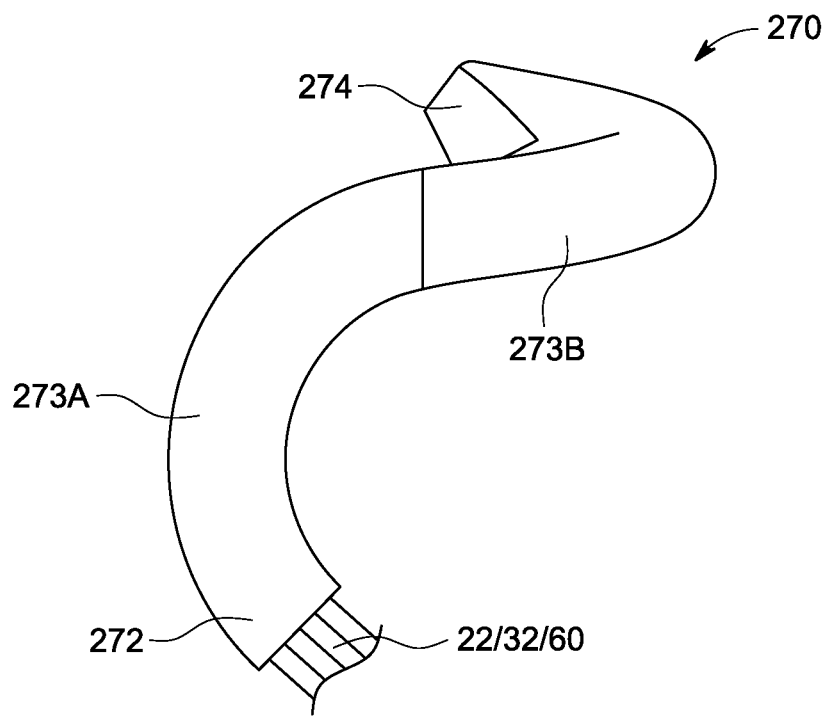
FIG. 17 is a side view of another exemplary insertion needle for facilitating implantation of the implant system of FIG. 1, in accordance with the present disclosure.

As shown in FIGS. 23A-23F, the tissue segment joining method may utilize an implant system that is the same or similar to the implant system 10 of FIGS. 1-9, an insertion needle that is the same or similar to the of insertion needle 70 of FIGS. 10-13 (and/or the insertion needle 170 of FIGS. 14-16 and/or the insertion needle 270 of FIG. 17) swaged to the end portions 22 of the suture 12 and the end portions of the strands of the shuttle suture 60, and/or a needle driver that is the same or similar to the needle driver 80 of FIGS. 18-22.

In some embodiments, the method may include making an incision proximate to the plantar plate tissue segments 62A, 62B (the position and configuration of which may be made according to surgeon preference) in the plantar side of the patient's foot. In some embodiments, the method may include engaging the edges of the incision and/or underlying tissue with a retractor or retractor system (such as the retractor system 600 discussed below with respect to FIGS. 31-36), and expanding, separating, opening or otherwise spreading apart the edges of the incision and the underlying tissue so that the plantar plate segments 62A, 62B can be accessed (e.g., become exposed). In some embodiments, the retractor or retractor system may hold back or retain the edges of the incision and the underlying tissue in the opened arrangement to maintain access to the plantar plate segments 62A, 62B during the repair.

In some embodiments, the method may include dissecting the tissue and/or joint associated with the plantar plate tissue segments 62A, 62B to at least partially expose the plantar plate tissue segments 62A, 62B. In some embodiments, the method may include performing a Weil osteotomy, and the bone(s) and/or tissue secured, such as with at least one wire, pin, screw or the like. In some embodiments, the method may then include distracting the joint associated with the plantar plate tissue segments 62A, 62B, such as via a small joint distractor.

Figures 23A, 23B, 23C:
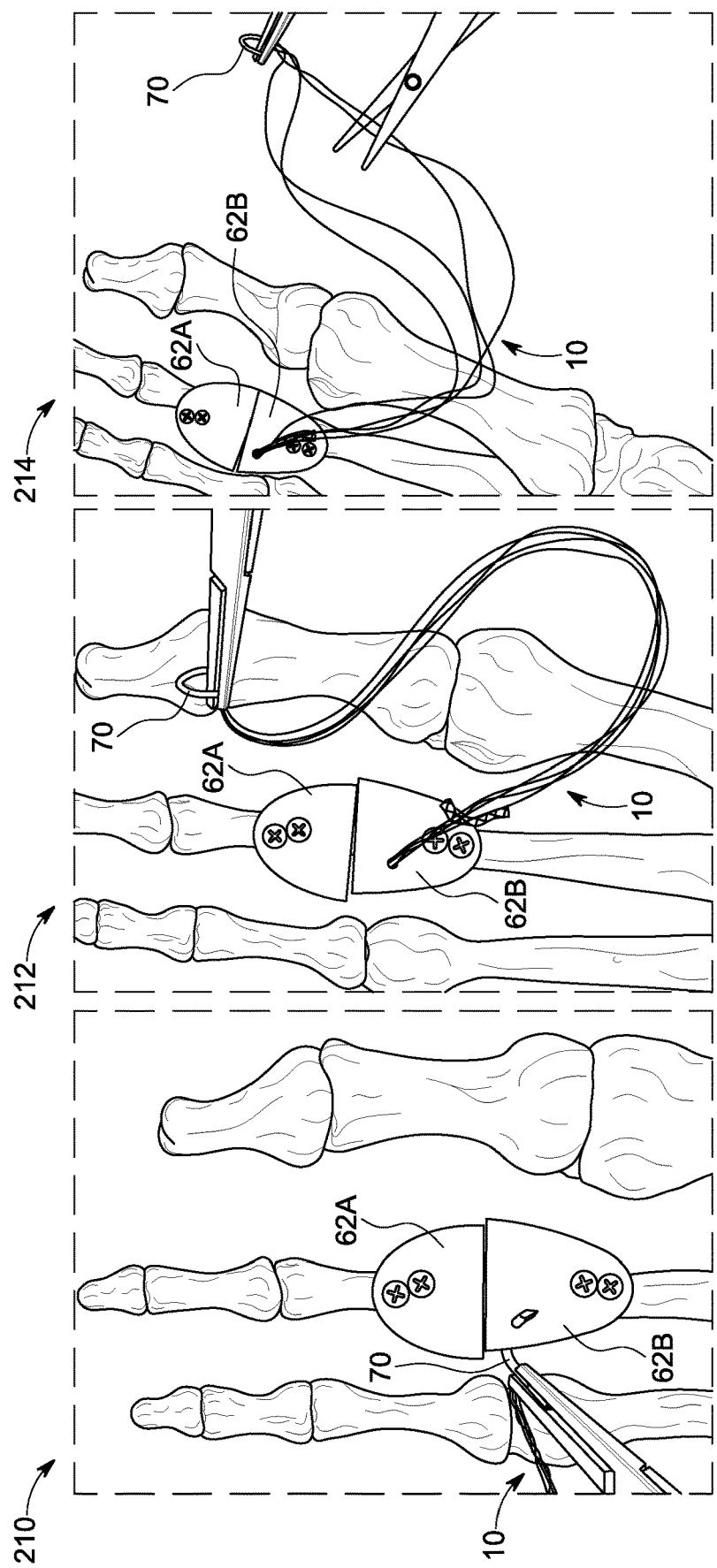
FIGS. 23A-23F illustrate an exemplary method of joining tissue segments of a foot from a plantar approach via a tissue and/or bone joining implant system, an insertion needle and a needle driver, in accordance with the present disclosure.

As shown in FIG. 23A, the method may include obtaining or retrieving the implant system 10, and securing or engaging the needle 70 thereof in the first and second grooves 84, 85 of needle driver 80, as explained above. For example, the base portion and/or the body portion of the needle 70 may be engaged via the first and second grooves 84, 85 of the first and second jaws 81, 82 of the driver to securely hold the needle 70 with the driver 80 in a fixed position and orientation with the tip thereof expose and spaced from the driver 80.

With the needle 70 secured in the driver 80, the method includes passing 210 the needle 70 through a second plantar plate tissue segment 62B via the driver 80 in dorsal to plantar direction, as shown in FIG. 23A. For example, passing 210 the needle 70 through a plantar plate segment 62B via the driver 80 in dorsal to plantar direction may include inserting/pushing the tip of the needle 70 into the dorsal side of the second plantar plate segment 62B via the driver, passing the needle 70 partially therethrough via the driver in a dorsal to plantar direction via the driver 80, disengaging the driver 80 from the needle 70, reengaging the needle 70 with the driver on the plantar side of the second plantar plate segment 62B, and pulling the needle 70 fully through the second plantar plate segment 62B via the driver 80.

As shown in FIG. 23B, the method may then include manipulating the needle 70 via the driver 80 and, thereby, pulling or tensioning 212 the shuttle suture 60 (and the end portions 22 of the tensioning suture 12) to pull or pass the shuttle anchor 114 through the second plantar plate segment 62B (in a dorsal-to-plantar direction). With the shuttle anchor 114 positioned on the plantar side of the second plantar plate segment 62B, the end portions 22 of the tensioning suture 12 (and the shuttle suture 60) can be pulled or tensioned via the driver 80 and the needle 70 to seat the tension anchor 14 against the dorsal surface of the second plantar plate segment 62B.

As shown in FIG. 23C, with the shuttle anchor 114 positioned on the plantar side of the second plantar plate segment 62B (and potentially the tension anchor 14 seated against the dorsal surface of the second plantar plate segment 62B), the method may include cutting 214 the end portions of the tensioning suture 12 (e.g., via a scissor, blade or any other suture cutting implement) on the plantar side of the second plantar plate segment 62B to release the tensioning suture 12 from the needle 70. The end portions of the shuttle suture 60 may thereby remain swaged or coupled to the needle 70, as shown in FIG. 23C.

Figures 23D, 23E, 23F:
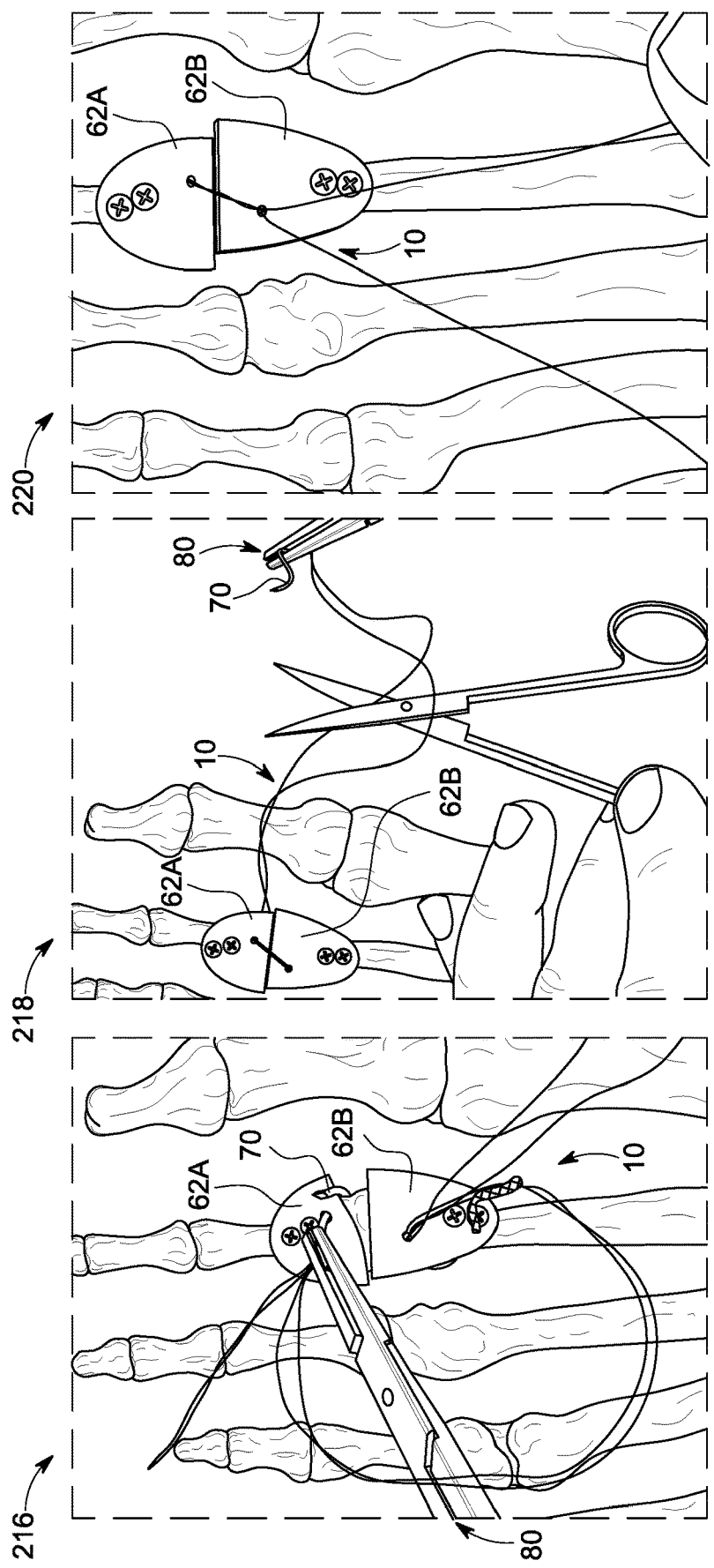

After the tensioning suture 12 is decoupled from the needle 70, the method may include securing or engaging the needle 70 in the first and second grooves 84, 85 of needle driver 80 if not already secured, and passing 216 the needle 70 through the first plantar plate tissue segment 62A via the driver 80 in a plantar to dorsal direction, as shown in FIG. 23D.

As shown in FIG. 23E, the method may then include manipulating the needle 70 via the driver 80 and, thereby, pulling or tensioning 212 the shuttle suture 60 to pull or pass the shuttle anchor 114 through the first plantar segment 62A (in a plantar-to-dorsal direction). With the shuttle anchor 114 positioned on the dorsal side of the second plantar plate segment 62B, the method may include cutting at least one of the end portions of the shuttle suture 60 (e.g., via a scissor, blade or any other suture cutting implement) on the dorsal side of the first plantar plate segment 62B and unthreading the shuttle suture 60 from the shuttle anchor 114 to release the shuttle suture 60 (and thereby the implant 10 as a whole)

from the needle 70. For example, the method may include cutting one end portion of the shuttle suture 60, and pulling the needle 70 (e.g., via the driver 80) to unthread the shuttle suture 60 from the shuttle anchor 114. The method may also comprise seating the shuttle anchor 114 against the dorsal surface of the second plantar plate segment 62B, such as by tensioning or pulling on the tensioning suture 12 for example.

With the shuttle anchor 114 and the tension anchor 14 positioned on the dorsal sides of the first and second plantar segments 62A, 62B, respectively, the method includes separating the end portions 22 of the tensioning suture 12, and pulling or tensioning 220 the end portions 22 of the tensioning suture 12 in divergent directions, as shown in FIG. 23F. The pulling or tensioning 220 of the end portions 22 of the tensioning suture 12 in divergent directions firmly seats the shuttle anchor 114 and the tension anchor 14 against the dorsal surfaces of the first and second plantar segments 62A, 62B, respectively, deforms the shuttle anchor 114 and the tension anchor 14 into the "U" or "V" shape (as described above), and draws the first and second plantar segments 62A, 62B together, as shown in FIG. 23F. The method may then include tying the strands of the tensioning suture 12 in a knot to fix or secure the implant 10 and fix or secure the relationship of the first and second plantar segments 62A, 62B, as shown in FIG. 23F.

It is noted that a plurality of implant systems 10 may be utilized to repair or fix the first and second plantar segments 62A, 62B. For example, a first implant system 10 may be implanted in a medial side of the first and second plantar segments 62A, 62B (as described above), and a second implant system 10 may be implanted in a lateral side of the first and second plantar segments 62A, 62B (as described above). As another example, the first and second implant systems 10, 10 may be implanted in a medial-lateral criss-cross or "X" arrangement in the first and second plantar segments 62A, 62B. When a plurality of implant systems 10 are utilized, the method may include tying the strands of the tensioning sutures 12 of the implants 10 together. Still further, in some embodiments the implant may initially be implanted or passed through the first plantar segment 62A, and then subsequently implanted or passed through the second plantar plate segment 62B.

Turning to FIGS. 24A-24I, an exemplary method of joining a tissue and a bone of a foot from a dorsal approach via a tissue and/or bone joining implant system, an insertion needle and a needle driver, in accordance with the present disclosure, is illustrated. Specifically, the method illustrates joining/repairing a phalanx bone 62A and a plantar plate segment 62B of a torn plantar plate via a dorsal approach. However, the method may equally apply (in whole or in parts (e.g., at least one or more portions or aspects thereof)) to joining other tissue and bones of the foot or tissue segments of another body part of a mammalian patient, and/or may equally apply (in whole or in parts (e.g., at least one or more portions or aspects thereof)) to joining bone segments and/or tissue segments, and/or may equally apply (in whole or in parts (e.g., at least one or more portions or aspects thereof)) via a plantar or other/differing directional approach.

As shown in FIGS. 24A-24I, the tissue and bone joining method may utilize an implant system that is the same or similar to the implant system 10 of FIGS. 1-9, an insertion needle that is the same or similar to the of insertion needle 70 of FIGS. 10-13 (and/or the insertion needle 170 of FIGS. 14-16 and/or the insertion needle 270 of FIG. 17) swaged to the end portions 22 of the suture 12 and the end portions of the shuttle suture 60, and/or a needle driver that is the same or similar to the needle driver 80 of FIGS. 18-22.

In some embodiments, the method may include making an incision proximate to the proximal phalanx 62A and the plantar plate tissue segment 62B (the position and configuration of which may be made according to surgeon preference) in the dorsal side of the patient's foot. In some embodiments, the method may include engaging the edges of the incision and/or underlying tissue with a retractor or retractor system (such as the retractor system 600 discussed below with respect to FIGS. 31-36), and expanding, separating, opening or otherwise spreading apart the edges of the incision and the underlying tissue so that the proximal phalanx 62A and the plantar plate tissue segment 62B can be accessed (e.g., become exposed). In some embodiments, the retractor or retractor system may hold back or retain the edges of the incision and the underlying tissue in the opened arrangement to maintain access to the proximal phalanx 62A and the plantar plate tissue segment 62B during the repair.

In some embodiments, the method may include dissecting the tissue and/or joint associated with the phalanx bone 62A and the plantar plate tissue segment 62B to at least partially expose them. In some embodiments, the method may include performing a Weil osteotomy, and the phalanx bone 62A and/or plantar plate 62B secured, such as with at least one wire, pin, screw or the like. In some embodiments, the method may then include distracting the joint associated with the phalanx bone 62A and the plantar plate tissue segment 62B, such as via a small joint distractor.

As shown in FIG. 24A, the method may include obtaining or retrieving the implant system 10, and securing or engaging the needle 70 thereof in the first and second grooves 84, 85 of the needle driver 80, as explained above. For example, the base portion and/or the body portion of the needle 70 may be engaged via the first and second grooves 84, 85 of the first and second jaws 81, 82 of the driver 80 to securely hold the needle 70 with the driver 80 in a fixed position and orientation with the tip thereof expose and spaced from the driver 80.

With the needle 70 secured in the driver 80, the method includes passing 310 the needle 70 through the proximal plantar plate tissue segment 62B via the driver 80 in a plantar to dorsal direction, as shown in FIG. 24A. For example, passing 210 the needle 70 through the plantar plate segment 62B via the driver 80 in the plantar to dorsal direction may include inserting/pushing the tip of the needle 70 into the plantar side of the plantar plate segment 62B via the driver, passing the needle 70 partially therethrough in a plantar to dorsal direction via the driver 80, disengaging the driver 80 from the needle 70, reengaging the needle 70 with the driver 80 on the distal side of the plantar plate segment 62B, and pulling the needle 70 fully through the plantar plate segment 62B via the driver 80. However, it is noted that in some alternative embodiments the method may include passing 310 the needle 70 through the proximal plantar plate tissue segment 62B via the driver 80 in a dorsal to plantar direction (not shown).

As shown in FIG. 24B, the method may then include manipulating the needle 70 via the driver 80 and, thereby, pulling or tensioning 312 the shuttle suture 60 (and the end portions 22 of the tensioning suture 12) to pull or pass the shuttle anchor 114 through the plantar plate segment 62B (in a plantar-to-dorsal direction). With the shuttle anchor 114 positioned on the dorsal side of the plantar plate segment 62B, the end portions 22 of the tensioning suture 12 (and the shuttle suture 60) can be pulled or tensioned via the driver 80 and the needle 70 to seat the tension anchor 14 against the plantar surface of the plantar plate segment 62B.

As shown in FIG. 24C, the method may include inserting or implanting at least one wire 90 (e.g., k-wire), pin, drill bit or the like into the proximal end of the phalanx bone 62A, and utilizing the wire 90 to create at least one bone tunnel, hole or aperture therethrough. In some embodiments, one bone through hole may be created in the proximal end portion of the phalanx bone 62A (e.g., a proximal phalanx) via the wire 90. In some other embodiments, a pair of through holes may be created in the proximal end portion of the phalanx bone 62A via the at least one wire 90, such a pair of oblique medial and lateral through holes that extend and cross medially-laterally, as shown in FIG. 24C.

Figure 24F:
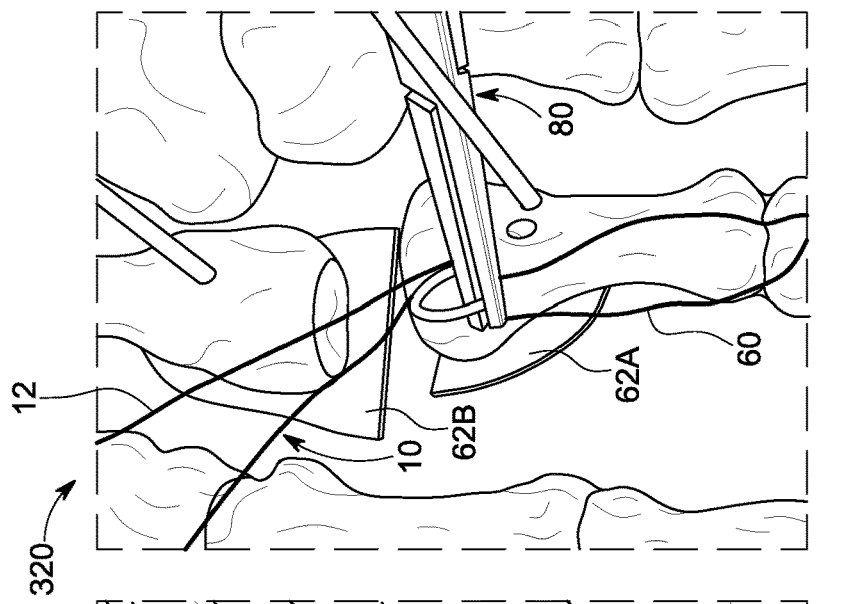
Figure 24E:
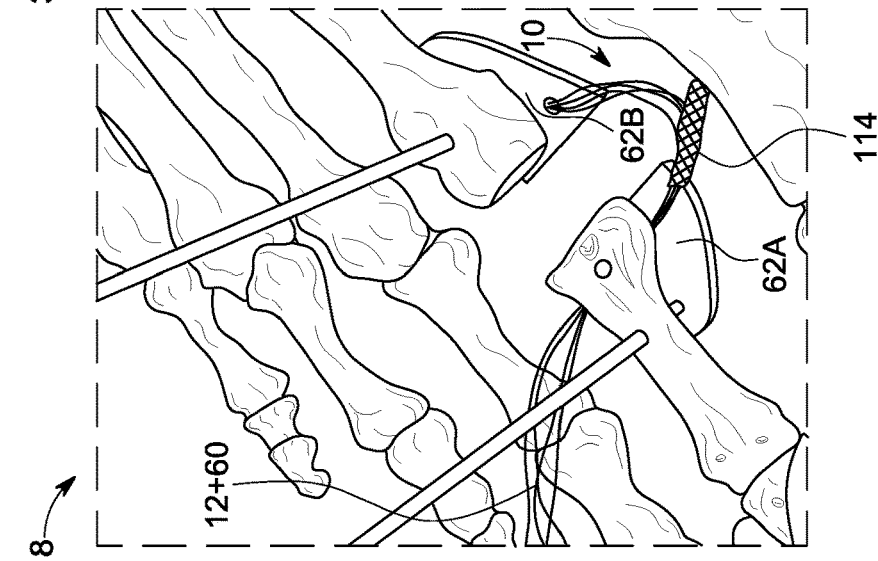
Figure 24D:
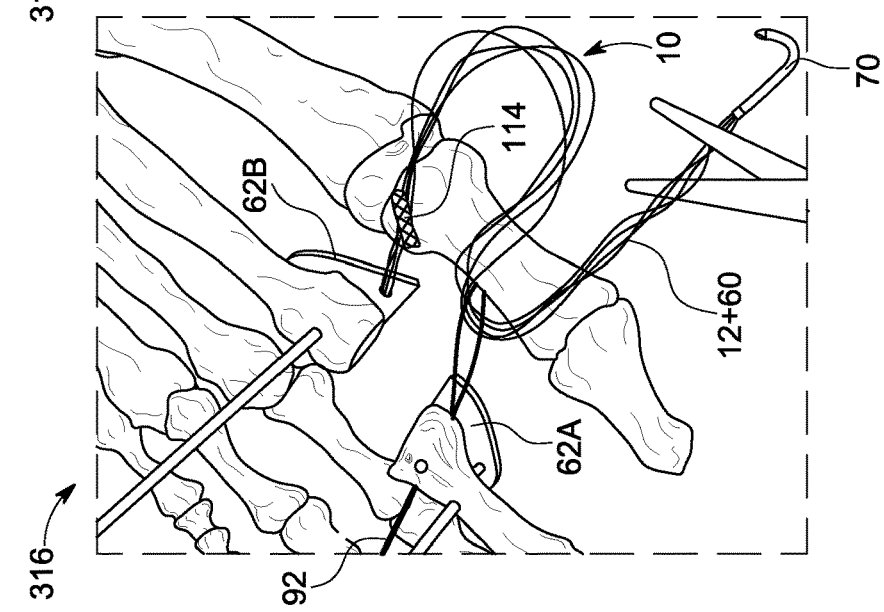

With the tension anchor 14 positioned on the plantar side of the plantar plate segment 62B (and potentially seated against the plantar surface of the plantar plate segment 62B), the method may include passing or translating 316 a suture passer 92 through one of the through holes in the phalanx bone 62A in a plantar to dorsal direction, and passing the strands of the suture 12 and the shuttle suture strands 60 through a loop, aperture, hook or the like of the suture passer 92 via the needle 70, as shown in FIG. 24D. As also shown in FIG. 24D, with a medial portion of the strands of the suture 12 and the shuttle suture strands 60 extending through the loop of the suture passer 92, end portions 22 of strands of the suture 12 and end portions of the shuttle suture strands 60 may be cut to release the shuttle suture strands 60 and the suture 12 from the needle 70.

With the tension anchor 14 positioned on the plantar side of the plantar plate segment 62B (and potentially seated against the plantar surface of the plantar plate segment 62B) and the needle 70 removed/decoupled, the method may include passing or translating 316 a medial portion of the suture 12 and the shuttle suture strands 60 through one of the through holes in the phalanx bone 62A in a plantar to dorsal direction via the suture passer 92, as shown in FIG. 24E. The suture passer 92 may thereby be configured to pass the strands of the suture 12 and the shuttle suture strands 60 transosseously from the plantar aspect to the dorsal surface of the proximal phalanx bone 62A.

The suture passer 92 may thereby be configured to pass the strands of the suture 12 and the shuttle suture strands 60 transosseously from the plantar aspect to the dorsal surface of the proximal phalanx bone 62A. In some embodiments, the method may include passing the shuttle anchor 114 into the one of the through holes in the phalanx bone 62A, such as to the dorsal aspect of the plantar cortex, such that the shuttle anchor 114 is retained within the through hole. In some embodiments, the suture passer 92 may comprise a wire configured in a looped shape at an end thereof to enable easy capture of the suture strands of the suture 12 and the shuttle suture strands 60 after insertion through the bone through hole/tunnel. In some such embodiments, the suture passer 92 may comprise a nitinol wire, heat-set in the looped configuration. In some embodiments, the suture passer 92 may include a sleeve that is configured to tighten, shorten or compress the loop for passing through the bone tunnel and/or secure engagement with the sutures of the suture 12 and the shuttle suture strands 60.

With the suture 12 and the shuttle suture strands 60 on the dorsal side of the proximal phalanx bone 62A and the tension anchor 14 positioned on the plantar side of the plantar plate segment 62B, the method may include identifying the shuttle suture strands 60 and isolating the shuttle suture strands 60 from the tensioning suture 12. As shown in FIGS. 24F and 24G, the method may include pulling or tensioning 320 at least the shuttle suture strands 60 (and potentially the tensioning suture 12) to pull or pass the shuttle anchor 114 through the through hole in the proximal phalanx bone 62A in a plantar-to-dorsal direction. It is noted that the driver 80 may be utilized to engage the shuttle suture strands 60 (and potentially the tensioning suture 12) and pull the shuttle anchor 114 through the through hole in the proximal phalanx bone 62A. However, any other device may equally be employed, such as but not limited to a hemostat. With the shuttle anchor 114 positioned on the dorsal side of the proximal phalanx bone 62A, the method may include unthreading 322 the shuttle suture 60 from the shuttle anchor 114, such as by pulling one of the shuttle suture strands 60 so that the shuttle suture 60 translates through the shuttle anchor 114, as shown in FIG. 24G.

As shown in FIG. 24H, with the shuttle anchor 114 positioned on the dorsal side of the proximal phalanx bone 62A and the tension anchor 14 positioned on the plantar side of the plantar plate 62B, the method includes separating the end portions/strands 22 of the tensioning suture 12, and pulling or tensioning 324 the end portions/strands 22 of the tensioning suture 12 in divergent directions, as shown in FIG. 24F. The pulling or tensioning 220 of the end portions/strands 22 of the tensioning suture 12 in divergent directions firmly seats the shuttle anchor 114 against the dorsal side of the proximal phalanx bone 62A and the tension anchor 14 against the plantar side of the plantar plate 62B, deforms the shuttle anchor 114 and the tension anchor 14 into the "U" or "V" shape (as described above), and draws the proximal phalanx bone 62A and the plantar plate 62B together, as shown in FIG. 24G. The method may then include tying the strands of the tensioning suture 12 in a knot to fix or secure the implant 10 and fix or secure the relationship of the proximal phalanx bone 62A and the plantar plate 62B, as shown in FIG. 24I.

As also shown in FIG. 24I, another implant 10 may be fixed to the proximal phalanx bone 62A and the plantar plate 62B via a remaining bone through hole in the proximal phalanx bone 62A, as described above. In such embodiments, the two or more implant systems 10 may also be tied to each other, such as medially-laterally across bone bridge to secure the plantar plate repair.

In some alternative embodiments, the bone through holes in the proximal phalanx bone 62A (and thereby the implants extending therethrough) may not cross, and instead comprise a medial bone through hole (and medial implant 10) and a lateral bone through hole (and lateral implant 10). As another example, in some other alternative embodiments the proximal phalanx bone 62A may include only one bone through hole (and thereby one implant 10 extending therethrough). Still further, in some alternative embodiments the implant may initially be implanted or passed through the proximal phalanx bone 62A, and then subsequently implanted or passed through the second plantar plate 62B.

FIGS. 25-29 illustrate an exemplary drill guide and inserter system, instrument, device or apparatus 400 for facilitating implantation of an implant system in accordance with the present disclosure, such as the implant system 10 of FIGS. 1-9. The drill guide and inserter system 400 is configured to create one or more through holes in one or more bones or tissues and to implant the implant system 10 (e.g., the tension anchor 14 and/or the shuttle anchor 114 thereof) into/through the one or more through holes in the one or more bones or tissues.

As shown in FIGS. 25-28, the drill guide and inserter system 400 includes a drill guide portion or component 402 and an inserter portion or component 404 that are configured to nest or otherwise couple together. As shown in FIGS. 25-28, the drill guide 402 includes a manually engageable handle portion 405 and a guide portion 408 that extends from or past a distal end of the handle portion 405 and defines a bone engagement free end or tip 412.

The handle portion 405 of the drill guide 402 comprises a proximal end 416 and a distal projection 414. The handle portion 406 and projection 414 are configured to allow a user to securely grasp the handle portion 406 using one hand and position the tip 412 of the guide portion 408 against a bone (e.g., a plantar side of a proximal phalanx). The projection 414 is also configured to allow the user to secure the tip 412 of the guide portion 408 against a bone via one hand (e.g., a plantar side of a proximal phalanx) by applying pressure to the drill guide 402 via the user's thumb against the proximal side of the projection 414, and potentially wrapping one or more fingers of the user's hand around the opposing side of the bone (e.g., the dorsal aspect of the patient's foot) to provide back pressure (see, FIGS. 30B-30H, for example).

The tip 412 of the guide portion 408 may provide at least one relatively sharp point, tip or tooth that securely engages bone to provide stability of the placement of the drill guide 402 against the bone. For example, in some embodiments the tip 412 of the guide portion 408 comprises a plurality of angularly or circumferentially spaced teeth configured to engage bone, as shown in FIGS. 25-28.

The handle portion 405 may include an inserter aperture or cavity 417 extending from the proximal end 416 toward the guide portion 408 configured to accept therein or mate with a coupling portion 422 at a distal end of the inserter 404, as shown in FIGS. 25-28. The inserter cavity 417 is thereby open or exposed at the proximal end 416 of the handle portion 405.

Figure 26:
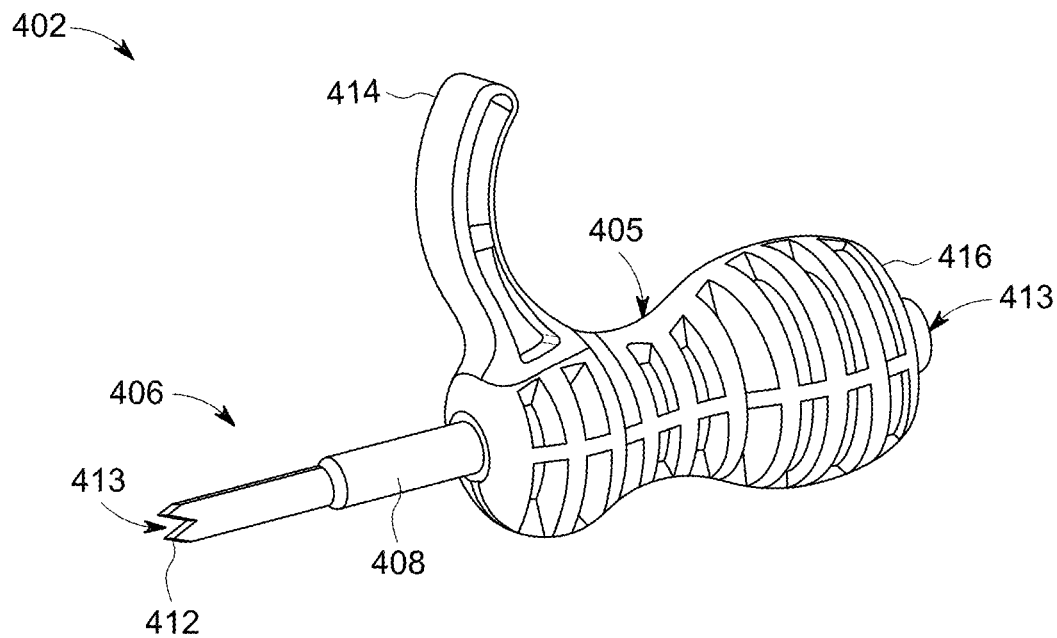
FIG. 26 is a front elevational perspective view of the drill guide of the modular retractor system of FIG. 25, in accordance with the present disclosure.
Figure 27:
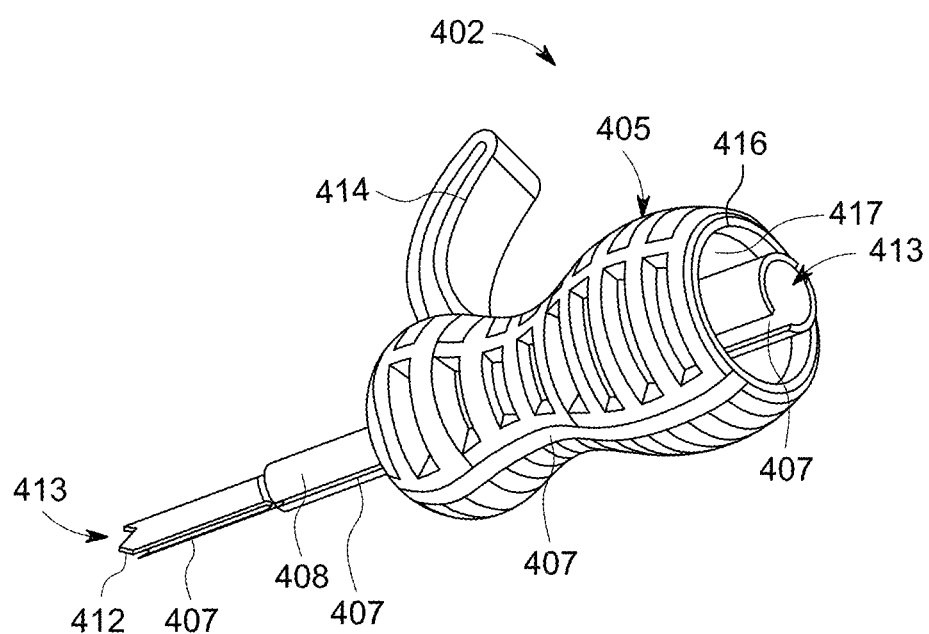
FIG. 27 is a rear bottom perspective view of the drill guide of the modular retractor system of FIG. 25, in accordance with the present disclosure.

As shown in FIGS. 26 and 27, the guide portion 408 and the handle portion 405 are cannulated, hollow or otherwise include cooperating through holes that form an internal passageway or through hole 413 that extends through the drill guide 402 from the tip 412 of the guide portion 408 to the proximal end 416 of the handle portion 405. The internal passageway 413 is open or exposed at the tip 412 of the guide portion 408 and at the proximal end 416 of the handle portion 405.

The internal passageway 413 is configured to accept a corresponding drilling member (such as a k-wire, drill bit, or other elongate drilling mechanism) therethrough. With the tip 412 of the guide portion 408 engaged with a bone, the drilling member may be introduced into the internal passageway 413 at the proximal end 416 of the handle portion 405, and advanced through internal passageway 413 of the handle portion 405 and the guide portion 408 to the bone. The drilling member can then be rotated or otherwise utilized to create a hole or aperture into, and potentially through, the bone. At least a portion of at least the internal passageway 413 of the guide portion 408 may approximate the cross-sectional size (e.g., diameter) of the drilling member to guide the drilling member and prevent the drilling member from wandering and/or angling during a drilling operation.

As also shown in FIGS. 26 and 27, the guide portion 408 and the handle portion 405 also include a slot or opening 407 that extends through the exterior surfaces thereof to the internal passageway 413 and from the tip 412 of the guide portion 408 to the proximal end 416 of the handle portion 405. The slot 407 is thereby in communication with the exterior of the drill guide 402 and the internal passageway 413 to provide access to and from the internal passageway 413. The width of the slot 407 is less than a cross-sectional size of the drilling member to prevent the drilling member from disengaging from the internal passageway 413 during a drilling operation. In some embodiments, the width of the slot 407 may be greater than a cross-sectional size of the strands of a tensioning suture 12 and the strands of a shuttle suture 60 of an implant 10 coupled or loaded onto the inserter 404, as further described below.

Figure 25:
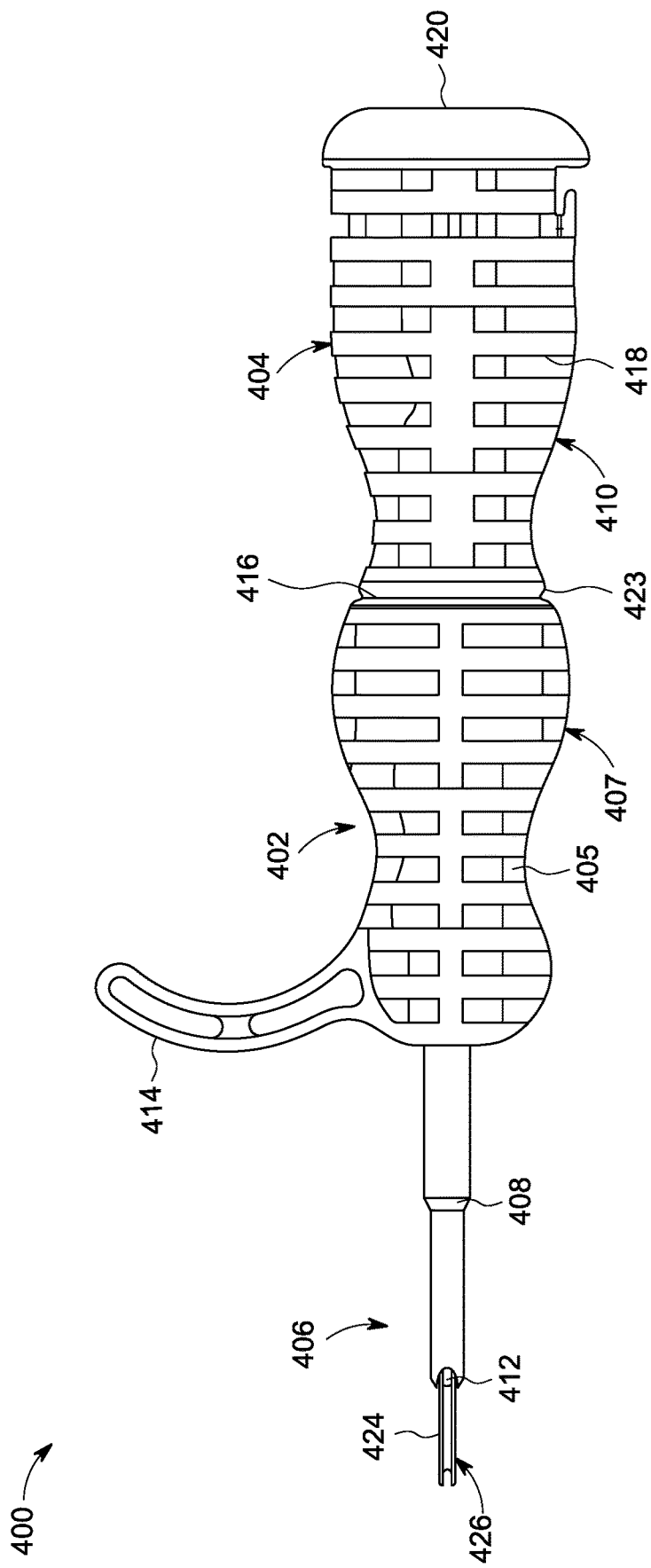
FIG. 25 is a side view of an exemplary drill guide and inserter system for facilitating the implantation of an implant system, in accordance with the present disclosure.
Figure 28:
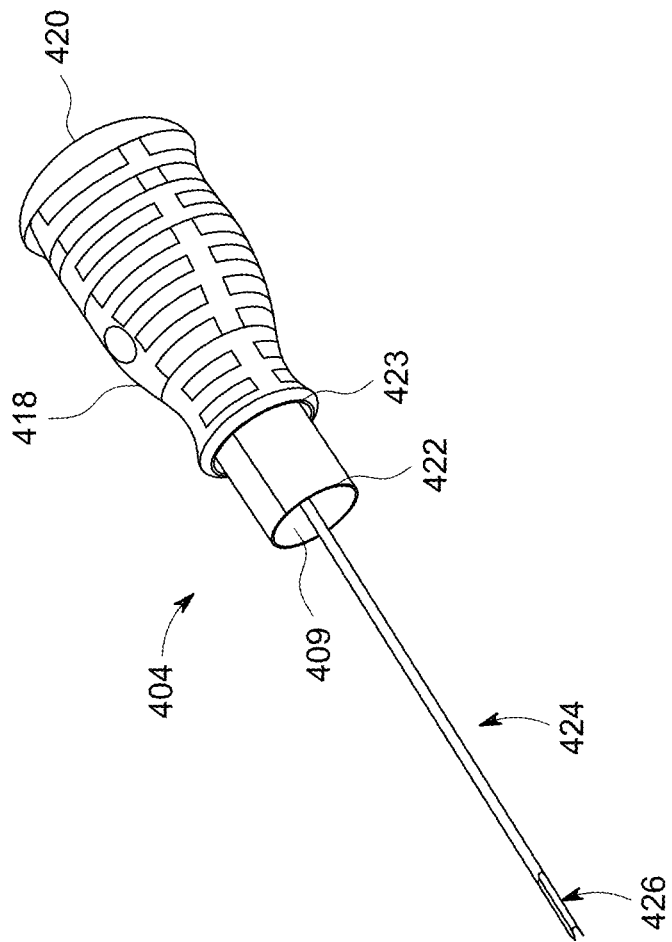
FIG. 28 is an elevational exploded view of the drill guide and inserter system of FIG. 25, in accordance with the present disclosure.
Figure 28:
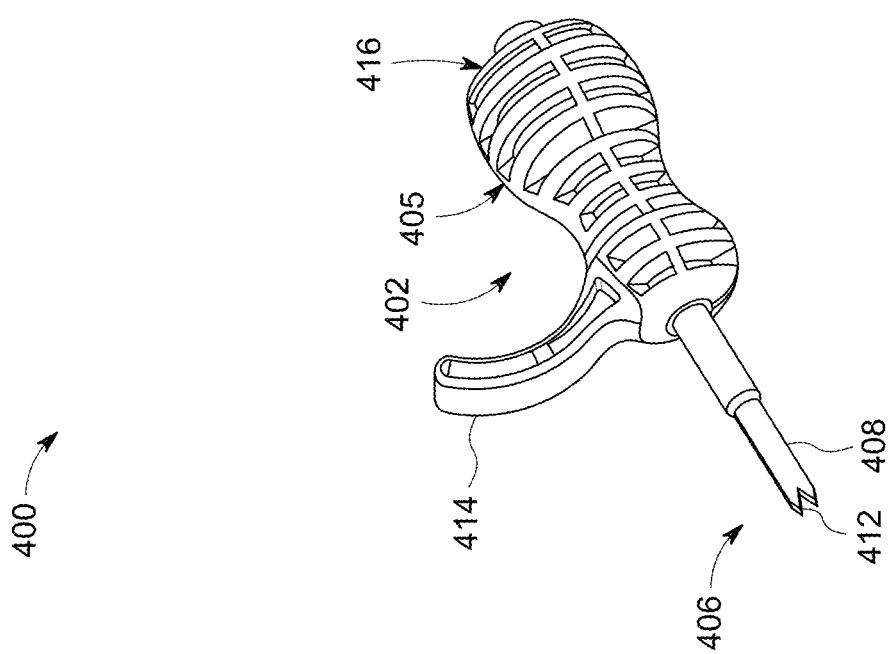
Figure 39:
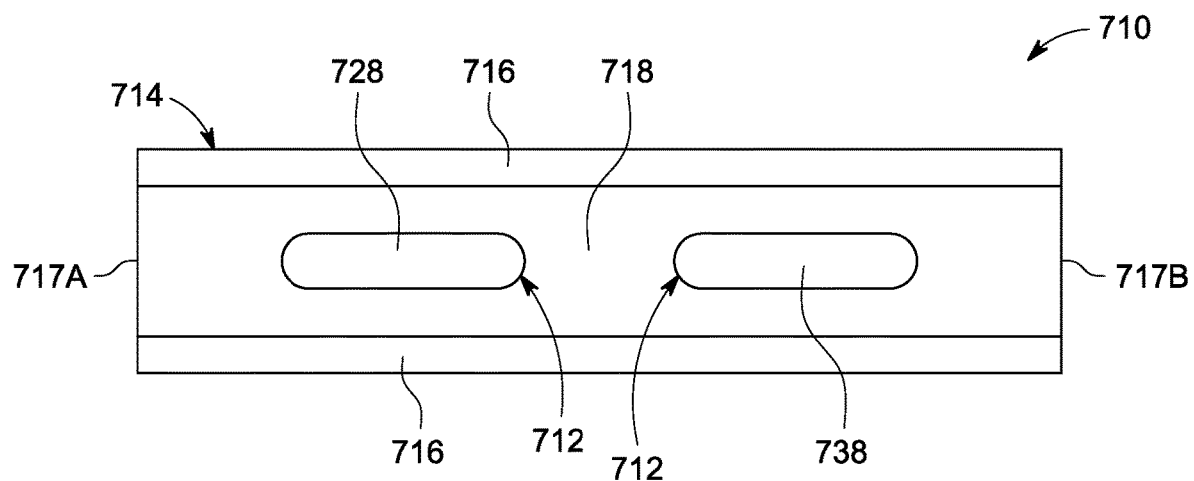
FIG. 39 is an end cross-sectional view taken through the suture of the implant system of FIG. 37, in accordance with the present disclosure.

As shown in FIGS. 25, 28 and 39, the inserter 404 includes the manually engageable handle portion 418 and an insertion portion 424 that extends from or past a distal end of the handle portion 418 and defines an implant holder free end or tip portion 426. As noted above, the distal end of the handle portion 418 includes a distal coupling portion 422 that is configured to extend into and securely mate with the inserter cavity 417 of the handle portion 405 of the drill guide 402. The handle portion 418 may also include a stop surface 423 proximate to the coupling portion 422 that is configured to abut against the proximal end 416 of the handle portion 405 of the drill guide 402 when the coupling portion 422 is fully seated within the inserter cavity 417.

The handle portion 405 of the drill guide 402 may also include an internal cavity (or passageway) 409 that is in communication with the passageway 413 of the drill guide 402 when the inserter 404 is fully mated with the drill guide 402. Like the drill guide 402, the inserter 404 may include a slot or opening that extends from the exterior surface the handle portion 418 to the internal cavity 409. The slot is thereby in communication with the exterior of the handle portion 418 and the internal cavity 409 to provide access to and from the internal cavity 409.

The proximal end 420 of the handle portion 418 may define an end surface that can be utilized to apply pressure to the inserter 404. In some embodiments, the proximal end 420 of the handle portion 418 may be defined by a removable cap that closes off and/or mates within the internal cavity 409 of the handle portion 418.

The insertion portion 424 comprises a stiff elongate post or like member or portion. The insertion portion 424 is configured to extend through the entirety of the passageway 413 of the drill guide 402 from the proximal end 416 through the tip 412 (i.e., extend through the entirety of the passageway 413 of the handle portion 405 and the guide portion 408) when the coupling portion 422 is fully seated within the inserter cavity 417, as shown in FIG. 25.

The implant holder tip portion 426 of the insertion portion 424 is configured to hold or retain an anchor of an implant, such as the tension anchor 14 or the shuttle anchor 114 of the implant system 10. An anchor of an implant may thereby be pre-loaded on the tip portion 426, and one or more other portion of the implant may be coupled to or provided in/on the inserter 404. For example, the tension anchor 14 or the shuttle anchor 114 may be retained on the tip portion 426 of the inserter 404, and the tensioning suture 12 and the shuttle suture 60 may be provided/extend through the passageway 413 of the drill guide 402 and the internal cavity 409 within the handle portion 418 of the inserter 404. The tension anchor 14 or the shuttle anchor 114 that is not retained on the tip portion 412 and/or the needle 70 of the implant 10 may be housed within the internal cavity 409 of the inserter 404 or coupled to the exterior of the inserter 404, for example. The tensioning suture 12 and/or the shuttle suture 60, and/or the needle 70, may be removably coupled to a clip, post or another portion or mechanism of the inserter 404 such that the tensioning suture 12 and/or the shuttle suture 60 apply tension to the tension anchor 14 or the shuttle anchor 114 that is on the tip portion 412 to releasably retain the tension anchor 14/shuttle anchor 114 on the tip portion 412. The implant system 10 may thereby be pre-loaded on the inserter 404.

When the inserter 404 is fully mated with the drill guide 402, the system 400 is configured such that the tension anchor 14 or the shuttle anchor 114 that is retained on the tip portion 412 is positioned past the tip 412 of the drill guide 402, and the tensioning suture 12 and the shuttle suture 60 extend through the passageway 413 of the drill guide 402 and the internal cavity 409 of the inserter 404. However, the tensioning suture 12 and the shuttle suture 60 may be removed from the passageway 413 of the drill guide 402 (and the internal cavity 409 of the inserter 404) by passing the tensioning suture 12 and the shuttle suture 60 through the slot 407 of the drill guide 402.

Figure 29:
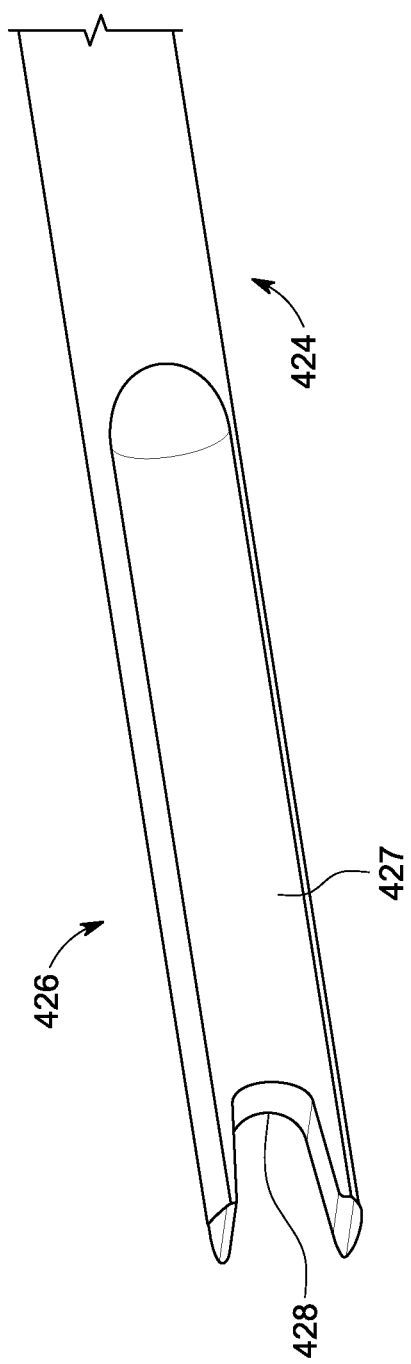
FIG. 29 is a perspective view of an implant retaining tip of the inserter of the modular retractor system of FIG. 25, in accordance with the present disclosure.

As shown in FIG. 29, the implant holder tip portion 426 of the insertion portion 424 of the inserter 404 may include a forked free end 428 and a pair of grooves 427 extending proximally from the base of the forked end 428 along differing (e.g., opposing) sides of the insertion portion 424. The forked free end 428 and at least one groove 427 are configured to retain or mate with an anchor of an implant system (e.g., tension anchor 14 or the shuttle anchor 11 of the implant system 10) with a medial portion of the anchor extending over the base of the forked free end 428 between the tines or arms thereof and end portions of the anchor extending within and along the grooves 427 (see, FIG. 30D, for example). The implant holder tip portion 426 may be configured such that the implant holder tip portion 426 is stiff, and thereby utilized to insert or pass the anchor retained thereon into and through a hole in at least one tissue and/or bone.

Figure 30A:
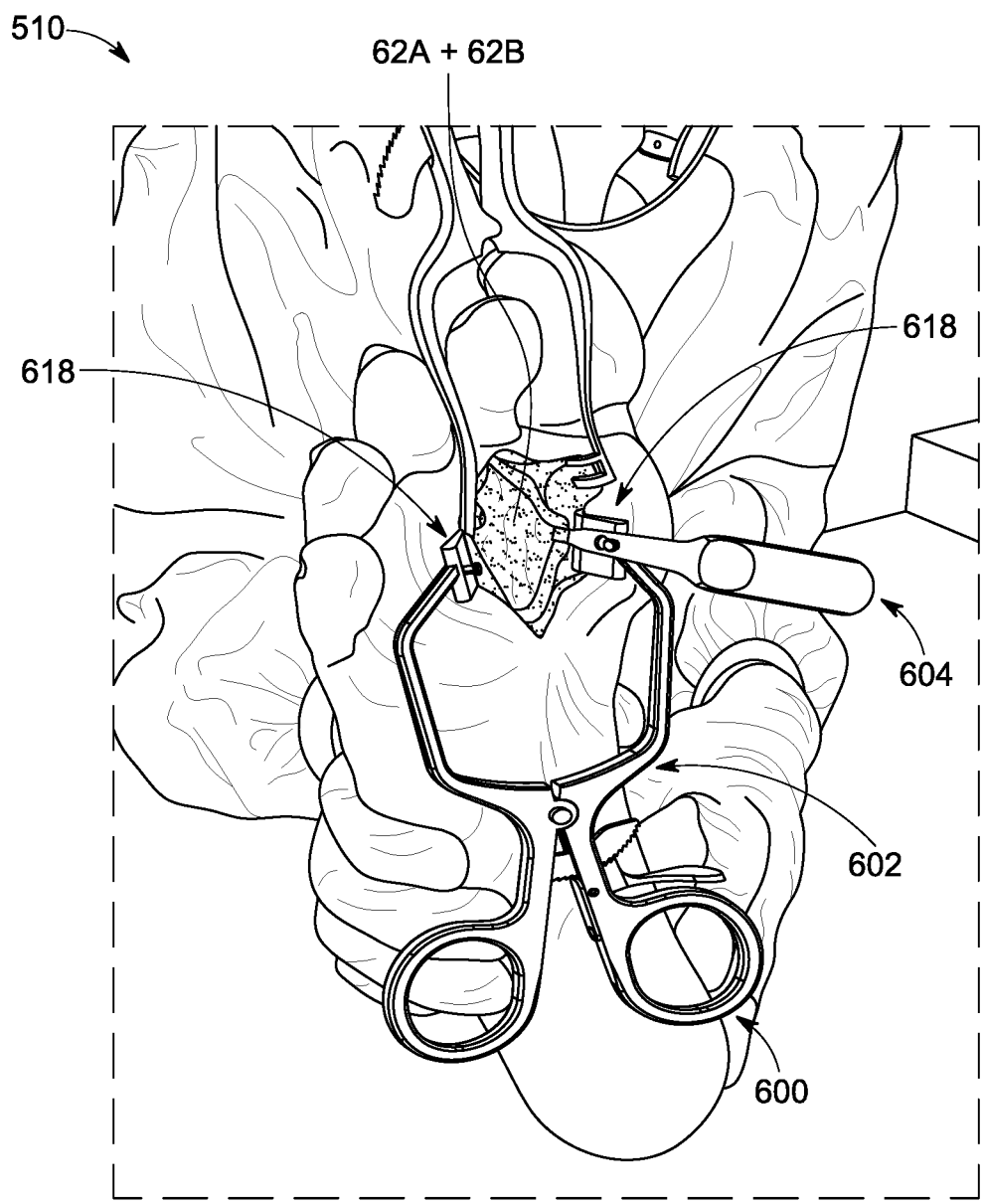
FIGS. 30A-30P illustrate an exemplary method of joining a tissue segment and a bone of a foot from a plantar approach via a modular retractor system, a tissue and/or bone joining implant system, an insertion needle, a needle driver, and a drill guide and inserter system according to the present disclosure.
Figure 30J:
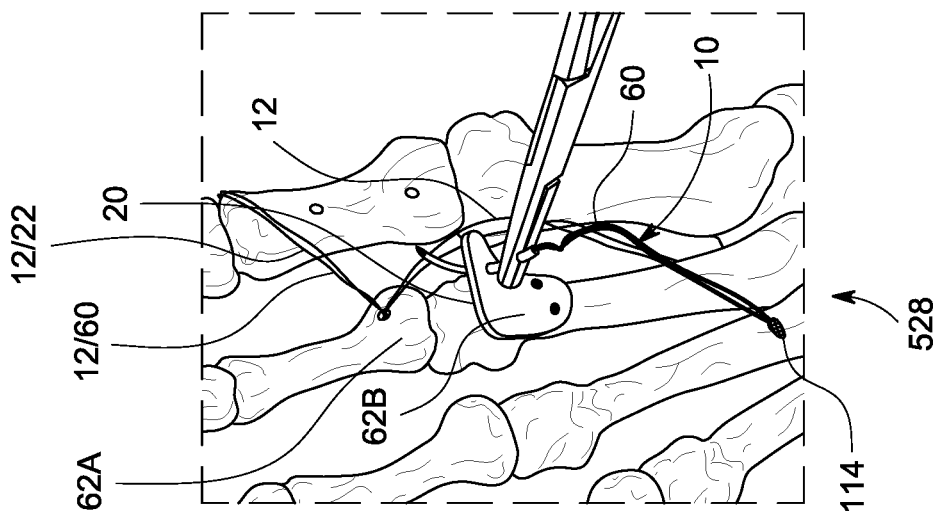
Figure 30I:
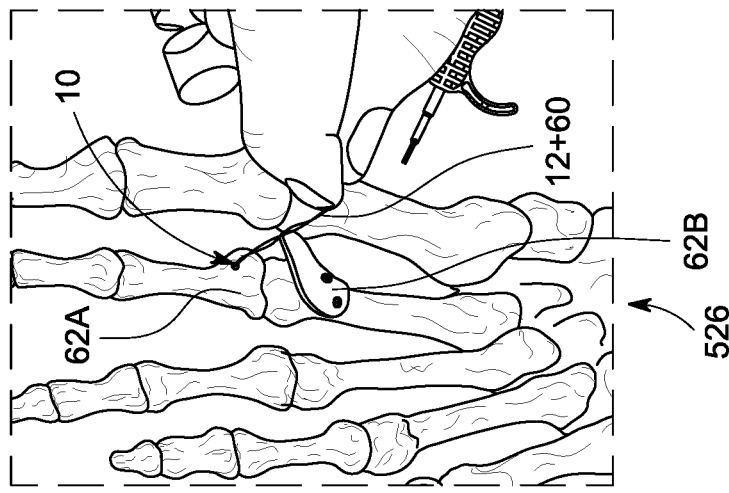
Figure 30H:
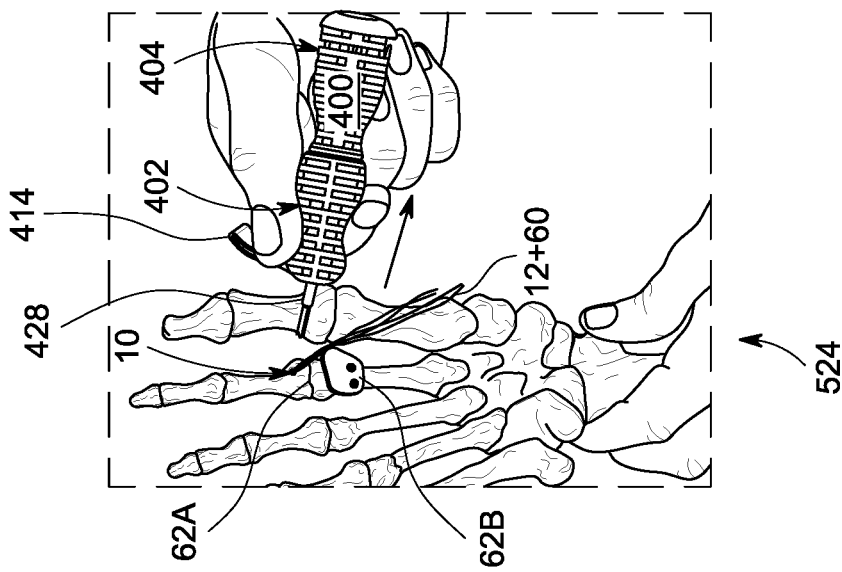
Figure 30M:
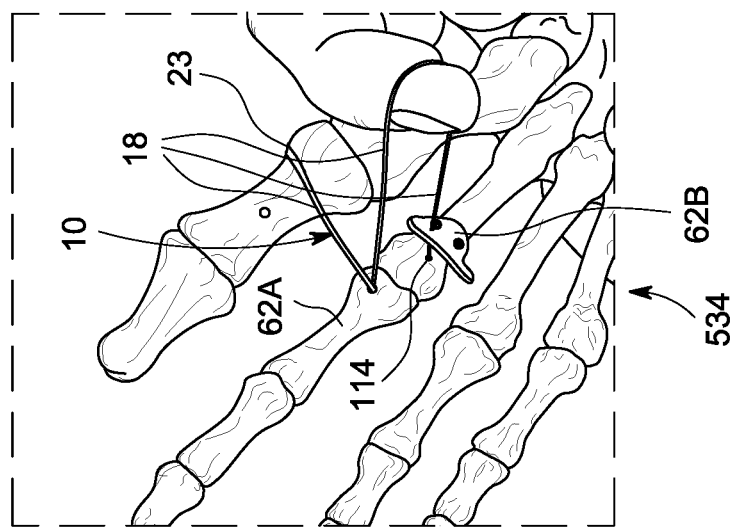
Figure 30L:
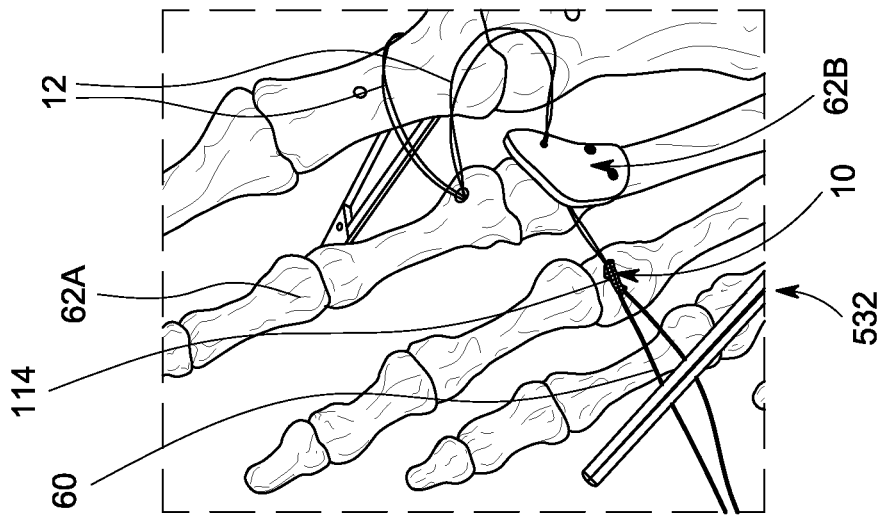
Figure 30K:
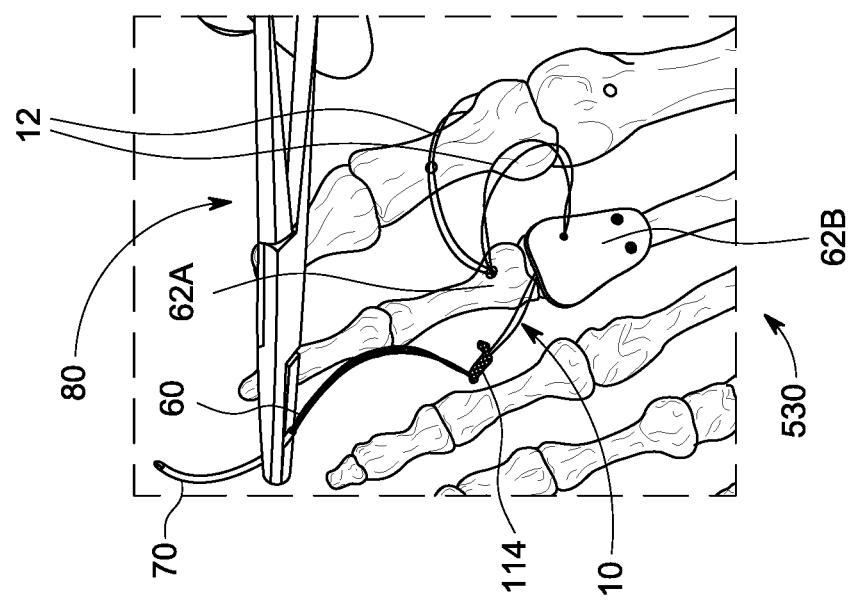
Figure 30P:
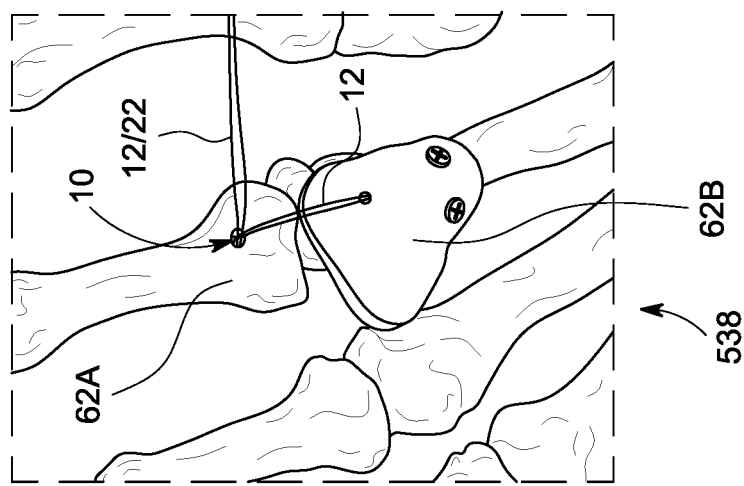

Turning to FIGS. 30A-30P, another exemplary method of joining tissue and a bone of a foot from a plantar approach via a tissue and bone joining implant system, an insertion needle, a needle driver and a drill guide and inserter system in accordance with the present disclosure, is illustrated. Specifically, the method illustrates joining/repairing a phalanx bone 62A and a plantar plate segment 62B of a torn plantar plate via a plantar approach. However, the method may equally apply (in whole or in parts (e.g., at least one or more portions or aspects thereof)) to joining other tissue and bones of the foot or tissue segments of another body part of a mammalian patient, and/or may equally apply (in whole or in parts (e.g., at least one or more portions or aspects thereof)) to joining bone segments and/or tissue segments, and/or may equally apply (in whole or in parts (e.g., at least one or more portions or aspects thereof)) via a dorsal or other/differing directional approach.

As shown in FIGS. 30C-30P, the tissue and bone joining method may utilize an implant system that is the same or similar to the implant system 10 of FIGS. 1-9, an insertion needle that is the same or similar to the of insertion needle 70 of FIGS. 10-13 (and/or the insertion needle 170 of FIGS. 14-16 and/or the insertion needle 270 of FIG. 17) swaged to the end portions 22 of the suture 12 and the end portions of the shuttle suture 60, a needle driver that is the same or similar to the needle driver 80 of FIGS. 18-22, and/or a drill guide and inserter system that is the same or similar to the drill guide and inserter system 400 of FIGS. 25-29.

In some embodiments, the method may include making an incision proximate to the proximal phalanx 62A and the plantar plate tissue segment 62B (the position and configuration of which may be made according to surgeon preference) in the plantar side of the patient's foot. In some embodiments, as shown in FIG. 30A, the method may include engaging the edges of the incision and/or underlying tissue with a retractor or retractor system (such as the retractor system 600 discussed below with respect to FIGS. 31-36), and expanding, separating, opening or otherwise spreading apart 502 the edges of the incision and the underlying tissue via the retractor or retractor system so that the proximal phalanx 62A and the plantar plate tissue segment 62B can be accessed (e.g., become exposed). In some embodiments, the retractor or retractor system may also hold back or retain the edges of the incision and the underlying tissue in the opened arrangement to maintain access to the proximal phalanx 62A and the plantar plate tissue segment 62B during the repair, as shown in FIG. 30A.

In some embodiments, the method may include dissecting the tissue and/or joint associated with the phalanx bone 62A and the plantar plate tissue segment 62B to at least partially expose them. In some embodiments, the method may include performing a Weil osteotomy, and the phalanx bone 62A and/or plantar plate 62B secured, such as with at least one wire, pin, screw or the like. In some embodiments, the method may then include distracting the joint associated with the phalanx bone 62A and the plantar plate tissue segment 62B, such as via a small joint distractor.

As shown in FIGS. 30B-30H, the method may include utilizing the drill guide and inserter system 400 of FIGS. 25-29, or a similar system or drill guide and/or inserter, to form at least one through hole in the proximal phalanx 62A and pass the tension anchor 14 or the shuttle anchor 114 through the through hole. For example, as shown in FIG. 30B, the method may include positioning the bone engagement tip 412 of the drill guide 402 of the system 400 on the proximal phalanx 62A. The bone engagement tip 412 of the drill guide 402 may be manually retained against the proximal phalanx 62A via one hand of the user. For example, the user may press his or her thumb against the proximal side of the projection 414, and wrap one or more fingers around to the dorsal aspect of the foot to manually apply pressure to the drill guide 402 against the proximal phalanx 62A, as shown in FIG. 30B.

With the bone engagement tip 412 of the drill guide 402 securely held against the proximal phalanx 62A, the method may include inserting 514 at least one wire (e.g., k-wire), pin, drill bit or the like 90 into and through the passageway 413 of the drill guide 402, and utilizing the wire 90 to create at least one bone tunnel, hole or aperture at least partially into the proximal phalanx 62A in a plantar to dorsal direction. The bone tunnel is formed via the wire 90 at least through the plantar cortex of the proximal phalanx 62A to accommodate the tension anchor 14 (or the shuttle anchor 114) within the bone tunnel extends (i.e., within the bone) such that the tension anchor 14 (or the shuttle anchor 114) seats against the inner side of the plantar cortex of the proximal phalanx 62A. In some embodiments, to ensure the bone tunnel is formed via the wire 90 with a sufficient depth, the bone tunnel bicortically through the proximal phalanx 62A.

As shown in FIG. 30D, the method may include obtaining the inserter 404 of the system 400 with the tension anchor 14 retained on the implant holder tip portion 426 and the strands of the tensioning suture 12 and the shuttle suture 60 extending through the passageway 409 thereof (and the shuttle anchor 114 and/or the insertion needle 70 positioned within the passageway 409, positioned within another cavity of the inserter 404, coupled to the exterior of the inserter 404, or hanging freely from the inserter 404 via the suture 12 and shuttle anchor 60, for example). The method may include inserting 516 the tension anchor 14 retained on the implant holder tip portion 426 and the implant holder tip portion 426 of the insertion portion 424 into the passageway 409 of the drill guide 402 via the proximal end 416 thereof, as shown in FIG. 30D.

As shown in FIG. 30E, the method may then include manually inserting or passing the insertion portion 424 of the inserter 404 into the passageway 409 of the drill guide 402 and into the through hole of the proximal phalanx 62A such that the tension anchor 14 retained on the implant holder tip portion 426 is positioned within the bone tunnel (i.e., within the proximal phalanx 62A) dorsally-past the near cortex of the proximal phalanx 62A. To ensure the tension anchor 14 is positioned dorsally-past the near cortex of the proximal phalanx 62A, the method may include fully seating 520 the coupling portion 422 at a distal end of the inserter 404 into the inserter cavity 415 of the handle portion 405 of the drill guide 402 until the stop surface 423 abuts the proximal end 416 of the handle portion 405 of the drill guide 402. In some embodiments, to fully seat the inserter 404 into the drill guide 402, the method may include applying force to the proximal end 420 of the handle portion 405, such as tamping the proximal end 420 of the handle portion 405 via a tool, as shown in FIG. 30F. In some embodiments, the tensioning implant may be manually positioned (either through the drill guide or not) past the far dorsal cortex of the proximal phalanx.

With the tension anchor 14 positioned within the bone tunnel and on or adjacent to the inner surface of the plantar cortex of the proximal phalanx 62A (or the dorsal surface), the method may include disengaging 522 the implant system 10 from the drill guide and inserter system 400, as shown in FIG. 30G. For example, the needle 70 and/or shuttle anchor 114 may be manually decoupled from the inserter 404 and/or manually removed from the passageway 409 of thereof to release the tension anchor 14 from the implant holder tip portion 426. Further, the strands of the tensioning suture 12 and the strands of the shuttle suture 60 may be manually removed from the passageway 409 of the inserter 404 by pulling or otherwise passing the strands through the slot 410, and manually removed from the passageway 413 of the drill guide 402 by pulling or otherwise passing the strands through the slot 407, as shown in FIG. 30G. As shown in FIG. 30H, with the implant system 10 decoupled from the drill guide and inserter system 400, the method may include disengaging 524 the bone engagement tip 412 from the proximal phalanx 62A and removing or discarding the drill guide and inserter system 400.

In some embodiments, as shown in FIG. 30I, with the tension anchor 14 positioned within proximal phalanx 62A and on or adjacent to the inner surface of the plantar cortex (or on or adjacent to the dorsal surface) and the implant system 10 disengaged from the drill guide and inserter system 400, the method may include pulling or tensioning 30I the strands of the tensioning suture 12 and/or the shuttle suture 60 plantarly, and potentially proximally, to seat the tension anchor 14 against the inner surface of the plantar cortex of the proximal phalanx 62A. In some embodiments, with the tension anchor 14 positioned on or seated against the inner surface of the plantar cortex of the proximal phalanx 62A and the implant system 10 disengaged from the drill guide and inserter system 400, the method may include cutting or otherwise disconnecting the end portions 22 of the strands of the tensioning suture 12 from the needle 70, as shown in FIG. 30J.

The method may then include securing or engaging the needle 70 of the implant system 10 in the first and second grooves 84, 85 of needle driver 80, as explained above. For example, the base portion and/or the body portion of the needle 70 may be engaged via the first and second grooves 84, 85 of the first and second jaws 81, 82 of the driver to securely hold the needle 70 with the driver 80 in a fixed position and orientation with the tip thereof exposed and spaced from the driver 80. With the needle 70 engaged by the driver 80, the method includes passing 528 the needle 70 through a portion of the plantar plate 62B via the driver 80 in a plantar to dorsal direction, as shown in FIG. 30J. For example, passing 528 the needle 70 through the plantar plate 62B via the driver 80 in a plantar to dorsal direction may include inserting/pushing the tip of the needle 70 into the plantar side of the plantar plate 62B via the driver 80, passing the needle 70 partially therethrough via the driver 80 in a plantar to dorsal direction, disengaging the driver 80 from the needle 70, reengaging the needle 70 with the driver 80 on the dorsal side of the plantar plate 62B, and pulling the needle 70 fully through the plantar plate 62B via the driver 80.

As shown in FIG. 30K, the method may then include manipulating the needle 70 via the driver 80 and, thereby, pulling or tensioning 530 the strands of the shuttle suture 60 to pull or pass the shuttle anchor 114 through the plantar plate 62B (in a plantar to dorsal direction). With the shuttle anchor 114 positioned on the dorsal side of the plantar plate 62B, the method may include cutting 532 the at least one strand of the shuttle suture 60 (e.g., via a scissor, blade or any other suture cutting implement) on the dorsal side of the plantar plate 62B and unthreading the shuttle suture 60 from the shuttle anchor 114 to release the shuttle suture 60 from the needle 70. For example, the method may include cutting one end portion of the shuttle suture 60, and pulling the needle 70 (e.g., via the driver 80) to unthread the shuttle suture 60 from the shuttle anchor 114.

Figure 30O:
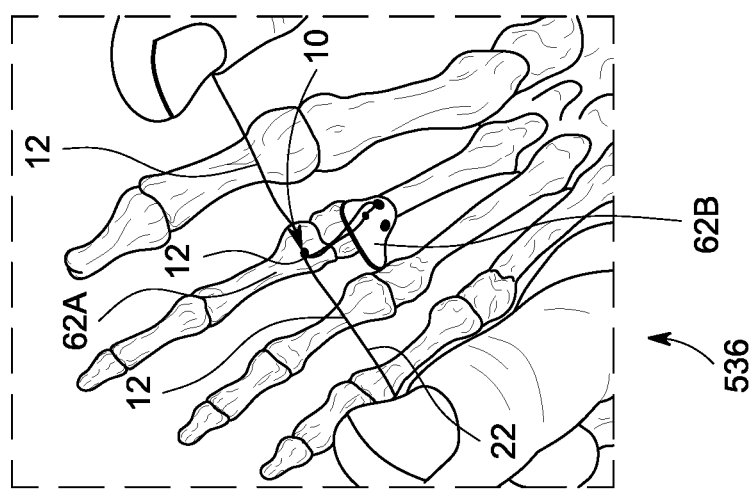
Figure 30N:
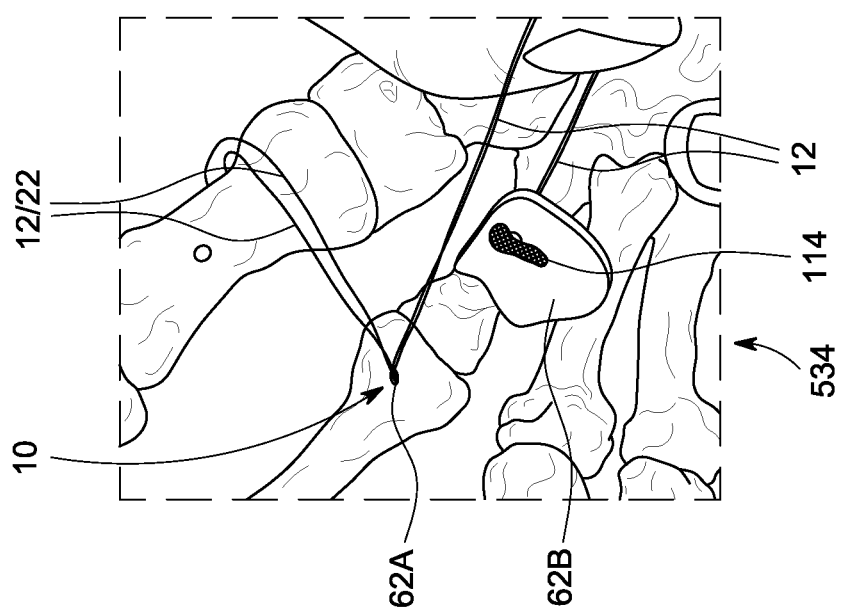
Figure 31:
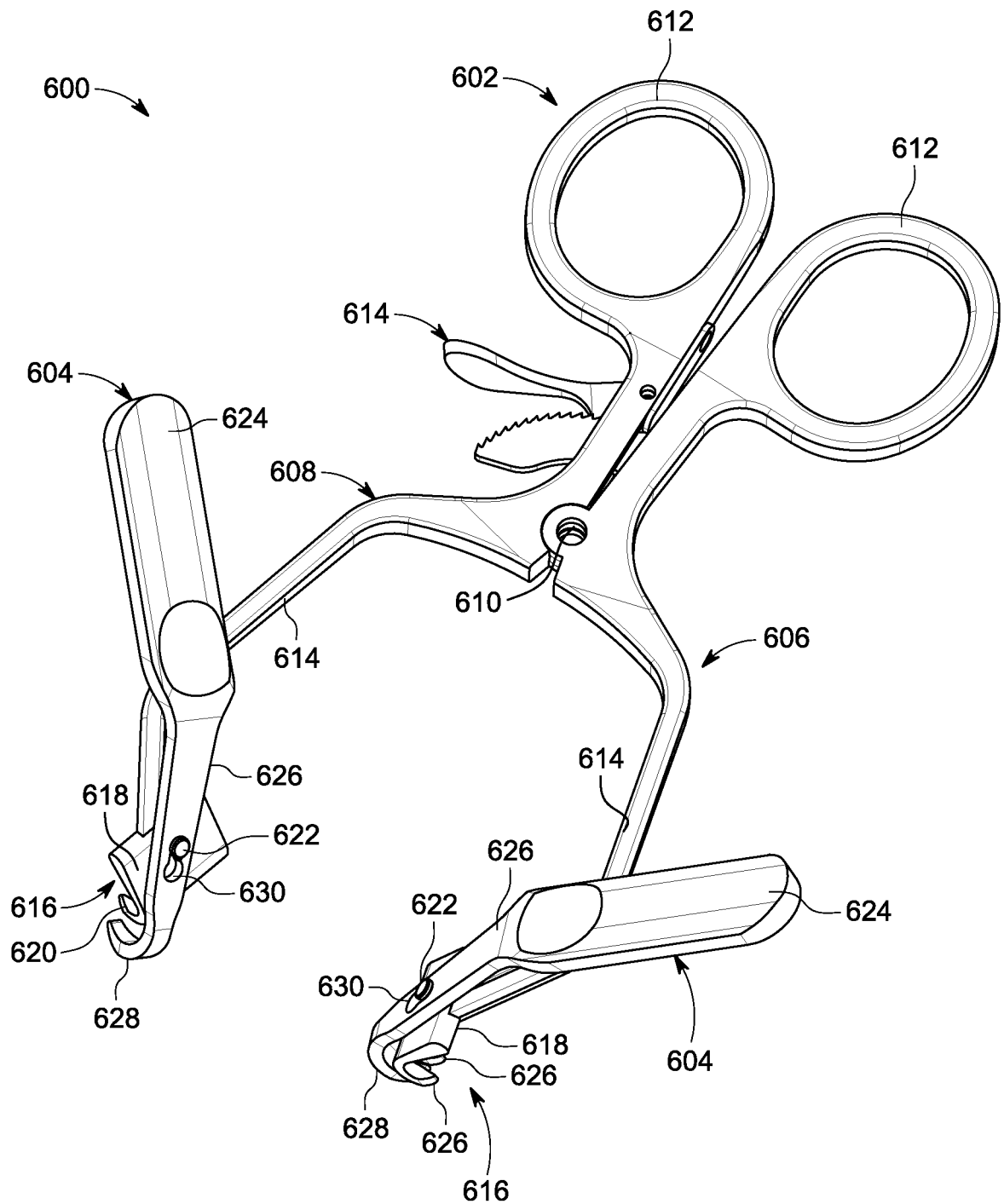
FIG. 31 is an elevation perspective view of an exemplary modular retractor system for facilitating the implantation of an implant system, in accordance with the present disclosure.
Figure 32:
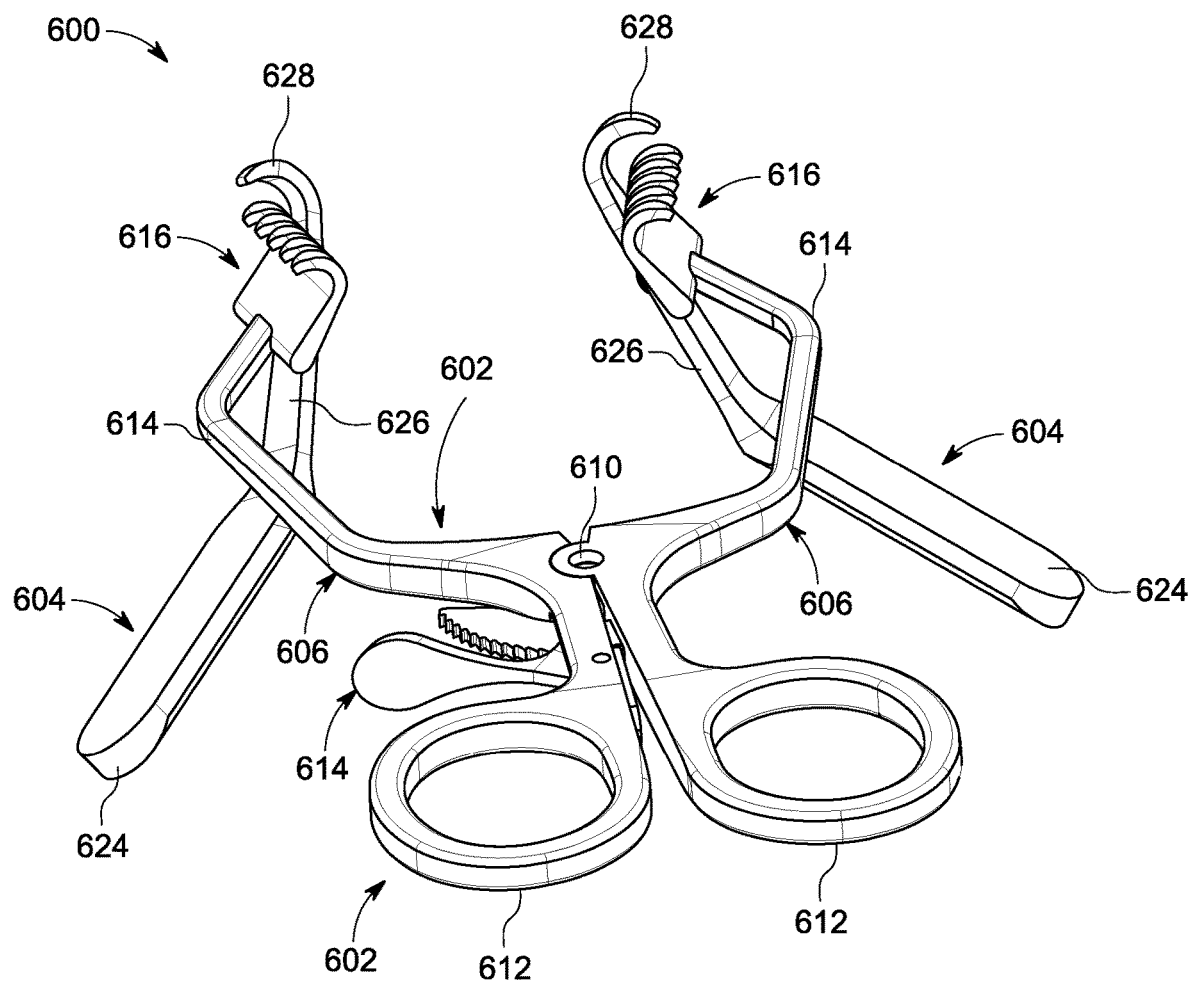
FIG. 32 is a bottom perspective view of the modular retractor system of FIG. 31, in accordance with the present disclosure.
Figure 33:
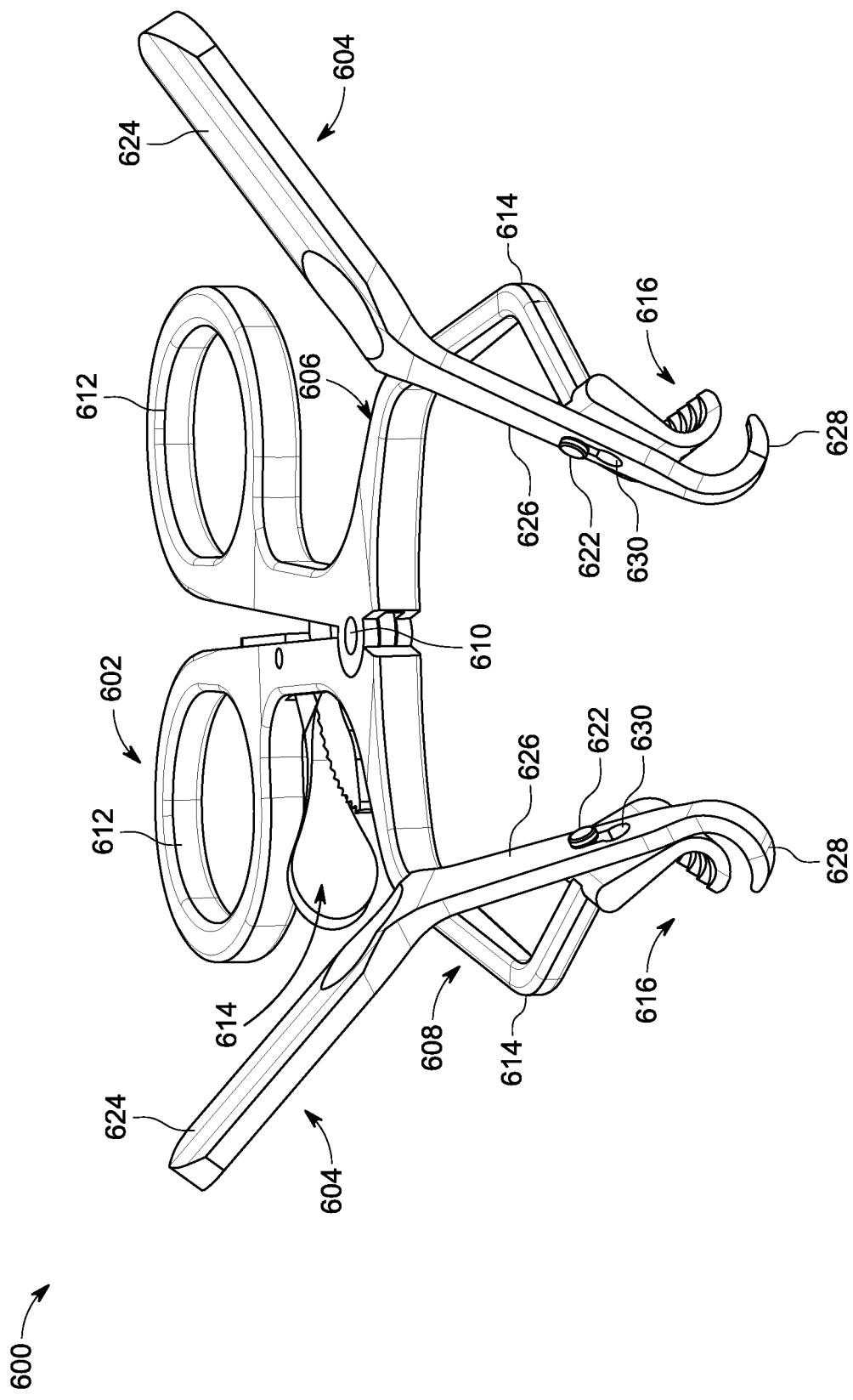
FIG. 33 is another elevational perspective view of the modular retractor system of FIG. 31, in accordance with the present disclosure.
Figure 34:
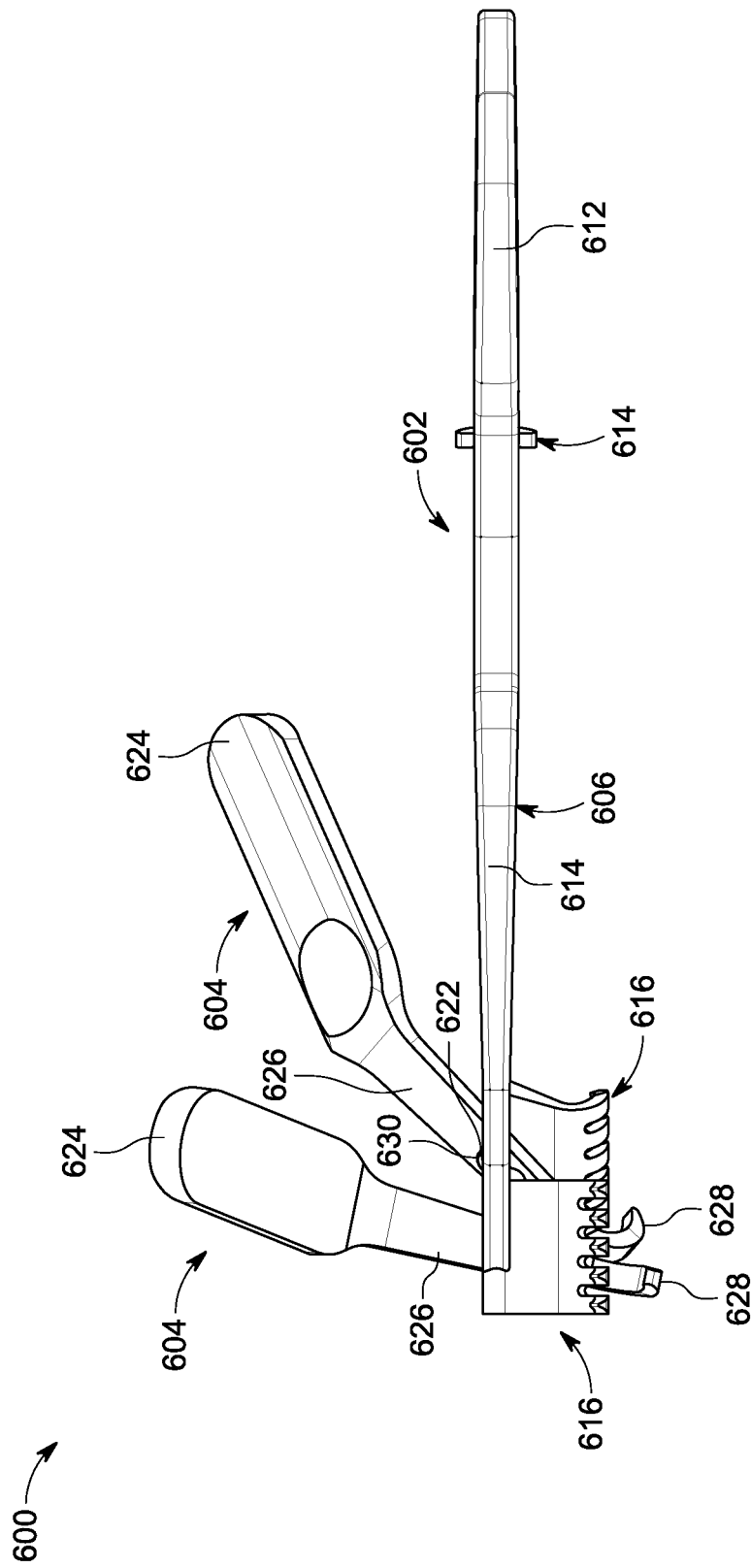
FIG. 34 is a side view of the modular retractor system of FIG. 31, in accordance with the present disclosure.

With the shuttle anchor 114 positioned on the inner surface of the plantar cortex (or dorsal side) of the plantar plate 62B and the shuttle suture 60 removed from the shuttle anchor 114, the method may include seating the shuttle anchor 114 against the dorsal surface of the plantar plate 62B, as shown in FIGS. 30M and 30N. For example, the strands of the tensioning suture 12 extending between the shuttle anchor 114 and the tension anchor 14 may be tensioned or pulled in a dorsal to plantar direction to seat the shuttle anchor 114 to the dorsal surface of the plantar plate 62B.

As shown in FIG. 30O, with the tension anchor 14 positioned on (and potentially seated against) the inner surface of the plantar cortex (or on the dorsal side surface) of the proximal phalanx 62A and the shuttle anchor 114 positioned on (and potentially seated against) the dorsal side of the plantar plate 62B, the method includes separating the end portions 22 of the tensioning suture 12, and pulling or tensioning 536 the end portions 22 of the tensioning suture 12 in divergent directions. The pulling or tensioning 536 of the end portions 22 of the tensioning suture 12 in divergent directions firmly seats the shuttle anchor 114 and the tension anchor 14 against the inner surface of the plantar cortex of the proximal phalanx 62A and the dorsal side of the plantar plate 62B, respectively, deforms the shuttle anchor 114 and the tension anchor 14 into the "U" or "V" shape (as described above), and draws the proximal phalanx 62A and the plantar plate 62B together, as shown in FIG. 30O. The method may then include tying 538 the strands of the tensioning strand 12 in a knot to fix or secure the implant 10 and fix or secure the relationship of the proximal phalanx 62A and the plantar plate 62B, as shown in FIG. 30P.

It is noted that a plurality of implant systems 10 may be utilized to repair or fix the proximal phalanx 62A and the plantar plate 62B. For example, a first implant system 10 may be implanted in/through a medial side of the proximal phalanx 62A and the plantar plate 62B, and a second implant system 10 may be implanted in/through a lateral side of the proximal phalanx 62A and the plantar plate 62B. As another example, first and second implant systems 10, 10 may be implanted in a medial-lateral crisscross or "X" arrangement in the proximal phalanx 62A and the plantar plate 62B. When a plurality of implant systems 10 are utilized, the method may include tying the strands of the tensioning strands 12 of the implants 10 together.

FIGS. 31-36 illustrate an exemplary modular retractor system, instrument, device or apparatus 600 for facilitating implantation of an implant system in accordance with the present disclosure, such as implant system 10. The modular retractor system 600 is configured to separate the edges of a surgical incision and/or to move and hold back underlying tissue so that anatomical structures of interest under the incision/tissues can be accessed (e.g., become exposed). For example, the modular retractor system 600 may be utilized in the plantar approach plantar plate segment surgical method of FIGS. 23A-23F discussed above, in the dorsal approach plantar plate to bone surgical method of FIGS. 24A-24I discussed above, and/or in the in the plantar approach plantar plate to bone surgical method of FIGS. 30A-30P discussed above, to separate the edges of the incision and move and hold back underlying tissue so that the plantar plate segment(s) and/or proximal phalanx can be accessed (e.g., are at least partially exposed). The modular retractor system 600 may be particularly advantageous for use in a plantar approach of a repair of a plantar plate to separate the edges of the incision and move and hold back underlying tissue, such as a fat pad and a pair of tendons proximate to the plantar plate and distal phalanx, so that the plantar plate segment(s) and/or the proximal phalanx can be accessed (e.g., are at least partially exposed).

As shown in FIGS. 31-35, the modular retractor system 600 includes a self-retaining retractor 602 and at least one supplemental modular retractor prong 604 that removably couples to a tissue engagement end portion 616 of an arm portion 614 of the self-retaining retractor 602. In some embodiments, the modular retractor system 600 may include a pair of supplemental modular retractor prongs 604, 604 that removably couple to corresponding tissue engagement end portions 616, 616 of respective arm portions 614 of the self-retaining retractor 602, as shown in FIGS. 31-35. In some embodiments, the self-retaining retractor 602 may be configured as, or similar to, a Weitlaner retractor. In some embodiments, the at least one supplemental modular retractor prong 604 may be configured as, or similar to, an arm or prong portion of a Gelpi retractor.

The retractor 602 modular retractor system 600 may include a first member 606 including a manually engageable handle portion 612 and an arm portion 614 extending therefrom to a tissue engagement free end portion 616, and a second member 608 including a manually engageable handle portion 612 and an arm portion 614 extending therefrom to a tissue engagement free end portion 616, as shown in FIGS. 31-36. The arm portions 614 of the first and second members 606, 608 are pivotably coupled via a joint 610 positioned between the handle portions 612 and the tissue engagement end portions 616, as shown in FIGS. 31-36. The retractor 602 is thereby configured such that (manual) movement of the handle portions 612 toward each other (e.g., angularly about a pivot or rotation axis defined by the joint 610) moves the tissue engagement end portions 616 away from each other (e.g., angularly about the axis of the joint 610), and (manual) movement of the handle portions 612 away from each other moves the tissue engagement end portions 616 toward from each other. The first and second members 606, 608 may thereby be configured as a first-class double-lever with the pivot joint 610 acting as the fulcrum.

In some embodiments, one or both of the handle portions 612 may define an aperture configured to accept one or more fingers of a user therein/therethrough, as shown in FIGS. 31-36. However, in other embodiments one or both of the handle portions 612 may not define an aperture.

As also shown in FIGS. 31-36, the retractor 602 may include a lock 611 that is configured to selectively fix or prevent relative movement of the first and second members 606, 608 about the axis of the joint 610. For example, the lock 611 illustrated in FIGS. 31-36 is configured to prevent relative rotation of the first and second members 606, 608 about the axis of the joint 610 such that the tissue engagement end portions 616 are prevented moving towards each other (e.g., angularly about the axis of the joint 610). The lock 611 may thereby be configured to selectively maintain the tissue engagement end portions 616 in a spaced or open relationship to retain an incision and/or underlying tissue in a particular position (e.g., to expose a plantar plate and/or proximal phalanx). The joint 610 may be of any configuration or mechanism configured to selectively retain the first and second members 606, 608 in a particular arrangement about the axis of the joint 610, and thereby retain maintain the tissue engagement end portions 616 in a particular arrangement or spacing.

As shown in FIGS. 31-36, the arm portions 614 of the first and second members 606, 608 may be shaped or configured such that they form an enlarged void, opening or space therebetween as they extend to the tissue engagement end portions 616. For example, the arm portions 614 may extend away from each as they extend away from the joint 610, and then extend back toward each other as they extend from a medial portion to the tissue engagement end portions 616 thereof, as FIGS. 31-36. The arm portions 614 may thereby not obstruct the view and access into an incision or surgical site that is maintained "open" by the retractor 602 (see, FIG. 30A, for example). In some embodiments, the first and second members 606, 608 may lie and translate along a common plane.

Figure 35:
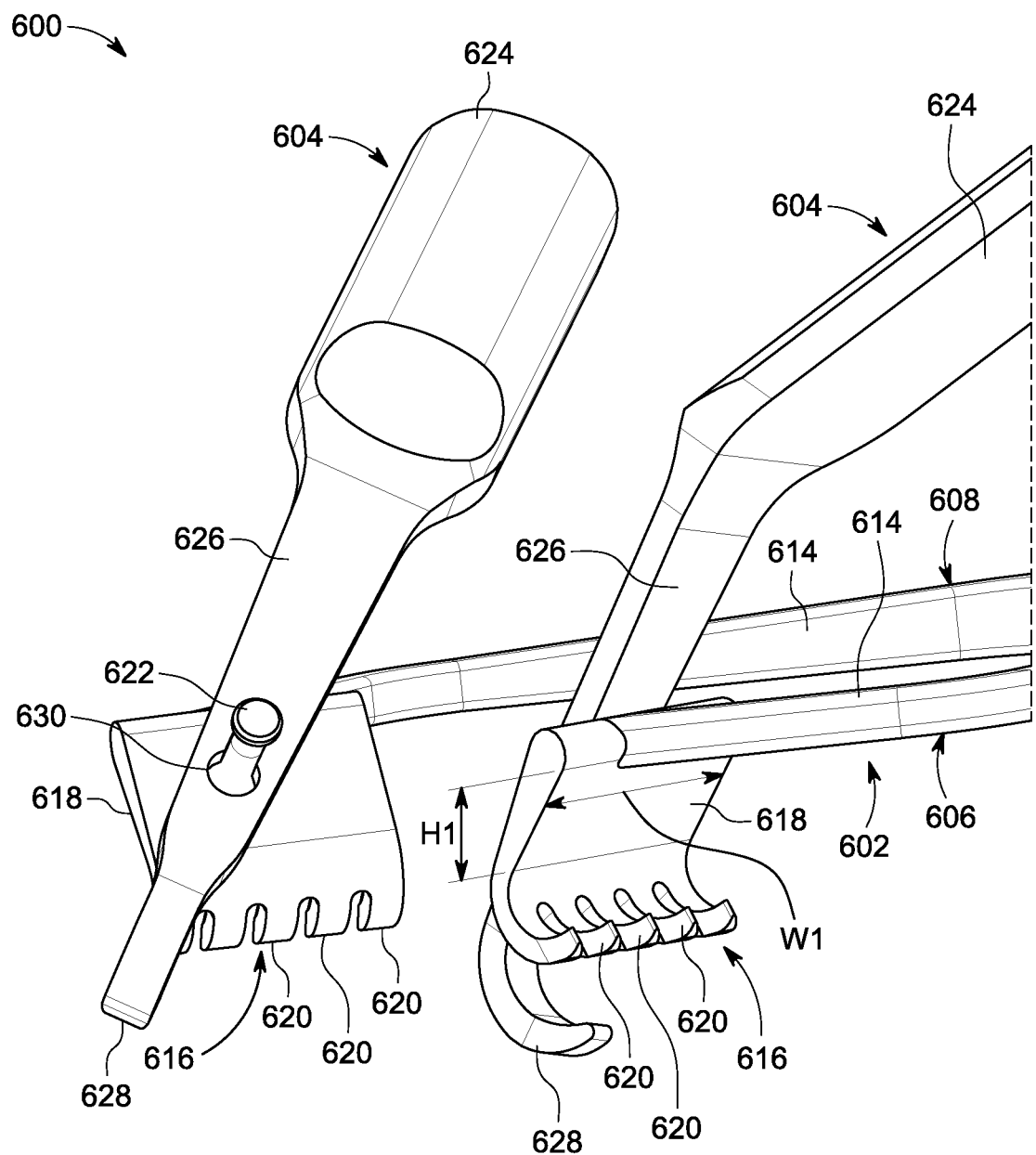
FIG. 35 is an enlarged elevational perspective view of the tissue engagement ends of a self-retaining retractor and modular retractor prongs of the modular retractor system of FIG. 31, in accordance with the present disclosure.

As also shown in FIGS. 31-36, the tissue engagement end portions 616 of the arm portions 614 may each include a paddle portion 618 and a plurality of teeth or hook portions 620. The paddle portion 618 may comprise a solid outer surface or portion that defines a height H1 and a width W1, as shown in FIG. 35. In some embodiments, the height H1 of each paddle portion 618 may be within the range of about 8 mm to about 35 mm, and/or the width W1 of each paddle portion 618 may be within the range of about 8 mm to about 35 mm. In some embodiments, the solid outer surface or portion of each paddle portion 618 may define a surface area within the range of about 50 $mm^2$ to about 300 $mm^2$. The solid outer surface or portion of each paddle portion 618 faces outwardly away from the other paddle portion 618 and, thereby, away from the space or void between the tissue engagement end portions 616, as shown in FIGS. 31-36. In some embodiments, the solid outer surface or portion of each paddle portion 618 may be angled inwardly as it extends downwardly along the height direction. The solid outer surface or portion of each paddle portion 618 may be configured to engage and retain tissue (e.g., fat and/or tendon(s)) and prevent the tissue from herniating or otherwise extending inwardly past the tissue engagement portion 616 (see, FIG. 30A, for example).

The plurality of teeth 620 of the each tissue engagement portion 616 may be arranged or extend from the bottom or lower side or end of the paddle portion 618 along the height direction, as shown in FIGS. 31-36. The teeth 620 may be tightly spaced apart along the length direction of the paddle portion 618. In some embodiments, the teeth 620 may define thicknesses along the width direction that are greater than the thicknesses of the spaces between the teeth 620. As shown in FIGS. 31-36, the teeth 620 may extend outwardly past the solid outer surface of each paddle portion 618 and upwardly along the height direction. The teeth 620 may thereby define a plurality of hooks or prongs that extend from the solid outer surface of a paddle portion 618. In some embodiments, at least a portion of at least an inner surface portion of the teeth 620 (that engage tissue) may be arcuately concave. In some embodiments, the teeth 620 may narrow or taper (in at least one direction) as they extend to the free end or tip thereof.

As also shown in FIGS. 31-36, each tissue engagement portion 616 includes a post 622 extending from the paddle portion 618 thereof. In some embodiments, the post 622 may extend from an inwardly facing surface or portion of the paddle portion 618, such as an inwardly facing surface or portion that opposes the solid outer surface of each paddle portion 618. The posts 622 may each include a base portion that extends from the paddle portion 618 of a first size (e.g., diameter), and an enlarged portion or head spaced from the paddle portion 618 of a second size (e.g., diameter) that is larger than the first size of the base portion. The post 622 of each paddle portion 618 is configured to mate with an aperture or other portion of a corresponding supplemental modular retractor prong 604, as shown in FIGS. 31-35.

As shown in FIGS. 31-35, each modular retractor prong 604 may include a manual engageable handle portion 624 and an arm segment 626 that extends from the handle portion 624 to a tissue engaging hooked tip or end portion 628. The arm segment 626 includes a keyhole-shaped aperture or slot 630 that includes a first portion of a first size (e.g., diameter) and an enlarged second portion of a second size (e.g., diameter) that is larger than the first size, as shown in FIGS. 31-35. The first portion of the keyhole aperture 630 is sized and otherwise configured to allow the base portion of a post 622 to extend/pass therethrough but prevent the enlarged portion of the post 622 from extending/passing therethrough, while the second portion of the keyhole aperture 630 is sized and otherwise configured to allow the base portion and the enlarged portion of the post 622 from extending/passing therethrough. In this way, the keyhole aperture 630 of each modular retractor prong 604 and the post 622 of each tissue engagement portion 616 are configured to allow the enlarged portion of the post 622 to extend into the aperture 630, and the post 622 slide through the aperture 630 such that the base portion of the post 622 extends through the first portion of the keyhole aperture 630 and the enlarged portion of the post 622 is trapped in front of the first portion of the keyhole aperture 630 to retain the modular retractor prong 604 to the engagement portion 616.

One of the modular retractor prongs 604 may thereby removably coupled with one of the tissue engagement portions 616 of the retractor 602, as shown in FIGS. 31-35. The tissue engaging hooked tip or end portion 628 of the retractor prongs 604 is configured to extend or face outwardly, at least similarly to the hook portions 620 of an associated engagement portion 616. As shown in FIGS. 31-35, the hooked tip portion 628 of the modular retractor prongs 604 may extend outwardly away from the space or void between the tissue engagement end portions 616 and upwardly along the height direction. In some embodiments, at least a portion of at least an inner surface portion of the hooked tip portion 628 (that engages tissue) may be arcuately concave. In some embodiments, the hooked tip portion 628 may narrow or taper (in at least one direction) as it extends to the free end or tip thereof.

As shown in FIGS. 31-35, each modular retractor prong 604 may be configured such that the first portion of the keyhole aperture 630 is positioned proximate to the handle portion 624 and distal to the hook portion 628, and the second enlarged portion of the keyhole aperture 630 is positioned distal to the handle portion 624 and proximate to the hook portion 628. In this way, as tissue engaged by a hook portion 628 that is attached to a tissue engagement portion 616 pulls or forces the hook portion 628 inwardly (toward the other tissue engagement portion 616), the keyhole aperture 630 slides over the post 622 such that the post 622 extends through the first portion of the keyhole aperture 630 to retain the modular retractor prong 604 to the engagement portion 616 (see, FIG. 30A, for example).

Figure 36:
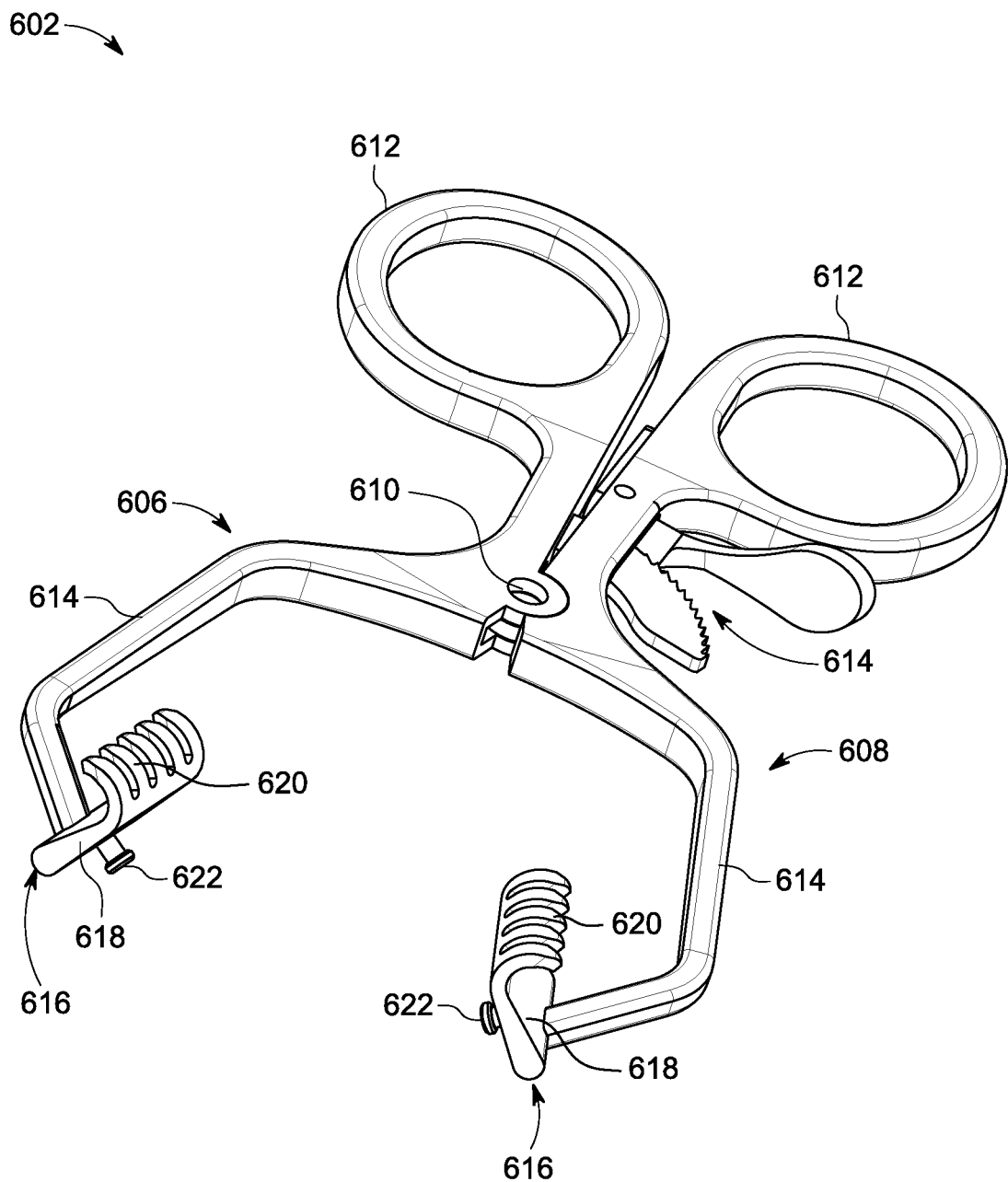
FIG. 36 is a bottom perspective view of the self-retaining retractor of the modular retractor system of FIG. 31, in accordance with the present disclosure.

In some surgical methods, the retractor 602 itself may be utilized alone to engage, spread apart and/or retain an incision and/or underlying tissue via the tissue engagement portions 616 thereof (see, FIG. 36). In some other surgical methods, the retractor 602 and only one modular retractor prong 604 may be utilized to engage, spread apart and/or retain an incision and/or underlying tissue via at least one of tissue engagement portions 616 thereof and the hook portion 628 of the modular retractor prong 604 (see, FIG. 30A, for example). In some other surgical methods, the retractor 602 and two modular retractor prongs 604 may be utilized to engage, spread apart and/or retain an incision and/or underlying tissue via the hook portions 628 of the modular retractor prongs 604 (and potentially, but not necessarily, one or both of tissue engagement portions 616 of the retractor 602) (see, FIGS. 31-35).

Figure 37:
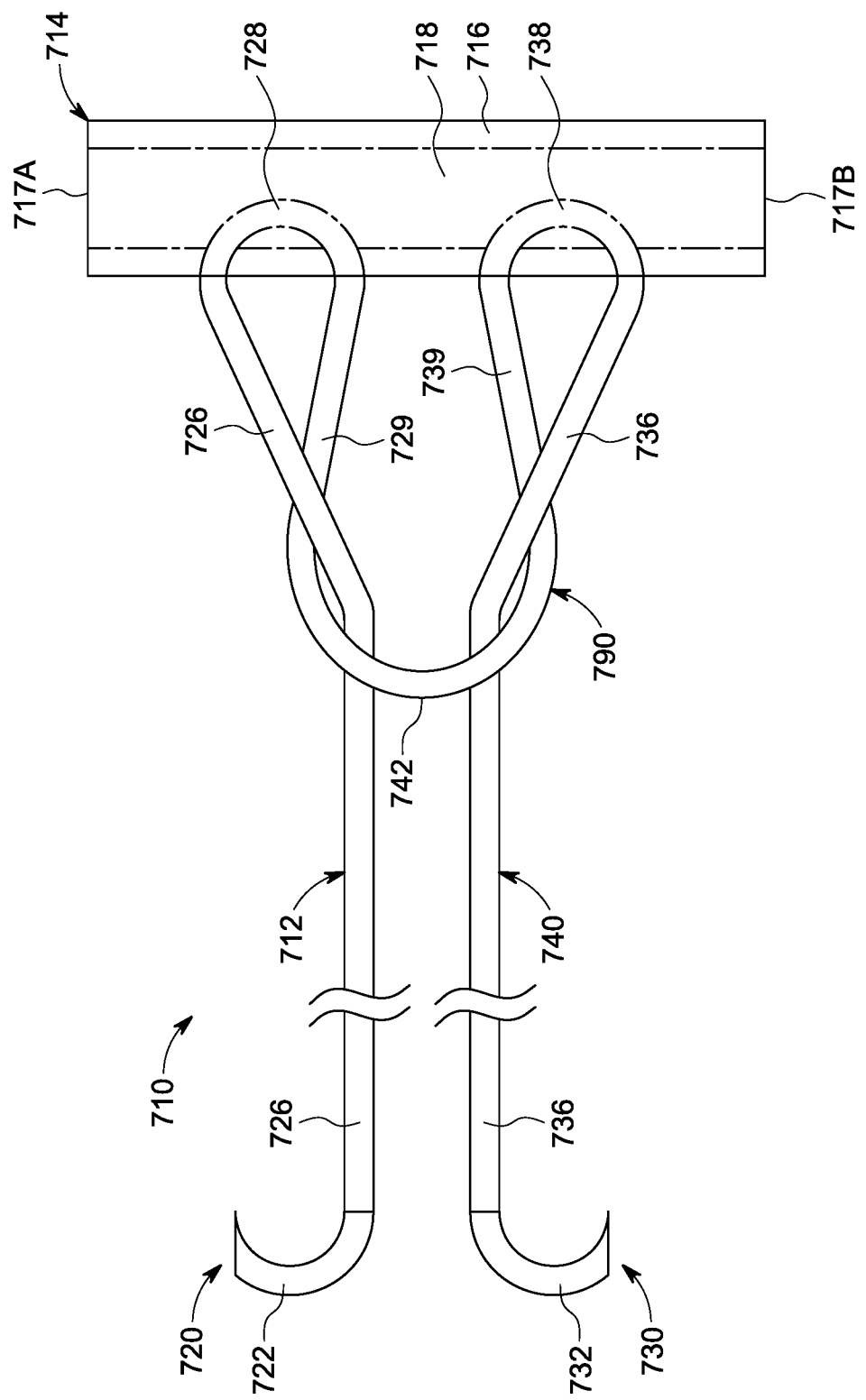
FIG. 37 is a top view of another tissue and/or bone joining implant system, in accordance with the present disclosure.
Figure 38:
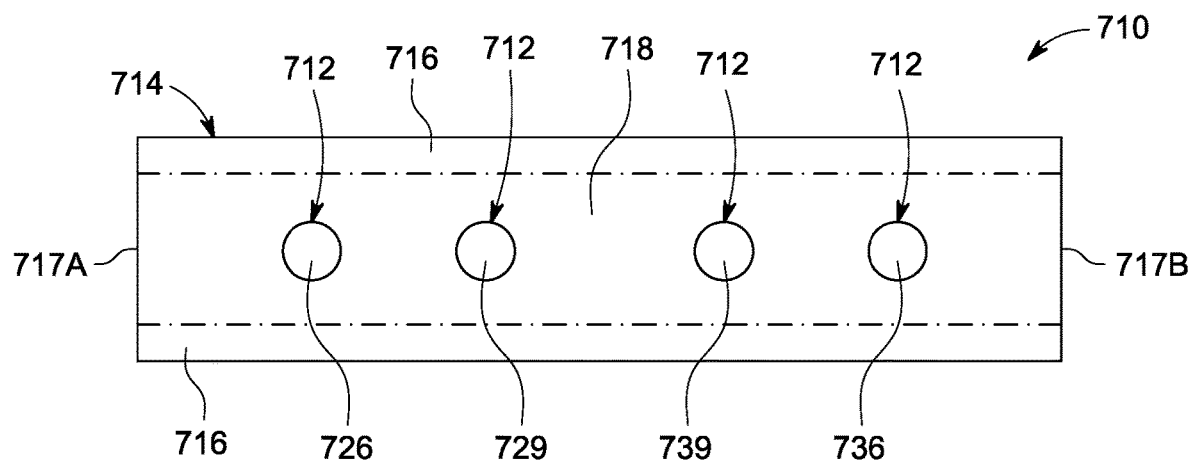
FIG. 38 is an end cross-sectional view taken through the anchor tube of the implant system of FIG. 37, in accordance with the present disclosure.

FIGS. 37-39 illustrate another exemplary embodiment of an implant system 710 for joining soft tissue to soft tissue, soft tissue to bone, or bone to bone according to the present disclosure. The implant system 710 of FIGS. 37-39 is substantially similar to the implant system 10 of FIGS. 1-9, 22A-24I, 30B-30P, and therefore like reference numerals preceded with "7" are used to indicate like components, aspects, functions, processes or functions, and the description above directed to thereto equally applies, and is not repeated for brevity and clarity purposes. As shown in FIGS. 37-39, the implant system 710 differs from the implant system 10 in that only the second anchor tube 714 is included (i.e., the first anchor tube 14 is not included). The suture 12 is thereby prevented from freely sliding through the system 710 (i.e., through the second anchor tube 714, as described above).

In use, the second anchor tube 714 may be implanted into and/or through a first bone or tissue or segment, and the first and second end portions 722, 732 may be implanted through a second bone or tissue or segment (potentially a plurality of times). For example, the second anchor tube 714 may be implanted into a first bone, such as within a proximal phalanx. In some embodiments, the second anchor tube 714 may be implanted into a first bone through the cortex of the bone such that the second anchor tube 714 is seated against the inside surface of the cortex. In some embodiments, the second anchor tube 714 may be implanted into and/or through a first bone or tissue or segment via an inserter, such as the inserter portion or component 404 described (or another inserter with the implant holder free end or tip portion 426 thereof, for example).

The first and second end portions 722, 732 of the suture 12 may be fixedly or removably coupled to an insertion needle, as described above. For example, the first and second end portions 722, 732 may be coupled to the insertion needle 70, insertion needle 170, the insertion needle 270 or another insertion needle configured to pass through (and thereby pass the first and second end portions 722, 732 of the suture 12) through a second bone or tissue or segment (potentially a plurality of times). In some embodiments, the first and second end portions 722, 732 of the suture 12 may be fixedly or removably coupled to a common insertion needle. In some other embodiments, the first and second end portions 722, 732 of the suture 12 may be fixedly or removably coupled to sperate and distinct respective insertion needles. In some embodiments, the first and second end portions 722, 732 of the suture 12 may passed through differing portions of the second bone or tissue segment (one or more times) via separate respective insertion needles.

After the second anchor tube 714 is implanted into and/or through the first bone or tissue or segment (e.g., a proximal phalanx), and the first and second end portions 722, 732 are implanted or passed through the second bone or tissue or segment (e.g., a plantar plate, the first and second end portions 722, 732 can be tensioned in divergent directions to seat the anchor tube 714 against the first bone or tissue segment (e.g., against the inside surface of the cortex of a phalanx), deform the anchor tube 714 into the deformed or folded arrangement/configuration, and draw the first bone or tissue segment and the second bone or tissue segment together, as described above. The first and second end portions 722, 732 may the tied into at least one knot to fix the relationship of the first bone or tissue segment and the second bone or tissue segment.

In some embodiments, passing the first end portion 722 of the suture 712 through a first portion of the second bone or tissue segment may include first passing the first end portion 722 through the first portion of the second bone or tissue segment from a first surface of the second bone or tissue segment that is adjacent to the first bone or tissue segment to a second surface of the second bone or tissue segment that is distal to the first bone or tissue segment. Similarly, passing the second end portion 732 of the suture 712 through a second portion of the second bone or tissue segment may include first passing the second end portion 732 through the second portion of the second bone or tissue segment from the first surface to the second surface of the second bone or tissue segment that is distal to the first bone or tissue segment. The first and second end portions 722, 732 may or may not be passed through the first and second portions, respectively, of the second bone or tissue segment a plurality of times. In some embodiments, the first and second end portions 722, 732 may be passed through the first and second portions the first and second portions, respectively, of the second bone or tissue segment such that the at least one knot is formed against the second surface of the second bone or tissue segment that is distal to the first bone or tissue segment. In this way, the second bone or tissue segment may be positioned between the at least one knot and the first bone or tissue segment (with the anchor member 714 implanted at least partially through the first bone or tissue segment).

Figure 40:
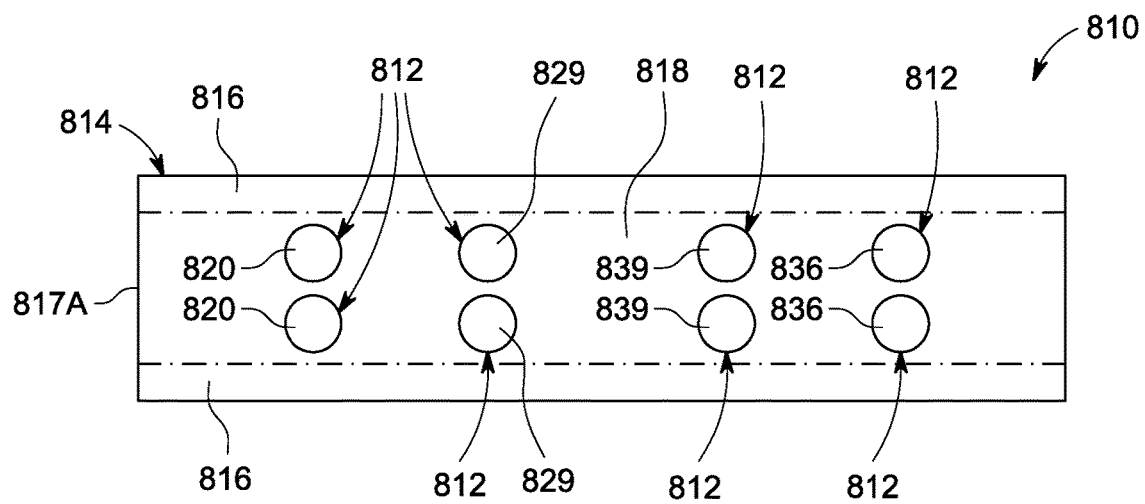
FIG. 40 is an end cross-sectional view taken through the anchor tube of another tissue and/or bone joining implant system, in accordance with the present disclosure.
Figure 41:
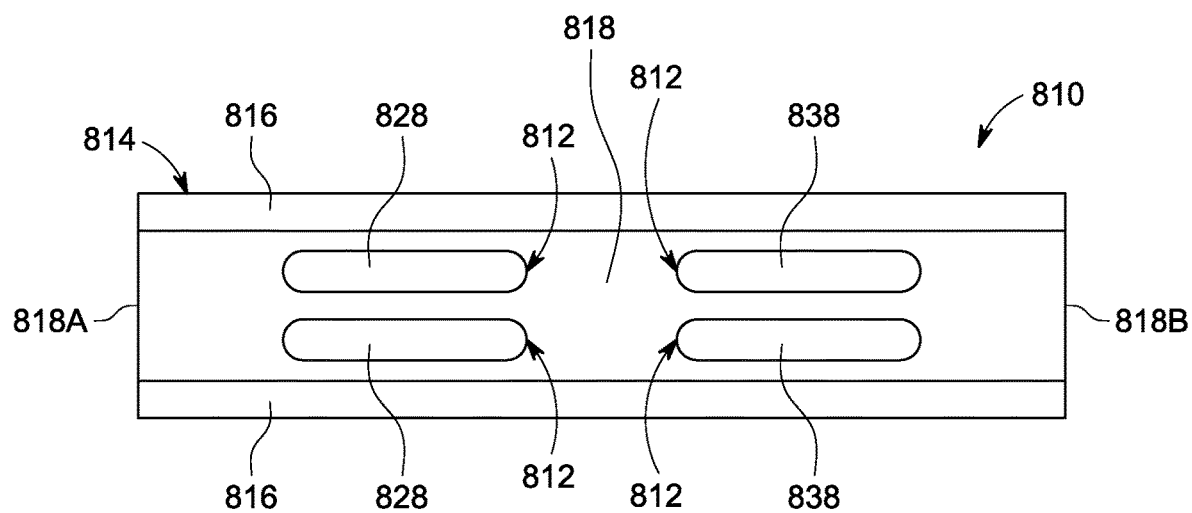
FIG. 41 is an end cross-sectional view taken through the sutures of the implant system of FIG. 40, in accordance with the present disclosure.

FIGS. 40 and 41 illustrate another exemplary embodiment of an implant system 810 for joining soft tissue to soft tissue, soft tissue to bone, or bone to bone according to the present disclosure. The implant system 810 of FIGS. 40 and 41 is substantially similar to the implant system 710 of FIGS. 37-39, and therefore like reference numerals preceded with "8" are used to indicate like components, aspects, functions, processes or functions, and the description above directed to thereto equally applies, and is not repeated for brevity and clarity purposes. As shown in FIGS. 40 and 41, the implant system 810 differs from the implant system 710 in that a plurality of sutures 812 are coupled to the wall 816 of the anchor tube member 814 in the pattern that prevents the sutures 812 from sliding through the anchor member 814, and that deforms or "folds" the anchor member 814 when the first and second end portions 822, 832 of the plurality of sutures are tensioned. In some embodiments, as shown in FIGS. 40 and 41, the plurality of sutures 812 comprises a pair of sutures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has", and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The invention has been described with reference to the preferred embodiments. It will be understood that the architectural and operational embodiments described herein are exemplary of a plurality of possible arrangements to provide the same general features, characteristics, and general system operation. Modifications and alterations will occur to others upon a reading and understanding of the preceding detailed description. It is intended that the invention be construed as including all such modifications and alterations.

What is claimed is:

1. A bone and/or tissue joining implant system, comprising:
    a first anchor tube comprising an annular first side wall defining a first internal cavity, a first longitudinal end and a second longitudinal end;
    a second anchor tube comprising an annular second side wall defining a second internal cavity, a first longitudinal end and a second longitudinal end; and
    at least one suture that passes through the first side wall a plurality of times and through the second side wall a plurality of times,
    wherein the at least one suture extends along a pattern as it extends through the first and second anchor tubes that is configured such that the pattern prevents the second anchor tube from translating along the at least one suture, and allows the first anchor tube to translate along the at least one suture toward the second anchor tube, when a first end portion and a second end portion of the at least one suture are tensioned and the second anchor tube is deformed, wherein the pattern of the at least one suture comprises a first intermediate portion of the at least one suture that extends from the first side wall of the first anchor tube to a first portion of the second side wall of the second anchor tube, a second intermediate portion of the at least one suture that extends from a third portion of the second side wall of the second anchor tube to the first side wall of the first anchor tube, and a loop that extends from the second side wall of the second anchor tube between second and fourth portions of the second side wall, wherein the first portion of the second side wall is positioned proximate to the first longitudinal of the second anchor tube, the third portion of the second side wall is positioned proximate to the second longitudinal of the second anchor tube, and the second and fourth portions of the second side wall are positioned longitudinally between first and third portions of the second side wall, wherein the loop does not extend through the first anchor tube, and wherein the loop of the at least one suture extends around the first and second intermediate portions of the at least one suture.

2. The implant system of claim 1, wherein the first end portion of the at least one suture extends through a first portion of the first side wall of the first anchor tube from an exterior surface of the first anchor tube proximate to the first longitudinal end thereof into the first internal cavity, extends longitudinally within the first internal cavity toward the second longitudinal end of the first anchor tube, and extends through a second portion of the first side wall distal to the first longitudinal end from the first internal cavity to the exterior surface of the first anchor tube.

3. The implant system of claim 2, wherein the first intermediate portion of the at least one suture extends from the first end portion extending through the second portion of the first side wall of the first anchor tube to and through the first portion of the second side wall of the second anchor tube from an exterior surface of the second side wall into the second internal cavity, extends longitudinally within the second internal cavity toward the second longitudinal end of the second anchor tube, and extends through the second portion of the second side wall from the second internal cavity to the exterior surface of the second anchor tube.

4. The implant system of claim 3, wherein the second end portion of the at least one suture extends through a third portion of the first side wall from the exterior surface of the first anchor tube proximate to the second longitudinal end thereof into the first internal cavity, extends longitudinally within the first internal cavity toward the first longitudinal end, and extends through a fourth portion of the first side wall distal to the second longitudinal end from the first internal cavity to the exterior surface of the first anchor tube.

5. The implant system of claim 4, wherein the second intermediate portion of the at least one suture extends from the second end portion extending through the fourth portion of the first side wall of first anchor tube to and through the third portion of the second side wall of the second anchor tube from the exterior surface of the second side wall proximate to the second longitudinal end thereof into the second internal cavity, extends longitudinally within the second internal cavity toward the first longitudinal end of the second anchor tube, and extends through the fourth portion of the second side wall from the second internal cavity to the exterior surface of the second anchor tube.

6. The implant system of claim 1, wherein the loop is formed by a first portion of the at least one suture that extends from the first intermediate portion of the at least one suture extending through the second portion of the second side wall of the second anchor tube, a second portion of the at least one suture that extends from the second intermediate portion of the at least one suture extending through the fourth portion of the second side wall of the second anchor tube, and third portion of the at least one suture that extends between the first and second portions of the at least one suture.

7. The implant system of claim 1, wherein the pattern is configured such that the pattern prevents the second anchor tube from translating along the at least one suture, and allows the first anchor tube to translate along the at least one suture toward the second anchor tube, when the second anchor tube is deformed and the first end portion of the at least one suture is tensioned in a direction extending toward the first or second longitudinal ends of the first anchor tube and the second end portion of the at least one suture is tensioned in a direction extending toward the other of the first or second longitudinal ends of the first anchor tube.

8. The implant system of claim 1, wherein the first and second anchor tubes are formed from a biocompatible material.

9. The implant system of claim 1, wherein the at least one suture is formed from a biocompatible material.

10. The implant system of claim 1, wherein the first and second anchor tubes are longitudinally elongated.

11. The implant system of claim 10, wherein the first and second anchor tubes are cylindrical.

12. The implant system of claim 1, wherein, when the first and second end portions are initially tensioned, the at least one suture deforms the first and/or second anchor tube into a concave shape with respect to a first side of the first and second side walls, respectively.

13. The implant system of claim 1, wherein the at least one suture comprises a monofilament suture.

14. The implant system of claim 1, wherein the at least one suture comprises a multifilament suture including at least two filaments of differing materials.

15. The implant system of claim 1, further comprising a at least one second suture, that differs from the at least one suture, extending through the second side wall of the second anchor tube.

16. The implant system of claim 15, further comprising an insertion device.

17. The implant system of claim 16, wherein the first and second end portions of the at least one suture are coupled to the insertion device.

18. The implant system of claim 17, wherein each of the first and second end portions of the at least one suture are tied or swaged to the insertion device.

19. The implant system of claim 16, wherein first and second end portions of the at least one second suture are coupled to the insertion device.

20. A method of joining plantar plate segments, comprising:
obtaining the implant system according to claim 19;
exposing first and second plantar plate segments on a plantar side of a foot;
passing the insertion device through the first plantar plate segment;
pulling at least the second at least one suture to translate the second anchor tube through the first plantar plate segment;

cutting the at least one suture to decouple the insertion device and the first anchor tube;
passing the insertion device through the second plantar plate segment;
pulling the second at least one suture to translate the second anchor tube through the second plantar segment;
cutting the second at least one suture to decouple the insertion device and the second anchor tube;
tensioning end portions of the at least one suture in divergent directions to seat the first and second anchors against the first and second plantar plate segments, respectively, deform the first and second anchors, and draw the first and second plantar plate segments together; and
tying the end portions of the at least one suture in a knot to fix the relationship of the first and second plantar plate segments.

21. The method of claim 20, wherein passing the insertion device through the first plantar plate segment comprises passing the insertion device through the first plantar plate segment in a dorsal to plantar direction, and wherein passing the insertion device through the second plantar plate segment comprises passing the insertion device through the second plantar plate segment in a plantar to dorsal direction.

22. A method of joining a plantar plate and a proximal phalanx, comprising:
obtaining the implant system according to claim 19;
exposing the plantar plate and the proximal phalanx on a dorsal side of a foot;
passing the insertion device through the plantar plate;
pulling at least the second at least one suture to translate the second anchor tube through the plantar plate;
forming a through hole in the proximal phalanx;
cutting the at least one suture and the second at least one suture to decouple the insertion device from the first and second anchor tubes;
translating the at least one suture and the second at least one suture through the through hole in the proximal phalanx;
pulling the second at least one suture to translate the second anchor tube through the through hole in the proximal phalanx;
tensioning end portions of the at least one suture in divergent directions to seat the first and second anchor tubes against the plantar plate and the proximal phalanx, respectively, deform the first and second anchor tubes, and draw the plantar plate and the proximal phalanx together; and
tying the end portions of the at least one suture in a knot to fix the relationship of the plantar plate and the proximal phalanx.

23. The method of claim 22, wherein passing the insertion device through the plantar plate comprises passing the insertion device through the plantar plate in a plantar to dorsal direction, and wherein translating the at least one suture and the second at least one suture through the through hole in the proximal phalanx comprises translating the at least one suture and the second at least one suture through the through hole in the proximal phalanx in a plantar to dorsal direction.

24. A method of joining a plantar plate and a proximal phalanx, comprising:
obtaining the implant system according to claim 19;
exposing the plantar plate on a plantar side of a foot;
forming a through hole in the proximal phalanx;
translating the first anchor tube partially through the through hole in the proximal phalanx such that the first anchor is positioned past an inner surface of a plantar portion of the proximal phalanx;
cutting the at least one suture to decouple the insertion device and the first anchor tube;
passing the insertion device through the plantar plate;
pulling at least the second at least one suture to translate the second anchor tube through the first plantar plate;
cutting the second at least one suture to decouple the insertion device and the second anchor tube;
tensioning end portions of the at least one suture in divergent directions to seat the first and second anchor tubes against the inner surface of a cortex portion of the proximal phalanx and the plantar plate, respectively, deform the first and second anchor tubes, and draw the proximal phalanx and the plantar plate together; and
tying the end portions of the at least one suture in a knot to fix the relationship of the proximal phalanx and the plantar plate.

25. The method of claim 24, wherein translating the first anchor tube partially through the through hole in the proximal phalanx such that the first anchor is positioned past an inner surface of a plantar portion of the proximal phalanx comprises translating the first anchor tube partially through the through hole in the proximal phalanx in a plantar to dorsal direction such that the first anchor is positioned past an inner surface of a plantar cortex portion of the proximal phalanx, and wherein passing the insertion device through the plantar plate comprises passing the insertion device through the plantar plate in a plantar to dorsal direction.

26. The implant system of claim 16, wherein the insertion device comprises a non-linear needle.

27. The implant system of claim 26, wherein the needle comprises a base portion defining a base end and a main body portion extending from the base portion to a tip portion of the needle.

28. The implant system of claim 27, wherein the tip portion of the needle defines a trocar tip.

29. The implant system of claim 27, wherein the main body portion is curved and defined by a single radius of curvature that is less than 5 mm.

30. The implant system of claim 27, wherein the main body portion is curved and defined by a first arcuate portion that extends from the base portion and is defined by a first radius of curvature, and a second arcuate portion that extends between the first arcuate portion and the tip portion and is defined by a second radius of curvature that differs from the first radius of curvature, and wherein the first and second arcuate portions extend on differing planes.

31. The implant system of claim 27, wherein the base portion is linear or arcuate.

32. The implant system of claim 1, wherein the first anchor tube is flexible, and the second anchor tube is flexible.

* * * * *